United States Patent [19]

Liu

[11] Patent Number: 5,768,617
[45] Date of Patent: Jun. 16, 1998

[54] INTELLIGENT HARDWARE FOR AUTOMATICALLY READING AND WRITING MULTIPLE SECTORS OF DATA BETWEEN A COMPUTER BUS AND A DISK DRIVE

[75] Inventor: Andy J. Liu, San Jose, Calif.

[73] Assignee: Adaptec, Inc., Milpitas, Calif.

[21] Appl. No.: 153,560

[22] Filed: Nov. 17, 1993

Related U.S. Application Data

[63] Continuation of Ser. No. 741,872, Aug. 7, 1991, abandoned.

[51] Int. Cl.[6] .................................................. G06F 13/00
[52] U.S. Cl. ..................... 395/825; 395/878; 395/827; 395/404; 395/739
[58] Field of Search .......................... 395/411, 437, 395/739, 441, 879, 280, 846; 360/77.08, 77; 368/59; 398/411, 437, 454, 441, 739, 846, 878, 825

[56] References Cited

U.S. PATENT DOCUMENTS

| | | | |
|---|---|---|---|
| 3,646,520 | 2/1972 | Spencer | 360/51 |
| 3,673,576 | 6/1972 | Donaldson, Jr. | 364/200 |
| 4,200,928 | 4/1980 | Allan et al. | 395/441 |
| 4,357,657 | 11/1982 | Fellinger | 364/200 |
| 4,414,664 | 11/1983 | Greenwood | 395/250 |
| 4,489,378 | 12/1984 | Dixon et al. | 364/200 |
| 4,513,392 | 4/1985 | Shenk | 395/437 |
| 4,517,641 | 5/1985 | Pinheiro | 364/200 |
| 4,612,613 | 9/1986 | Gershenson et al. | 364/200 |
| 4,649,474 | 3/1987 | Ambrosius | 364/200 |
| 4,658,349 | 4/1987 | Tabata et al. | 395/846 |
| 4,723,223 | 2/1988 | Hanada | 364/900 |
| 4,734,901 | 3/1988 | Murakami | 369/59 |
| 4,843,544 | 6/1989 | Dulac | 364/200 |
| 4,888,691 | 12/1989 | George et al. | 364/300 |
| 5,125,093 | 6/1992 | McFarland | 395/739 |
| 5,150,465 | 9/1992 | Bush et al. | 395/275 |
| 5,249,279 | 9/1993 | Schmenk et al. | 395/825 |
| 5,329,622 | 7/1994 | Belsan et al. | 395/250 |
| 5,394,527 | 2/1995 | Fakhruddin et al. | 395/879 |
| 5,420,730 | 5/1995 | Moon et al. | 360/77.8 |
| 5,440,716 | 8/1995 | Schultz et al. | 395/441 |

FOREIGN PATENT DOCUMENTS 0 426 184A2  5/1991  European Pat. Off. .......... G06F 3/06

*Primary Examiner*—Christopher B. Shin
*Attorney, Agent, or Firm*—Skjerven, Morrill, MacPherson, Franklin & Friel, Forrest E. Gunnison

[57] ABSTRACT

The transfer of multiple sectors of data between a hard disk drive and a computer data bus of a host computer is controlled by hardware within a computer bus interface circuit of a storage controller integrated circuit of this invention. Multiple sectors of data are transferred without intervention of a microprocessor that controls the operation of the disk drive containing the storage controller integrated circuit. The computer bus interface circuit of this invention not only automatically transfers data between the computer data bus and the computer bus interface circuit but also generates status information, generates interrupts to the host computer, and updates task file registers.

46 Claims, 41 Drawing Sheets

KEY TO

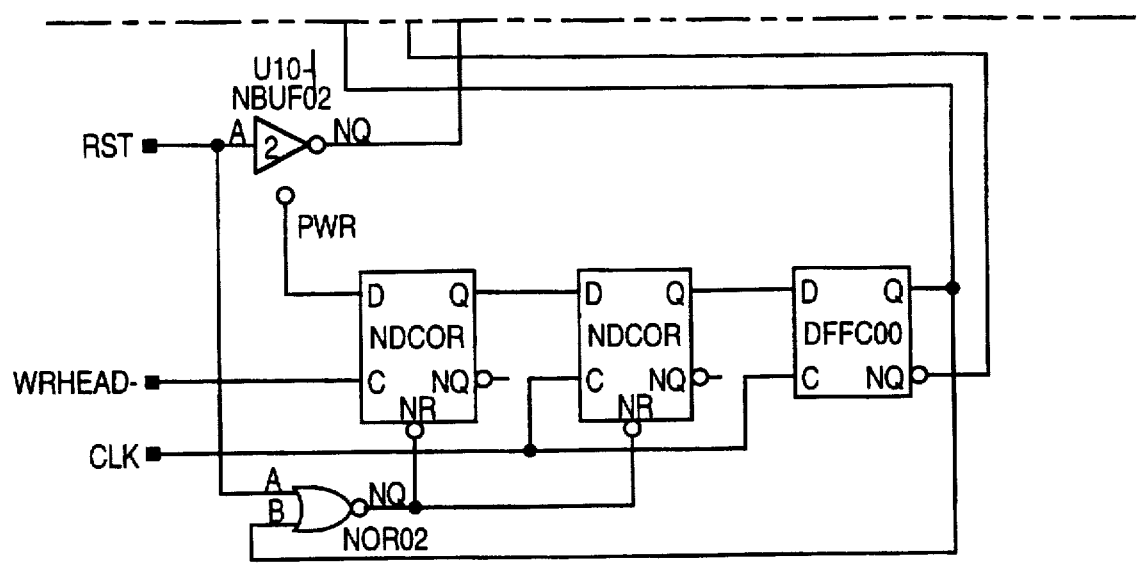
FIG. 11B
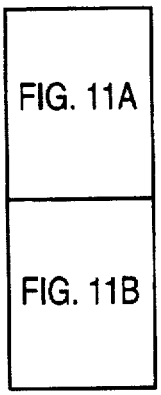
KEY TO FIG. 11
| FIG. 11A |
| FIG. 11B |

KEY TO

| FIG. 15A |
|---|
| FIG. 15B |

KEY TO

| FIG. 19A-1 | FIG. 19A-2 |

1

INTELLIGENT HARDWARE FOR AUTOMATICALLY READING AND WRITING MULTIPLE SECTORS OF DATA BETWEEN A COMPUTER BUS AND A DISK DRIVE

This application is a continuation of application Ser. No. 07/741,872, filed Aug. 7, 1991, abandoned.

BACKGROUND OF THE INVENTION

1. Field of the Invention

The present invention relates generally to interfacing a hard disk drive to a computer data bus and more particularly to automated read and write hardware sequencers that control reading and writing multiple sectors of data between a hard disk drive and a computer data bus without intervention of the microprocessor in the disk drive.

2. Description of Related Art

Personal computers, sometimes referred to as microcomputers, have gained wide spread use in recent years primarily because they are inexpensive and yet powerful enough to handle computationally-intensive user applications. The data storage and data sharing capabilities of personal computers typically include one or more hard disk drives.

A hard disk drive 120 (FIG. 1) has a rotating magnetic medium 140, a disk, that is magnetized in a certain pattern by a read/write head 141 which flies above the surface of disk 140. During a write operation, head 141 creates data patterns on the magnetic coating of rotating disk 140 which represent data, while in the read mode head 141 reads the data patterns created during the write operation.

In most high capacity hard disk drives, several disks are mounted above one another on a common spindle. Each of the disks has at least one read/write head per disk surface. Data is written in tracks which are concentric circles on the disk surface. When a plurality of disks are used on a common spindle, the tracks on the disk are written at the same relative radial position on each disk, that is track 1 on one disk is directly above (or below) track 1 on the adjacent disk. The track location are commonly referred to as cylinder locations because the location of track 1 on each disk in the stack of disks forms a cylinder which extends perpendicular to the disk surfaces.

Data stored on a hard disk is generally divided into files. Each file represents a unit of data which is processed by computer 110. The files are stored on rotating disk 140 in sectors. The number of sectors which are written in one revolution of the disk comprises a track. Therefore, to specify the location of any particular piece of data on the disk surface a head address, a cylinder address, and a sector number are required. The head, cylinder, and sector addresses are sometimes referred to as the geometric address.

The operations performed by computer 110 in response to a request from a computer program executing in computer 110 to read data from or to write data to disk drive 120 are well known to those skilled in the art. Typically, during this operation, an electronic circuit 130 in disk drive 120 receives a request for a particular sector of data on one of the disks in drive 120, i.e. electronic circuit 130 is provided the geometric address for the sector.

The electronics in disk drive 120 include a microprocessor 121, typically a first generation microprocessor such as microprocessors Model No. 8080/8085 sold by Intel Corporation of Sunnyvale, Calif., a storage controller integrated circuit 130 that interfaces microprocessor 121, drive electronics 123, computer data bus 115 and random access memory 122. Drive electronics 123 convert the analog signals from read/write head 141 to digital signals for storage controller circuit 130, and control the mechanical operation of disk drive 120.

Computer data bus 115 is, for example, the data bus in an IBM AT personal computer or a clone of such a computer. The structure and operation of such personal computers are well known to those skilled in the art.

Storage controller integrated circuit 130 includes a microprocessor interface circuit 131, a disk controller circuit 132, buffer controller 133, and computer bus interface circuit 134. The structure and operation of storage controller integrated circuit 130 is also well-known to those skilled in the art. For example, Cirrus Logic of Fremont, Calif. offers such an integrated circuit as Model No. SH260. Chips and Technology of San Jose, Calif. offers such an integrated circuit as Model No. 82C5059. Adaptec Corporation of Milpitas, Calif. offers Model Nos. AIC-6060 and AIC-7160.

The operations performed by microprocessor 121 are typically determined by program instructions that are loaded in microprocessor 121 from a non-volatile memory when disk drive 120 is turned on. Computer 110 provides a read/write request to circuit 130 over a control bus (not shown), the geometric address, i.e., head, cylinder, and sector, is provided asynchronously over data bus 115. This information is passed through interface circuit 134 and is stored directly in registers in circuit 130. Typically, circuit 130 includes registers and counters necessary to emulate the International Business Machines (IBM) Task file. The IBM Task File is defined in *IBM PC/AT Technical Reference* which is available from IBM and is incorporated herein by reference in its entirety. Alternately, the command blocks registers defined in the ATA specification may be utilized.

Upon receipt of the read/write request and the geometric address, microprocessor 121 performs the necessary operations to initialize computer bus interface circuit 134, disk interface circuit 132 and buffer control circuit 133 for the requested read or write operation. The initialization signals are passed from microprocessor 121 through microprocessor interface circuit 131 to the other circuits over microprocessor control bus 136. For clarity, the control signals lines between microprocessor 121 and microprocessor interface circuit 131 as well as the control signal lines between disk interface circuit 132, buffer control circuit 133, computer bus interface circuit 134 and RAM 122 are not shown in FIG. 1.

After initialization for a read operation, data is passed from drive electronics 123 to disk controller circuit 132 which in turn sends the data to buffer control circuit 133. Buffer control circuit 133 stores the data in RAM 122. When a complete sector of data is stored in RAM 122, microprocessor 121 initiates a transfer of the data from RAM 122 to a first-in-first-out (FIFO) memory in computer bus interface circuit 134. When the FIFO memory is nearly full, circuit 134 initiates an interrupt to host computer to indicate that the sector of data is ready. The sector of data is then transferred over bus 115 to host computer 110.

When the sector transfer is complete, microprocessor 121 interacts with computer 110 to initiate transfer of the next sector. Thus, the operation is slowed down because although several sectors of data may be transferred from disk drive 120 to computer bus 115, microprocessor 121 sends each sector individually. Unfortunately, microprocessor 121 is not capable of sending multiple sectors so that the time limitations imposed by processing only one sector and then intervening are inherent in circuit 130.

SUMMARY OF THE INVENTION

According to the principles of this invention, the transfer of multiple sectors of data between a hard disk drive and a computer data bus is controlled by hardware within a computer bus interface circuit of a storage controller integrated circuit in the hard disk drive. The multiple sectors of data are transferred without intervention of a microprocessor that controls the operation of the hard disk drive. The computer bus interface circuit of this invention not only automatically transfers data between the computer data bus and the interface circuit but also generates status information, generates interrupts to the host computer, and updates task file registers.

The disk drive storage controller integrated circuit of this invention includes a timer means, responsive to a timer initiation signal, wherein upon receipt of the timer initiation signal, the timer means is started. Sometimes the initiation signal is referred to as an enablement signal. After a predetermined time interval, the timer means generates a host computer interrupt timeout signal. In response to the host computer interrupt timeout signal, a hardware interrupt generating means asserts a host computer interrupt signal. The timer initiation signal is generated during a read operation when the host computer reads the status of the disk drive containing the disk drive storage controller. The hardware performs all of these operations without intervention by the microprocessor controlling the disk drive, which is typically on-board the disk drive.

In another embodiment, the disk drive storage controller integrated circuit includes means for distinguishing the first sector of data from subsequent sectors of data written to the disk drive in response to a single write sector command from the host computer. The disk drive storage controller integrated circuit further includes a means for asserting a host computer interrupt signal to initiate transfer of each sector of data after the first without intervention by the microprocessor controlling operation of the disk drive.

The ability of the hardware of this invention to transfer multiple sectors of data to and from the host computer without intervention of the microprocessor controlling the operation of the disk drive significantly enhances the data processing speed of the disk drive. The requirement that a microprocessor control the transfer of each sector individually has been eliminated and so the overhead associated with such control has also been eliminated.

In one embodiment, an automatic read sequencer and an automatic write sequencer of this invention are included within a computer bus interface circuit of a storage controller integrated circuit. The automatic read sequencer and the automatic write sequencer interface with the computer data bus of the host computer. The automatic read sequencer interacts with the host computer and generates the host computer interrupt signals required for the transfer of multiple sectors of data to the host computer without microprocessor intervention. Similarly, the automatic write sequencer interacts with the host computer and generates the host computer interrupt signals for the transfer of multiple sectors of data from the host computer without microprocessor intervention. In one embodiment, the storage controller integrated circuit also includes a buffer control circuit, a disk interface circuit, and a microprocessor interface circuit. The buffer control circuit, disk interface circuit, and microprocessor interface circuit are similar to those used in prior art storage controller circuits.

A novel timer is used with the automatic read and write sequencers of this invention. The timer functions as two independent timers. Specially, the timer includes means for storing a first predetermined value and a second predetermined value. The timer has an enablement signal associated with each of the predetermined values. Upon receiving an enablement signal for one of the predetermined values, that value is loaded into a programmable timer and the programmable timer is started. The programmable timer times out after a time interval that is determined by the predetermined value. Thus, the timer of this invention functions as a host interrupt time out timer and as a busy time out timer thereby reducing the hardware required for the sequencers of this invention.

The automatic read sequencer of this invention employs a novel process to automatically transfer data from the disk drive to the host computer. In this process, the automatic read sequencer first decrements the value of the number of sectors to be transferred in response to the read sector command from the host computer. Next, the status of the disk drive is updated and data is prefetched from a buffer control memory to a memory of the automatic read sequencer. When the automatic read sequencer memory is nearly full, an interrupt is sent to the host computer telling the computer that the data is ready for transfer from the automatic read sequencer.

In response to the host computer interrupt, the host computer may either read the data or read the disk drive status. If the status is read, the host computer interrupt is reset and a host interrupt time out timer started. If the host computer fails to read the data before the timer times out, another interrupt is sent to the host computer.

When the computer starts to read the data, the automatic read sequencer waits for the data transfer to be completed. When the data transfer is complete, the sector count is checked to ascertain whether further sectors of data remain to be transferred. If all the sectors of data have been transferred, processing terminates.

If there are additional sectors to transfer, the automatic read sequencer starts a busy time out timer. After the timer times out, the read sequencer checks the status of the buffer control memory. When the buffer control memory is ready for subsequent operations, the automatic read sequencer updates the task files that define the status of the data transfer and branches to the step that decrements the number of sectors to be transferred.

Similarly, the automatic write sequencer of this invention employs a novel process to automatically transfer multiple sectors of data from the host computer to the disk drive. In this process, the automatic write sequencer first updates the status of the disk drive and then determines whether the first sector of data is to be transferred. If the first sector is to be transferred, the automatic write sequencer waits for the transfer to be completed. If a subsequent sector is to be transferred, the automatic write sequencer issues a host computer interrupt to the host computer to indicate that the disk drive is ready to receive data. The automatic write sequencer again waits for the data transfer to be completed. Thus, the automatic write sequencer differentiates between the first sector of data and subsequent sectors of data that are transferred without microprocessor intervention in response to a single write command from the host computer.

When the data transfer is complete, the automatic write sequencer updates the number of sectors remaining to be transferred and the memory space available in a buffer memory for the subsequent sectors. Next, the updated available memory space is checked to determine whether there is sufficient space for the next sector of data. If there is not sufficient space, the automatic write operation is terminated.

If there is sufficient space for another sector, the number of sectors remaining to be transferred is checked. If there are no more sectors to transfer, processing is terminated. However, if there are additional sectors to transfer, the automatic write sequencer starts a busy time out timer. After the timer times out, the sequencer checks the status of the buffer control memory. When the buffer control memory is ready for subsequent operations, the automatic write sequencer updates the task files that define the status of the data transfer and branches to the step that updates the disk drive status.

This entire process is controlled by the hardware of the automatic write sequencer so that intervention by the microprocessor that controls operation of the disk drive is unnecessary. Consequently, the programming overhead for the microprocessor is reduced and the microprocessor is free to perform other tasks instead of controlling the transfer to data over the computer data bus.

DETAILED DESCRIPTION

According to the principles of this invention, the transfer of multiple sectors of data between a hard disk drive and a computer data bus of a host computer is controlled by hardware within a computer bus interface circuit of a storage controller integrated circuit in the hard disk drive. Multiple sectors of data are transferred without intervention of a microprocessor that controls the operation of the disk drive. Typically, such a microprocessor is located within the hard disk drive. The computer bus interface circuit of this invention not only automatically transfers data between the host computer data bus and the computer bus interface circuit but also generates status information, generates interrupts to the host computer, and updates task file registers, as described more completely below.

Figure 2:
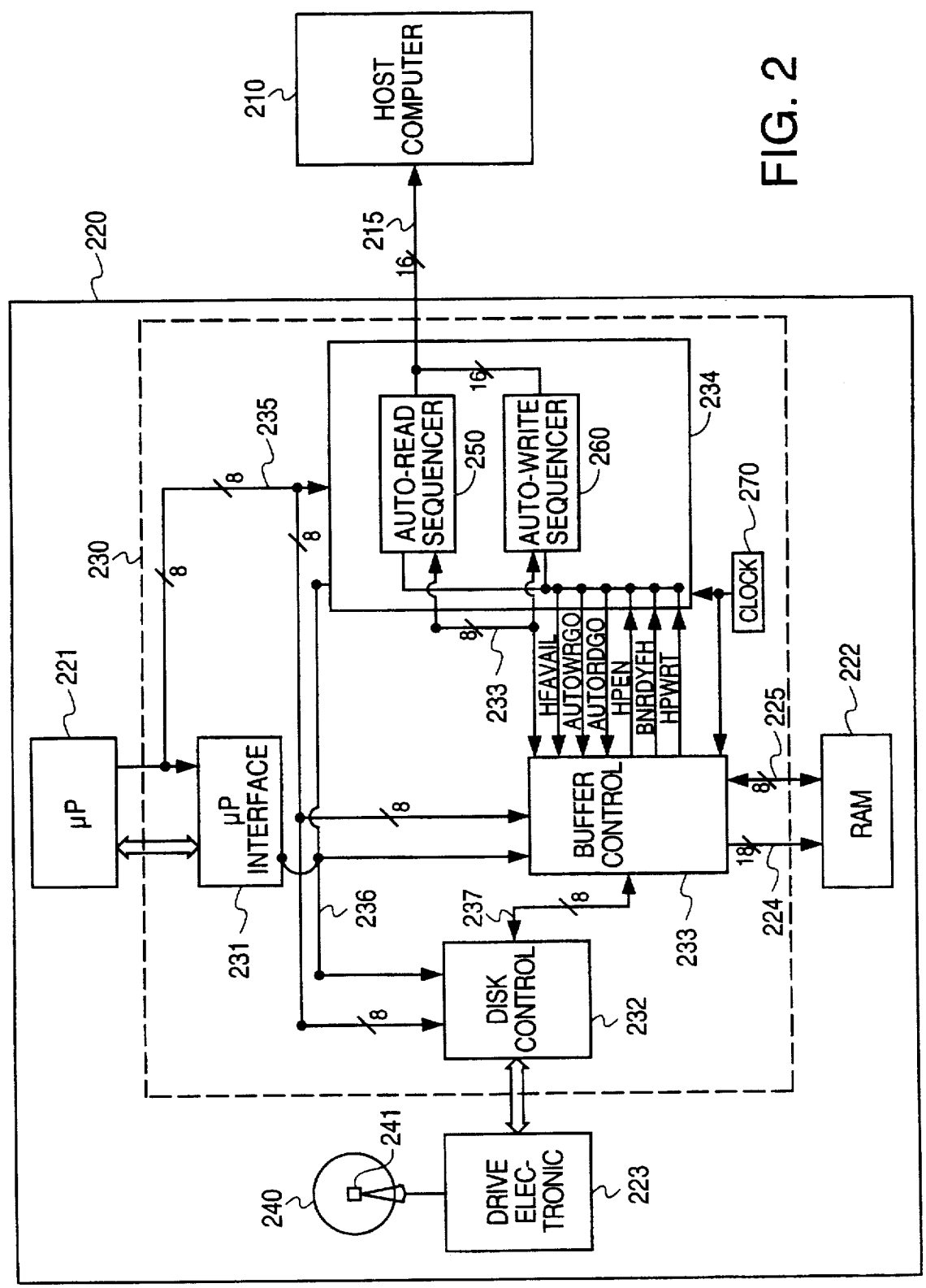
FIG. 2 is a block diagram of a computer system including a computer and a hard disk drive where the hard disk drive includes a storage controller integrated circuit that includes a computer bus interface with an automatic hardware read sequencer and an automatic hardware write sequencer, according to the principles of this invention.

In one embodiment, automatic read sequencer 250 and automatic write sequencer 260 (FIG. 2) of this invention are included within computer bus interface circuit 234 of storage controller integrated circuit 230. Sequencers 250, 260 interface with computer data bus 215 of host computer 210. Preferably, host computer 210 is an International Business Machines (IBM) personal computer commonly referred to as an "AT personal computer" or a clone of such a computer.

In this embodiment storage controller integrated circuit 230 also includes buffer control circuit 233, disk interface circuit 232, microprocessor interface circuit 231 and buffer clock 270. Circuits 231, 232, and 233 as well as buffer clock 270 are similar to those of prior art storage controller circuit 130 and so are known to those skilled in the art. In view of the following detailed disclosure, the modifications to the prior art circuits to use sequencers 250 and 260 of this invention will be apparent to those skilled in the art.

As described above, disk interface circuit 232 handles the transfer of serial data to and from disk 240 as well as (i) generation of error correction codes when writing to disk 240 and (ii) detection and correction of errors when reading from disk 240. Data transfer between disk 240 and host computer 210 goes to or from disk 240 through drive electronics 223. Drive electronics 223 transfer data to and receive data from disk interface circuit 232.

Disk interface circuit 232 transfers data to and receives data from buffer control circuit 233 over a bus 237, which in this embodiment is an eight bit bus. Buffer control circuit 233 is connected to random access memory (RAM) 222, typically static random access memory, by an address bus 224 and a data bus 225 along with several control lines (not shown). The data sent to and received from disk interface circuit 232 by buffer control circuit 233 are retrieved from and stored in RAM 222.

Buffer control circuit 233 also sends data to and receives data from computer bus interface circuit 234. Again, data sent to and received from computer bus interface circuit 234 by buffer control circuit 233 are retrieved from and stored in RAM 222. The data are sent and received over bus 238 that is connected to a first-in-first-out (FIFO) memory within computer bus interface circuit 234. In this embodiment, bus 238 is also an eight bit bus.

Buffer control circuit 233 is coupled to sequencers 250 and 260 in computer bus interface circuit 234 by several lines including lines HFAVAIL, AUTOWRGO, AUTORDGO, HPEN, HPWRT and BNRDYFH. The sequences of signals on these lines to automatically transfer multiple sectors of data without intervention of disk drive microprocessor 221 are described more completely below.

Microprocessor interface circuit 231 enables microprocessor 221 to access registers in storage controller circuit 230 and to write to registers that configure storage controller circuit 230 for specific operations as well as to read registers that return the status of storage controller circuit 230 to microprocessor 221. A data bus 235 interconnects microprocessor 221, microprocessor interface circuit 231, computer bus interface circuit 234, buffer control circuit 233 and disk interface circuit 232. In addition, a microprocessor control bus 236 interconnects each of circuits 231, 232, 233, 234 in storage controller circuit 230. Normally, microprocessor 221 is located within disk drive 220. However, the location of microprocessor 221 is not an essential aspect of this invention. The important aspect is that microprocessor 221 is programmed to control the operations of disk drive 220.

Since automatic read sequencer 250 and automatic write sequencer 260 within computer bus interface circuit 234 transfer multiple sectors of data to (a write operation) and from (a read operation) buffer RAM 222 without intervention by microprocessor 221, sequencers 250, 260 significantly reduce the time required to transfer data between computer 210 and disk drive 220 in comparison to prior art disk drive 120 described above.

In a read operation, after receiving a read command from host computer 210, read sequencer 250 asserts an interrupt signal (interrupt) to host computer 210 to initiate the read operation. In response, to the interrupt signal, host computer 210 either starts reading the data or checks the status of disk drive 220. If the disk drive status is checked, the host computer interrupt is reset.

After receiving the read command and asserting the host computer interrupt, read sequencer 250 checks to determine whether the interrupt signal to host computer 120 has been cleared prior to initiation of the data transfer. If the host computer interrupt is cleared, i.e., reset, automatic read sequencer 250 reasserts the host computer interrupt after a first predetermined time period, sometimes referred to as the host interrupt time out period. The reassertion of the host computer interrupt by automatic read sequencer 250 after the first predetermined time period enhances the performance of a computer system that includes a disk drive with sequencer 250 of this invention.

Figure 1:
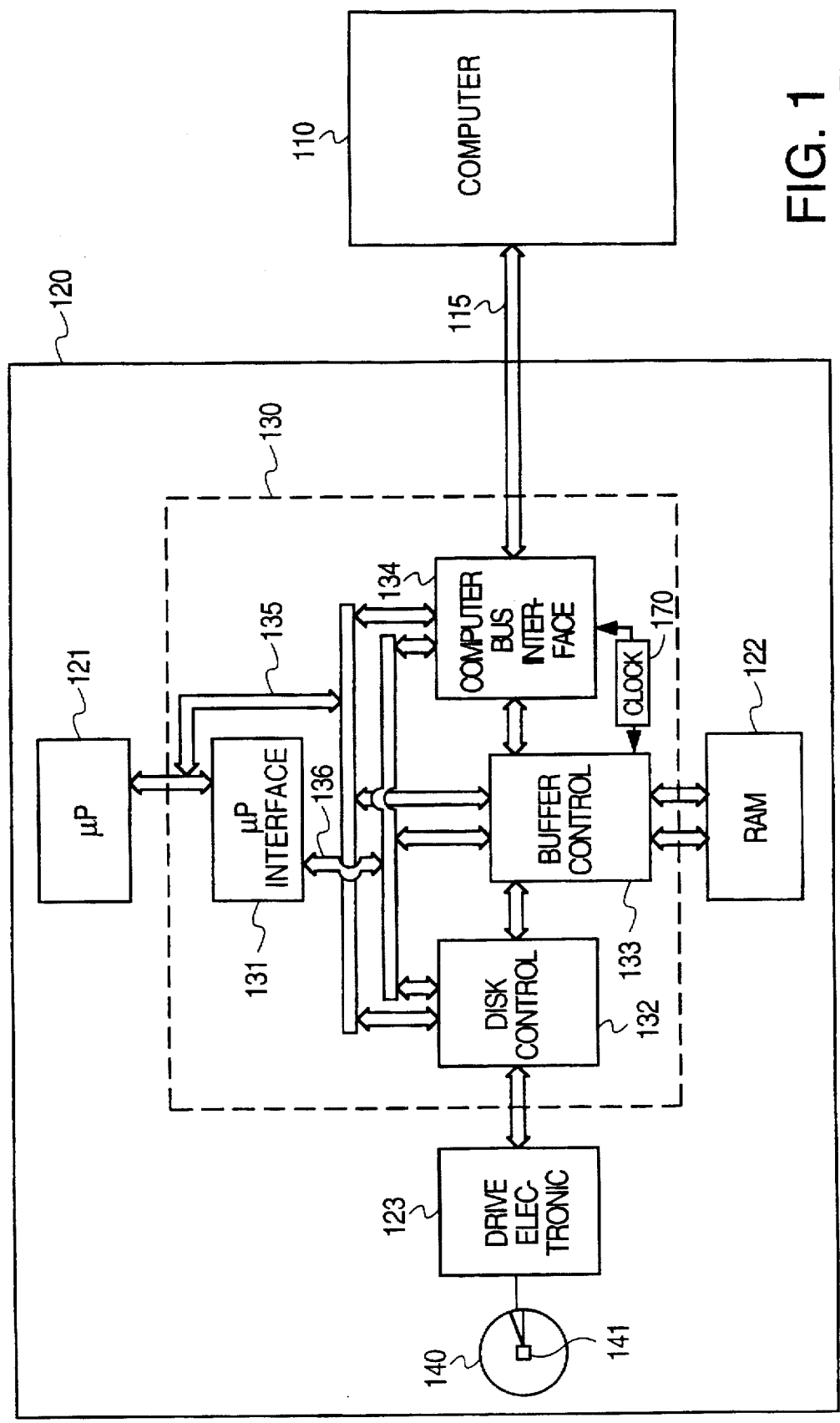
FIG. 1 is a block diagram of a prior art computer system that includes a computer and a hard disk drive.

In the prior art system (FIG. 1), when the host computer interrupt was cleared, microprocessor 121 was required to reassert the interrupt. Thus, instructions for polling the host computer interrupt status and instructions for reasserting the interrupt had to be included in the instructions provided to microprocessor 121 upon power-up of disk drive 120. Further, this set of instructions required processing time from microprocessor 121 and so microprocessor 121 was not available for other tasks. If microprocessor 121 failed to reassert the interrupt, typically host computer 110 timed out and reported an error. In this case, the user was required to retry the disk access or abort the read process. Therefore, performance was further degraded. All of these performance degradations are eliminated by automatic read sequencer 250 of this invention.

In addition to eliminating performance degradations associated with host computer interrupt processing, host computer 210 initially sets the head number, cylinder address, sector address, and the number of sectors to be transferred in task file registers of computer bus interface circuit 234. After a sector of data has been transferred to host computer 210, automatic read sequencer 250 of this invention automatically updates the head number, cylinder address, sector address, and the number of sectors remaining to be transferred in task file registers of computer bus interface circuit 234. In contrast, prior art systems required microprocessor 121 (FIG. 1) to individually update each of the task file registers. Consequently, the processing overhead for microprocessor 221 is reduced in comparison to that of microprocessor 121.

After the task file registers are updated, automatic read sequencer 250 automatically reasserts the host computer interrupt and transfers the next sector of data. The control of the host computer interrupt signal and the task file registers is done completely without assistance or intervention from microprocessor 221.

Thus, unlike prior art systems, after microprocessor 221 enables automatic read sequencer 250, sequencer 250 controls operations with host computer 210 and so microprocessor 221 is available to perform other functions associated with the operation of disk drive 220. Thus, sequencer 250 further improves the operation of disk drive 220 over prior art drive 120.

As explained more completely below, the operation of automatic write sequencer 260 is similar to that of automatic read sequencer 250 except that multiple sectors of data are transferred from data bus 215 to RAM 222 without intervention by microprocessor 221. Initially, host computer 210 sets the head number, cylinder address, sector address, and the number of sectors to be transferred in task file registers of computer bus interface circuit 234. After a sector of data has been transferred from host computer 210, automatic write sequencer 260 automatically updates the cylinder address, sector address, and the number of sectors remaining to be transferred in task file registers of computer bus interface circuit 234.

After updating the task file registers, automatic write sequencer 260 sends an interrupt to host computer 210 to initiate transfer of the next sector from host computer 210 to disk drive 220. Notice that a host computer interrupt is not sent prior to the transfer of the first sector of data, but a host computer interrupt is sent prior to the transfer of the second sector of data. Automatic write sequencer 260 differentiates between the first sector and subsequent sectors of data that are transferred in response to a single write command from host computer 210.

Unlike prior art systems, after microprocessor 221 enables sequencer 260, sequencer 260 controls operations with host computer 210 and so microprocessor 221 is available to perform other functions associated with the operation of disk drive 220. Thus, automatic write sequencer 260 further improves the operation of disk drive 220 over prior art disk drive 120.

Figure 3:
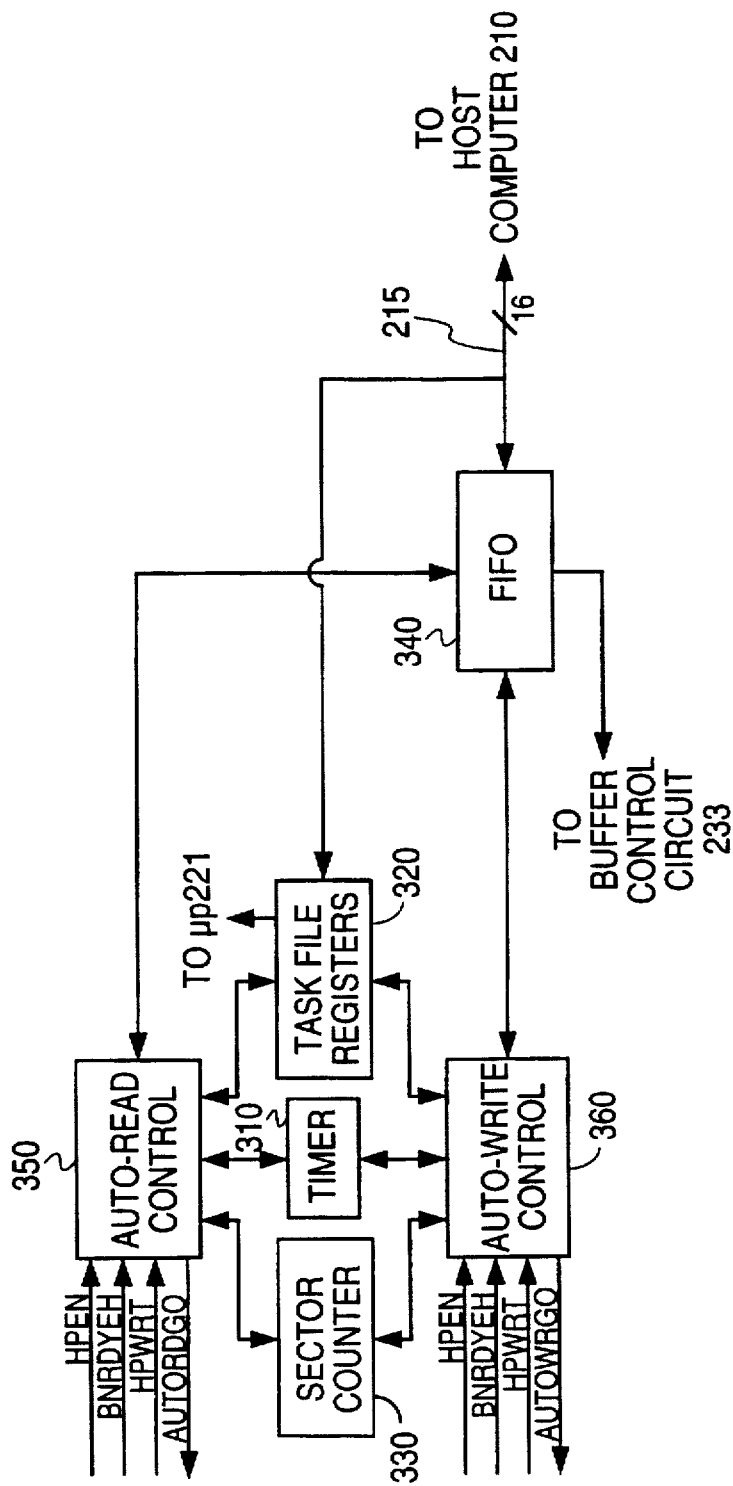
FIG. 3 is a more detailed block diagram of the hardware sequencers of this invention.
Figure 4:
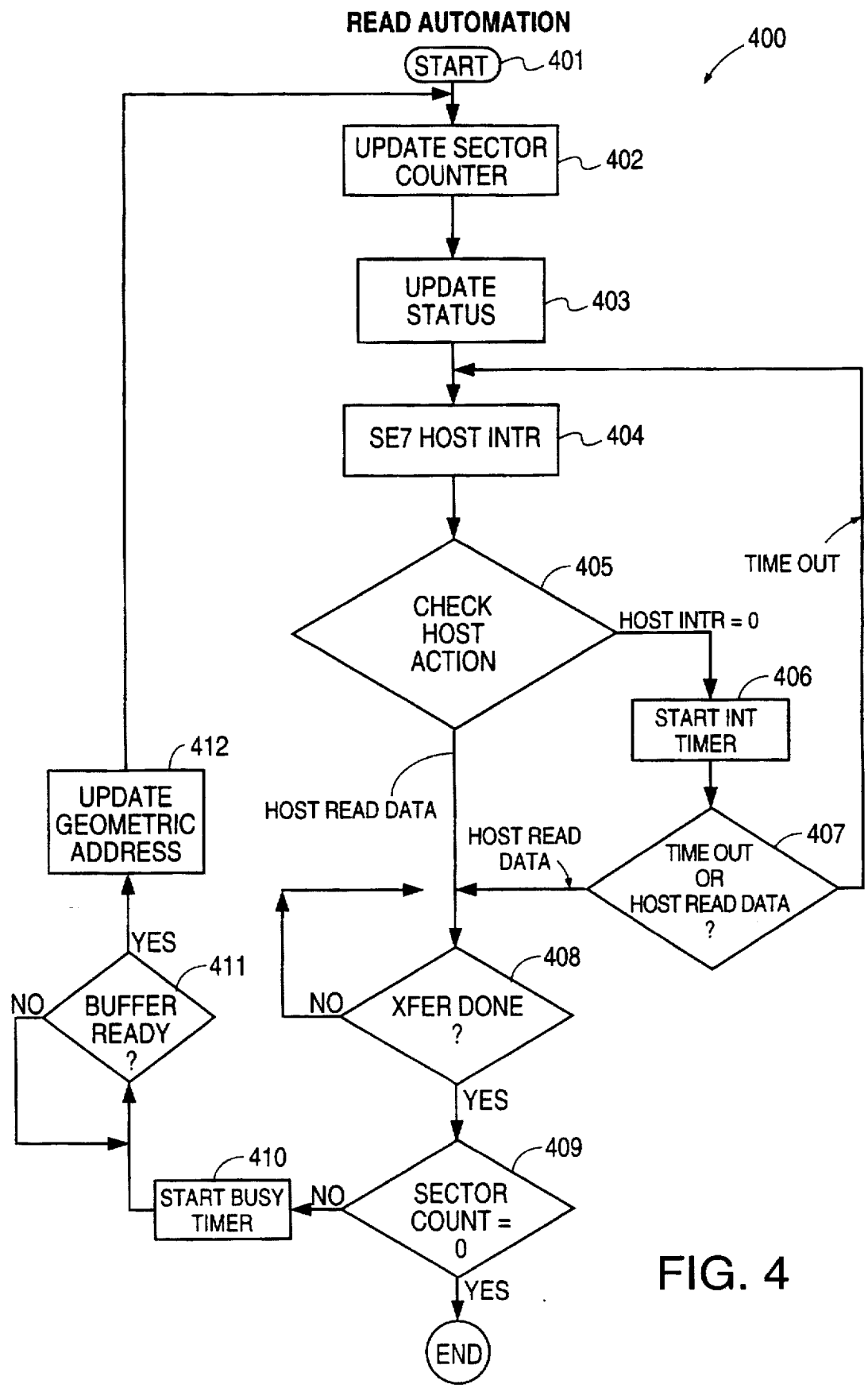
FIG. 4 is a process flow diagram of the operations performed by the automatic hardware read sequencer of this invention.
Figure 5:
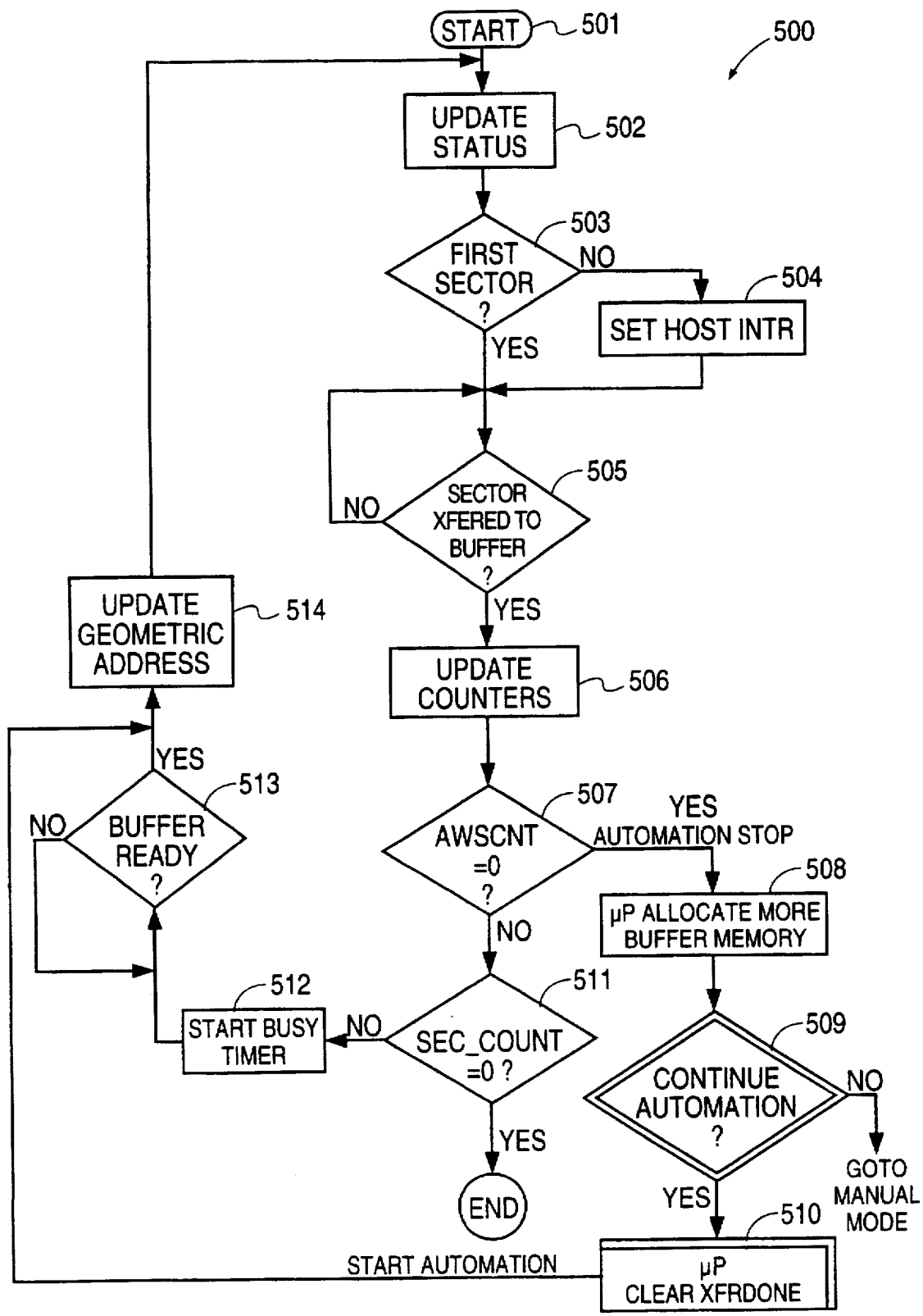
FIG. 5 is a process flow diagram of the automatic hardware write sequencer of this invention.

In one embodiment, hardware sequencers 250, 260 of this invention share many common circuits so that redundant components and/or circuits are eliminated. Specifically, hardware sequencers 250, 260 have a common first-in-first-out memory circuit 340, a common sector counter 330, and a common timing circuit 310. Auto-read control circuit 350 performs functions required by automatic read sequencer 250 while auto-write control circuit 360 performs functions required by automatic write sequencer 260. In FIG. 3, the lines interconnecting the various circuits are illustrative only. The actual interconnections are described more completely below.

When power is first applied to disk drive 220, microprocessor 221 sets the maximum number of sectors in a track and the maximum head number in registers 320. In addition, programmable timer 310 is loaded with two predetermined values. When the first predetermined value is selected and timer 310 started, timer 310 times out after a first predetermined time interval. Herein, "time-out" means a predetermined period of time passes after timer 310 is started and after the predetermined period of time, timer 310 generates an output signal.

When the second predetermined value is selected and timer 310 started, timer 310 times out after a second predetermined time interval. Thus, timer 310 is a dual function programmable timer that is loaded upon power-on of disk drive 220 with two values that determine two time-out periods. The time values are selected by the user based upon the computer system in which disk drive 220 is used. Thus, timer 310 further enhances the operation of storage controller 230 because the timeout time intervals can be determined at the point of use rather than at the factory for a specific computer system. Also, the single timing circuit actually functions as two independent timers and thereby reduces the complexity and size of integrated circuit 230.

To enable automatic read sequencer 250, microprocessor 221 sets a signal ENMULXFR to enable transfer of multiple sectors, a signal ENAUTORD to enable the automatic read sequence, and a signal ENAHINT to enable a host computer interrupt. In one embodiment, signals ENMULXFR, ENAUTORD, and ENAHINT are driven by bits in registers that are set by microprocessor 221.

To start the automated read sequence, host computer 210 initializes automatic read sequencer 250 by sending, over data bus 215,: i) the number of sectors of data to be transferred which are loaded in a sector count register 330; ii) the sector number of the first sector of data to be transferred which is stored in a sector number register; iii) the drive and head number which are stored in a drive/head register; iv) the low order bits, typically 8 bits, of the starting cylinder address which are stored in a cylinder low register; and v) the high order bits, typically 8 bits, of the starting cylinder address which are stored in a cylinder high register. These registers are included in registers 320. Herein, "low order bits" refer to the least significant bits in an address and "high order bits" refer to the most significant bits in the address. The loading of registers 320 and initialization of sector counter 330 by host computer 210 through computer bus interface circuit 234 are known to those skilled-in-the-art.

After host computer 210 initializes the registers for the read operation, host computer 210 issues a read sector command to computer bus interface circuit 234. The read sector command is stored in a host command register in task file registers 320.

When host computer 210 issues the read sector command, the requested sector may already be in buffer memory 222. Typically, multiple sectors of data are loaded into buffer memory 222 because microprocessor 221 is programmed to perform "read ahead." This means that in response to an earlier read sector command, microprocessor 221 loaded one or more sectors adjacent to the requested sector into memory 222 in anticipation that the sector requested in the next read operation will be the sector adjacent to the sector presently being read. The geometric address, i.e., the sector, cylinder, and head numbers, of the first sector loaded in buffer memory 222 as a result of the "read ahead" process is stored in registers "START".

Auto-read control circuit 350 compares the sector number, cylinder address, and head number in registers 320 with the values stored in registers START. If the values are the same, there is a match and the comparator output signal results in the generation of a pulse on line AUTORDGO from computer bus interface circuit 234 to buffer control circuit 233. The pulse on line AUTORDGO causes buffer control circuit 233 to generate a high signal on host port enable line HPEN to automatic read sequencer 250.

If there is not a match, microprocessor 221 resets signal ENAUTORD to a low value and initiates transfer of the requested sector of data from disk 240 to buffer memory 222. In one embodiment, the user programs microprocessor 221 to detect if there is a match. Specifically, if there is a match a status bit AUTORDST is set. The user can program microprocessor 221 to poll status bit AUTORDST to determine whether there is a match. Alternatively, circuit 234 may be configured by the user so that when bit AUTORDST is set, an interrupt is sent to microprocessor 221. In response to the interrupt, microprocessor 221 reads bit AUTORDST to ascertain whether a match occurred. If there is not a match, the transfer of data from disk 240 to buffer memory 222 in response to microprocessor 221 is known to those skilled in the art.

When the requested sector of data is in buffer memory 222, the signal on buffer not ready line BNRDYFH from buffer control circuit 233 to computer bus interface circuit 234 goes low and microprocessor 221 sets bit HPEN in register BPOTCTL high which in turn drives the signal on host port enable line HPEN from buffer control circuit 233 to computer bus interface circuit 234 high. The high signal on line HPEN initiates the automatic read sequence. The high signal on line HPEN is start step 401 in hardware automated read process 400.

In response to the signal on line HPEN, auto-read control circuit 350 decrements sector counter 330, i.e., performs step 402, update sector counter. Thus, automatic read sequencer 250 automatically updates this portion of the task file, according to the principles of this invention.

Next, circuit 350 performs update status step 403. Update status step 403 updates the drive status register (i) by resetting a signal BUSY to indicate that the disk drive is not busy and (ii) by setting a signal DRQ to indicate that disk drive 220 is ready to transfer a word (2 bytes) or a byte (8 bits) between host computer 210 and disk drive 220. In this embodiment, signal BUSY is the complement of signal DRQ.

The enablement signal, i.e. the high signal on host port enable line HPEN, initiates transfer of the requested sector of data from RAM 222 to FIFO circuit 340. This process is included in step update status 403. FIFO circuit 340 generates a FIFO nearly full signal to auto-read control circuit 350 indicating that the FIFO memory is nearly full. In one embodiment, the FIFO memory is sixteen bytes in size and the nearly full signal is generated when the FIFO memory in FIFO circuit 340 is about eighty-eight percent full, e.g., after fourteen bytes are loaded in the memory.

In response to the FIFO nearly full signal, processing transfers to step set host interrupt 404. Set host interrupt 404 causes auto-read control circuit 350 to send an interrupt to host computer 210. Thus, circuit 350 sends an interrupt to host computer 210 without intervention by microprocessor 221. In response to the interrupt, host computer 210 may either start to read data from FIFO circuit 340, or read the disk drive status from registers 320.

In step check host action 405, auto-read control circuit 350 determines whether host computer 210 reads the data or checks the disk drive status. If host computer 210 checks the disk drive status, circuit 350 resets the host computer interrupt and transfers processing to start interrupt timer 406.

In step start interrupt timer 406, circuit 350 loads the first predetermined value HINTTIME in timer 310 and starts timer 310. After a first predetermined time interval initialized by value HINTTIME, timer 310 generates a host interrupt time out signal. Typically, this predetermined time interval is in the range of about 10 microseconds (μsec) to about 500 μsec. The actual value, as explained above, is selected by the user upon installation of drive 220 in computer 210.

After timer 310 is started, processing transfers to time out/read check 407. If host computer 210 reads the data in FIFO circuit 340 prior to timer 310 counting down the first predetermined time interval and generating the interrupt timeout signal, processing transfers to transfer done check 408. In this case, the subsequent host interrupt time out signal from timer 310 is masked by a signal generated by circuit 350 in response to host computer 210 starting to read data from FIFO circuit 340.

If host computer 210 fails to read the data in FIFO circuit 340 prior to completion of the first predetermined time interval, timer 310 generates the host interrupt time out signal. In response to the host interrupt time out signal, auto-read control circuit 350 returns processing to set host interrupt 404 which issues another host computer interrupt. As explained above, the assertion of the host computer interrupt by auto-read control circuit 350 prevents host computer 210 from timing out on the read sector command and requesting that the user abort, fail, or retry accessing the data in disk drive 220.

The previous sequence of steps were encountered when the host computer interrupt was set in step 404 and subsequently, host computer 210 checked the status of disk drive 220. Alternatively, in step 405, host computer 210 may start to read the data in FIFO circuit 340. In this case, processing transfers directly to transfer done check 408.

Transfer done check 408 continually polls a signal from FIFO circuit 340 to determine when the sector of data has been transferred to host computer 210. Herein, FIFO circuit 340 refers to both the first-in-first-out memory and the circuitry associated with such a memory for monitoring and controlling the operation of the first-in-first-out memory. FIFO circuits are commonly used to interface circuits with differing bus speeds and so the control, use, and monitoring of the FIFO memory is well know to those skilled in the art. Each of the prior art storage controllers referenced above includes a FIFO memory and the related circuitry. For example, storage controllers sold by Adaptec as part numbers AIC-6060 and AIC-7160 include a FIFO memory and circuitry suitable for use with the automatic sequencers of this invention.

When the sector of data has been transferred to computer 210, FIFO circuit 340 generates a signal EMPTYDONE. Signal DRQ is reset and signal BUSY is set. However, if the last sector has been sent, signal DRQ is reset and signal BUSY is set to the state specified by the user. If host computer 210 reads the data directly so that the host computer interrupt has not been reset, the host computer interrupt is automatically reset. However, the user may program microprocessor 221 so that in the initialization process a bit ENHINTRSTL is set which in turn disables the automatic clearing of the host computer interrupt.

After completion of the data transfer and updating the various signals, processing transfers to sector count check 409. If sector counter 330 has a zero value, all sectors have been transferred and processing ends. Otherwise, processing transfers to step wait second predetermined period 410.

Wait second predetermined period 410 loads the second predetermined timer value BUSYTIME in timer 310 and starts timer 310. The second predetermined time interval is in the range of about 1 μsec to about 270 μsec, and preferably about 35 μsec. Unlike the prior art storage controllers, automatic read sequencer 250 of this invention does not require any processing time of microprocessor 221. Therefore, microprocessor 221 is free to attend to other operations and is not needed either for establishing the second predetermined time out interval or updating the task file registers.

After the second predetermined time out interval, processing transfers to buffer ready check 411. If the next sector of data is not in buffer RAM 222, buffer ready check 411 delays processing until buffer control circuit 233 sets the buffer not ready signal on line BNRDYFH low to indicate that another sector of data is contained in the buffer RAM 222.

Upon receipt of the low signal on line BNRDYFH by auto-read control circuit 350, processing transfers to update geometric addresses 412. Update geometric addresses 412 updates the values in sector number, cylinder address, and head number registers in registers 320. Consequently, control circuit 350 automatically updates the remaining registers in the task file associated with the read operation. Control circuit 350 then automatically begins transfer of the next sector of data by transferring processing to update sector counter step 402.

An important feature of this invention that greatly improves performance over the prior art systems is that processing automatically continues without microprocessor intervention when sector count check 409 determines that host computer 210 requested transfer of more than one sector. As explained above, prior art systems required the microprocessor to hand shake with the host computer and essentially treat each sector transfer as an independent event.

The operation of automatic write sequencer 260 is substantially similar to the operation of automatic read sequencer 250 when the different direction of data flow, i.e., from host computer 210 to disk drive 220 is considered. Moreover, in one embodiment, auto-write control circuit 360 includes, as described more completely below, some of the same circuitry that is used in auto-read control circuit 350. Accordingly, the use of auto-read control circuit 350 and auto-write control circuit 360 are illustrative only of the principles of this invention and is not intended to limit the invention to two distinct control circuits. Moreover, either automatic read sequencer 250 or automatic write sequencer 260 may be used independently in a computer bus interface circuit.

During power-on reset, an auto-write sector counter is set to FFh, which is the maximum value of the counter. Prior to initiation of the write command by host computer 210, microprocessor 221 allocates available space in RAM 222 for a specific number of sectors, and initializes auto-write sector counter with the number of sectors for which space was allocated. Prior to start step 501 of write automation process 500, host computer 210 again loads the geometric address from computer data bus 215 into the appropriate registers within registers 320. Similarly, sector counter 330 is loaded with a number of sectors to be transferred from computer 210 to disk drive 220.

When host computer 221 issues a write sector command after loading the geometric address and signal ENMULXFR is high, the write sector command is stored in the host command register in task file registers 320 and write control circuit 360 generates a pulse on line AUTOWRGO to buffer control circuit 233.

In response to the high signal on line AUTOWRGO, buffer control circuit 233 sets the signals on host port enable line HPEN and host port write line HPWRT to write control circuit 360 high. This is start step 501 of hardware write automation process 500 of this invention. In response to the signals on lines HPEN and HPWRT, processing is transferred in control circuit 360 to update status step 502.

In response to the automatic write initiation, auto-write control circuit 360 in step 502 sets bit DRQ and resets bit BUSY in the status register within registers 320 so that the bits can be read by host computer 210. Next, in step 503, auto-write control circuit 360 determines, as explained more completely below, whether this is the first sector to be written to disk drive 220 in response to this write request.

If this is the first sector transferred, processing transfers from first sector check 503 to sector transfer complete check 505. However, if this is not the first sector to be transferred, processing transfers to set host interrupt 504. Set host interrupt 504 sends an interrupt to host computer 210 to indicate the initiation of the transfer of another sector of data. Again, this interrupt is sent without intervention by microprocessor 221. After receiving the interrupt, host computer 210 starts to send the next sector of data and so processing transfers to step 505.

When the sector of data has been transferred through FIFO circuit 340, FIFO circuit 340 again generates signal EMPTYDONE. In response to signal EMPTYDONE, processing transfers to update counters step 506. In update counters step 506, sector counter 330 and the auto-write sector counter are decremented.

After decrementing, auto-write sector counter check 507 determines whether the value of the auto-write sector counter in auto-write control circuit 360 has a value of zero. If the auto-write sector counter is not zero, check 507 transfers processing to sector count equals zero check 511.

Conversely, if the auto-write sector counter has a zero value, and additional data remains to be transferred, the allocation of buffer memory 222 for hardware auto-write process 500 was insufficient. Therefore, the operations of automatic write sequencer 260 are terminated. A register status bit XFRDONE is set and processing transfers from check 507 to step 508 where control of the write operation is returned to microprocessor 221.

Microprocessor 221 may allocate more space in buffer memory 222 in step 508. If the microprocessor 221 allocates additional space in memory 222, continue automation check 509 transfers processing to step 510 where microprocessor 221 clears register status bit XFRDONE and automation is again initiated by transferring to update step 514. If microprocessor 221 fails to allocate additional space, microprocessor 221 must complete the write operation using the prior art manual method.

If auto-write sector counter check 507 fails to detect a zero value, processing sequentially continues through steps, sector count check step 511, initiate timer step 512, buffer ready step 513, and update step 514. Sector count check step 511, initiate timer step 512, buffer ready step 513, and update step 514 are equivalent to steps 409, 410, 411 and 412, respectively, that were described above. The only difference being that buffer ready step 513 waits for the space in buffer memory to become available rather than waiting for data to be loaded into the space.

In view of the above disclosure, the hardware circuits for automatic read sequencer 250 and automatic write sequencer 260 may be implemented in many different ways by those skilled in the art. Therefore, the following more detailed description of one embodiment of automatic read sequencer 250 and automatic write sequencer 260 is illustrative only of the principles of this invention and is not intended to limit the invention to the specific embodiment described.

Figure 6:
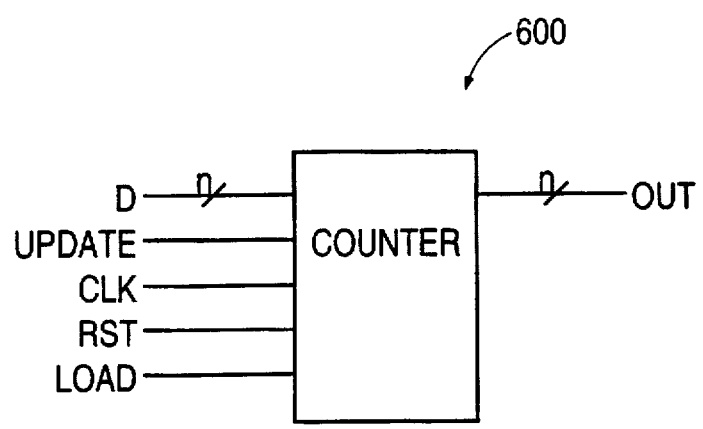
FIG. 6 is a general block diagram of a counter that is suitable for use in the hardware sequencers of this invention.

In this embodiment, cylinder register, head register and sector number register in the task file are each an up counter while sector counter 330 and the auto-write sector counter are each a down counter. Specifically, FIG. 6 is a general block diagram of one embodiment of an up counter 600 suitable for use as cylinder register, head register and sector number register. As explained more completely below, the counters include additional features, but the basic operation is illustrated by counter 600. Counter includes an "n" line input bus D that is driven by host computer 210 during the operation of sequencers 250, 260, an input line UPDATE, an input line CLK, an input line RST, and an input line LOAD. The output lines from counter 600 include an "n" line output bus OUT.

Host computer 210 asynchronously provides the data to be written in counter 600 on bus 215 and thereby bus D and computer 210 provides a signal on line LOAD. The signal on line LOAD is switched from a high level to a low level and back to the high level by computer 210. Since counter 600 is responsive to an active low signal on line LOAD, the signal on line LOAD generates a synchronized one clock tick wide pulse internal to counter 600 that loads the data on bus D into counter 600.

A one clock tick wide pulse signal on line UPDATE enables incrementing of the counter value by one on the next clock pulse on line CLK. If a pulse occurs on line UPDATE and counter 600 is at its maximum value, counter 600 is reset to a predetermined value. Line CLK provides a clock signal and line RST provides a reset signal to counter 600. The value of counter 600 is always available on bus OUT.

Sector number counter 710 (FIG. 7A) is a programmable eight bit up counter that includes each of the input lines described above for counter 600 where line LOAD of counter 600 is line WRSECNUM-. In addition, sector number counter 710 includes an eight line input bus MAXSEC which provides sector number counter with a programmable value for the maximum number of sectors in a track. In one embodiment, the maximum number of sectors in a track is stored in a register upon power-up of disk drive 220.

A comparator is used to compare the stored maximum number of sectors in a track with the value of sector number counter 710 and thereby determine when the maximum number of sectors in the track have been processed. Hence, the signal on line SECEQMAX from the comparator goes high when sector number counter 710 reaches the value for the maximum number of sectors in a track.

Figure 8:
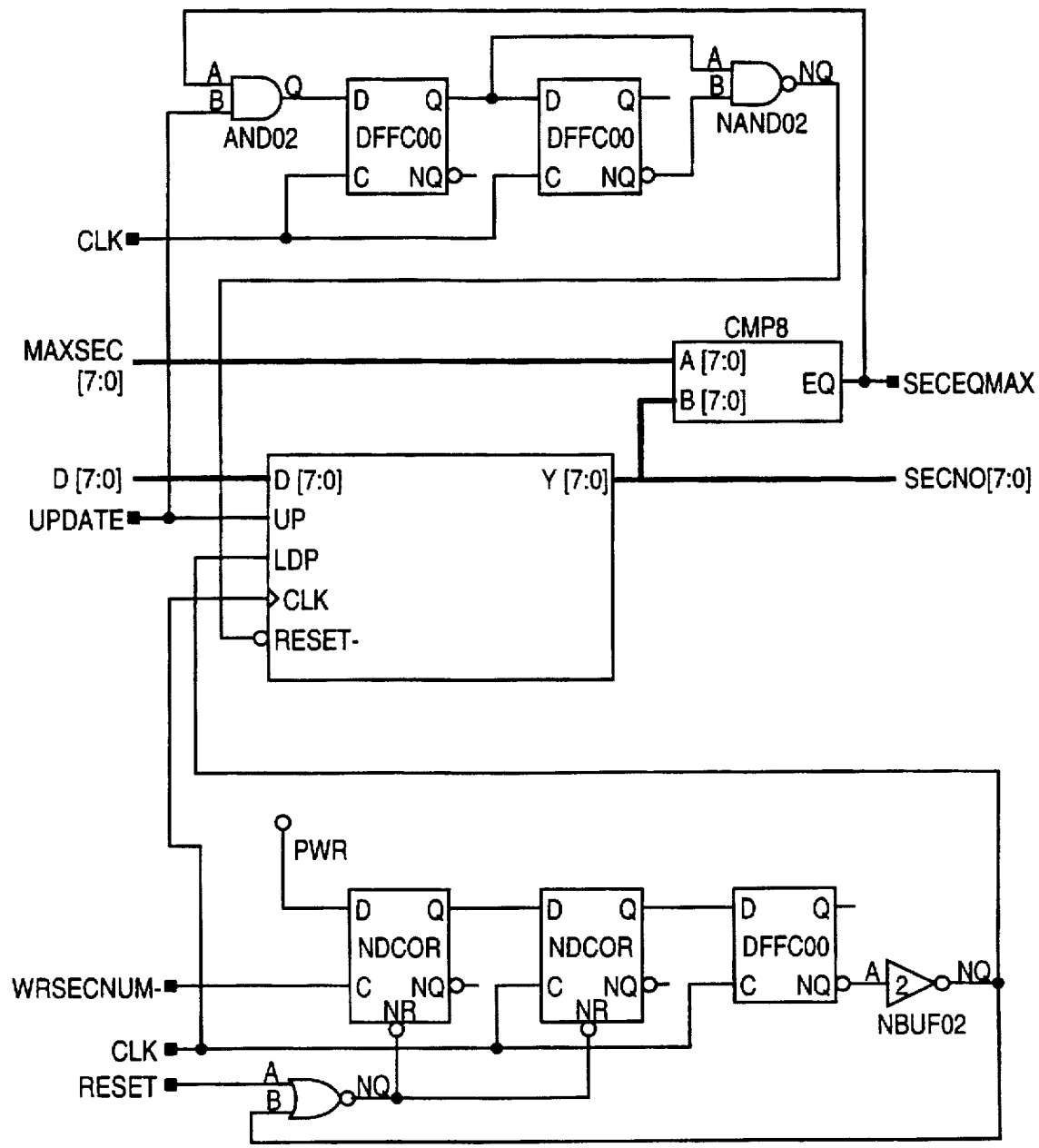
FIG. 8 is a block diagram of one embodiment of the sector number counter 710 of this invention.
Figure 9A:
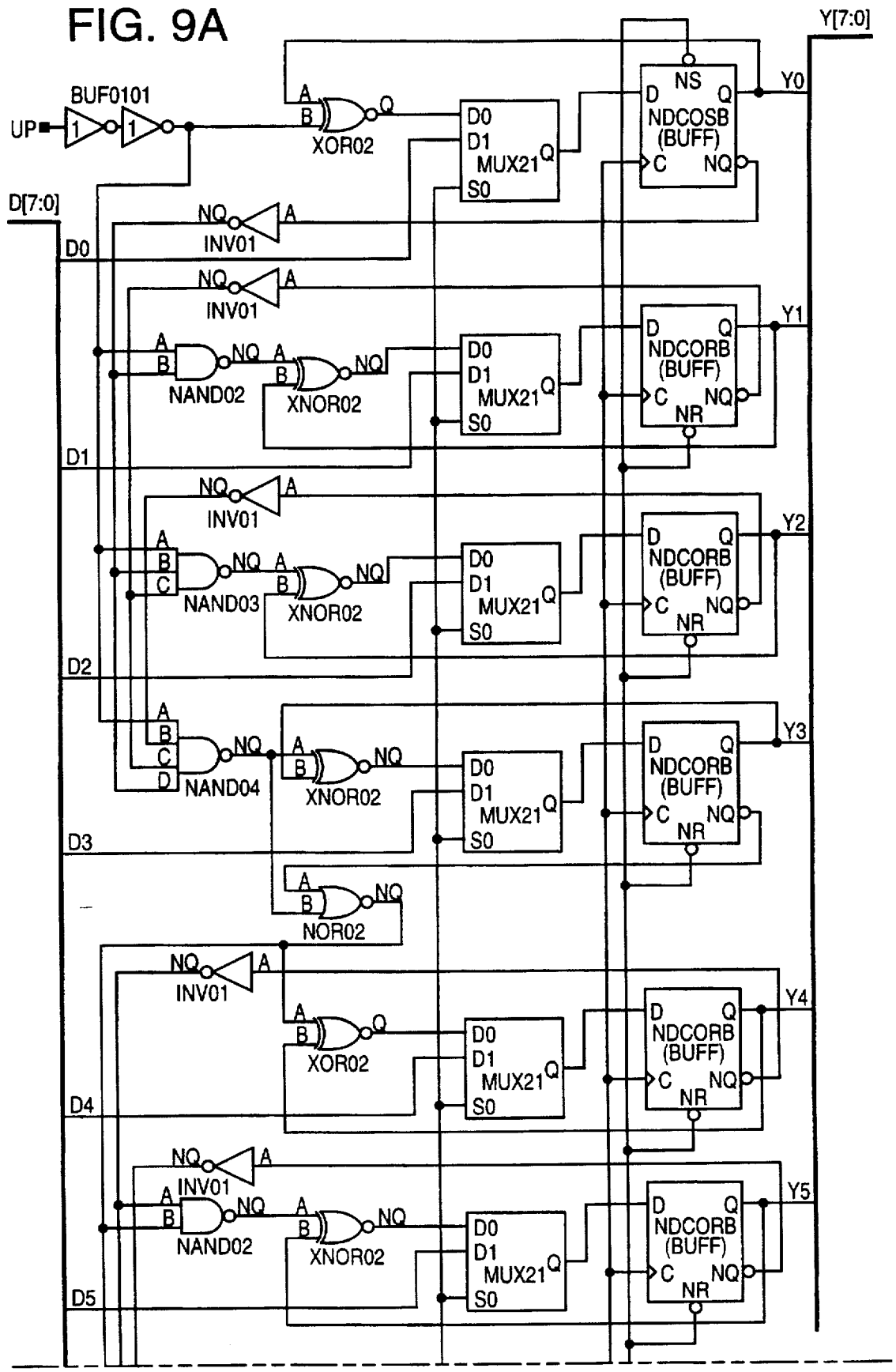
FIG. 9 is a key to FIGS. 9A and 9B which are a more detailed schematic diagram of element SUCL8RA of FIG. 8.
Figures 9, 9A, 9B:
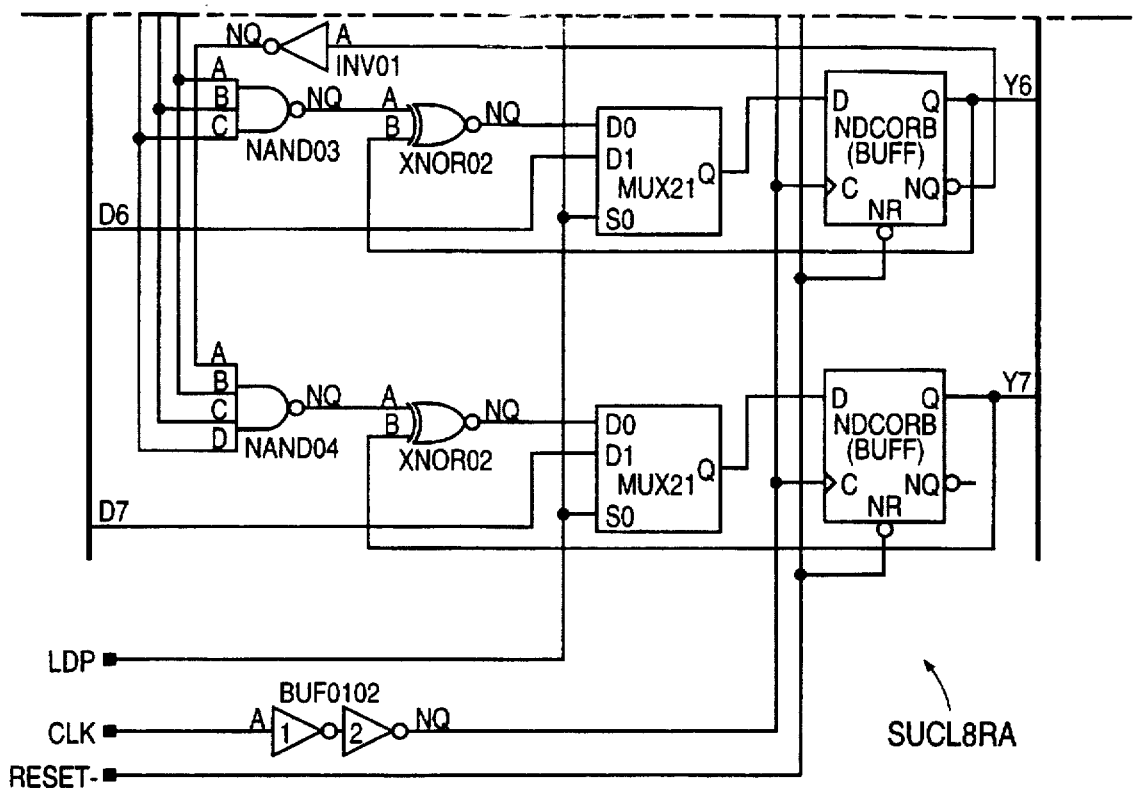
Figure 10:
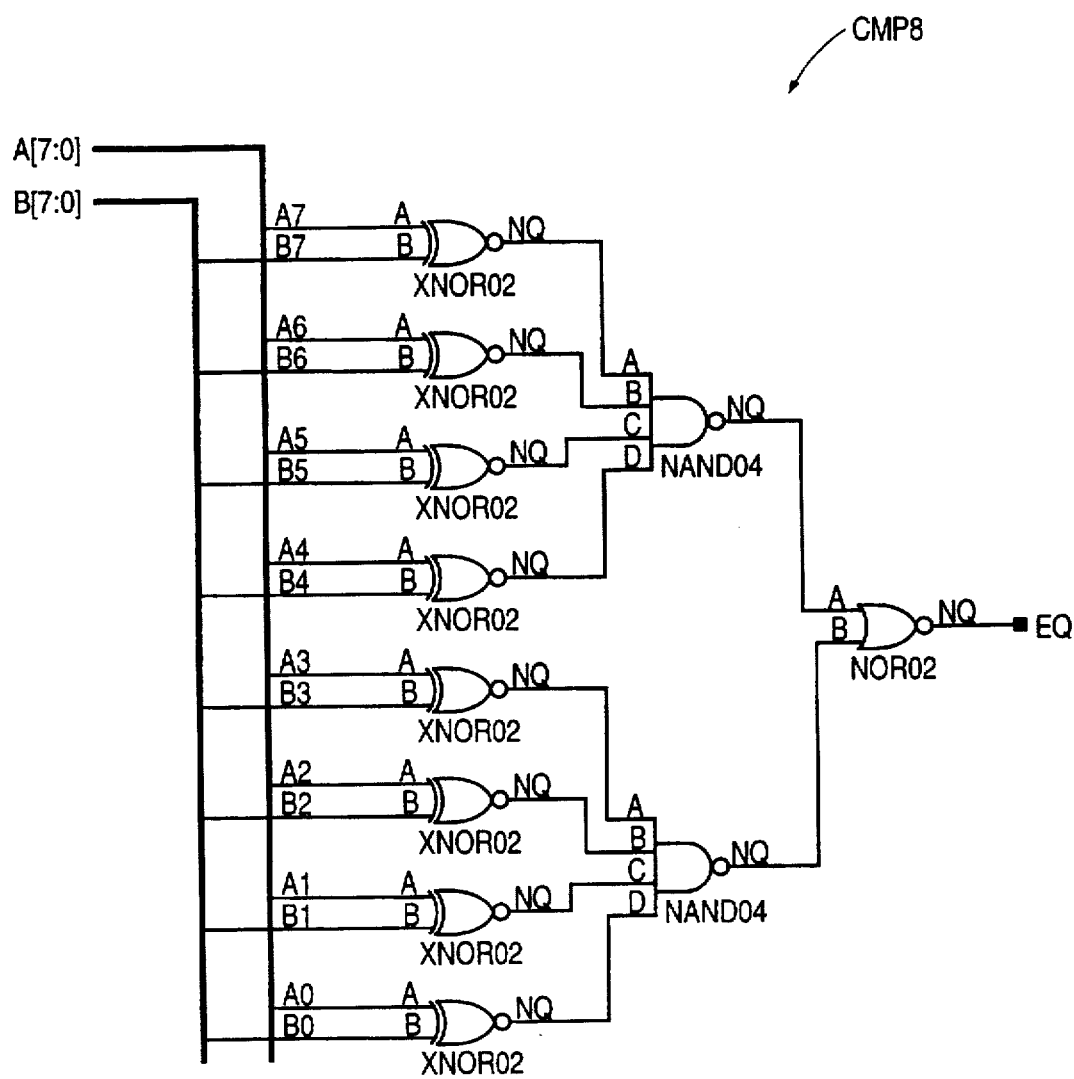
FIG. 10 is a more detailed schematic diagram of element CMP8 of FIG. 8.

When a pulse is supplied on line UPDATE and sector number counter 710 has the value of the maximum number of sectors in a track, sector counter 710 resets to a value of one because sector counter 710 is configured so that the most significant seven bits are cleared and the least significant bit is set under these conditions. A more detailed schematic diagram of one embodiment of sector number counter 710 is presented in FIGS. 8, 9, and 10. Component MUX21 (FIG. 9) is a two-to-one multiplexer.

The four least significant bits of head number register is a programmable four bit up head number counter 720 (FIG. 7A) that includes each of the input lines described above for counter 600 where line LOAD of counter 600 is line WRHEAD-. In addition, head number counter 720 includes four line input bus MAXHEAD which provides head number counter with a programmable value for the maximum head number. Typically, the programmable value for the maximum head number is initially specified by the disk drive manufacturer and is loaded into a register upon power-up of disk drive 220.

A comparator is used to compare the stored maximum head number with the value of head number counter 720 and thereby determine when the maximum head number is reached. Hence, the signal on line HEADEQMAX from the comparator goes high when head number counter 710 reaches the value for the maximum head number.

Figure 11A:
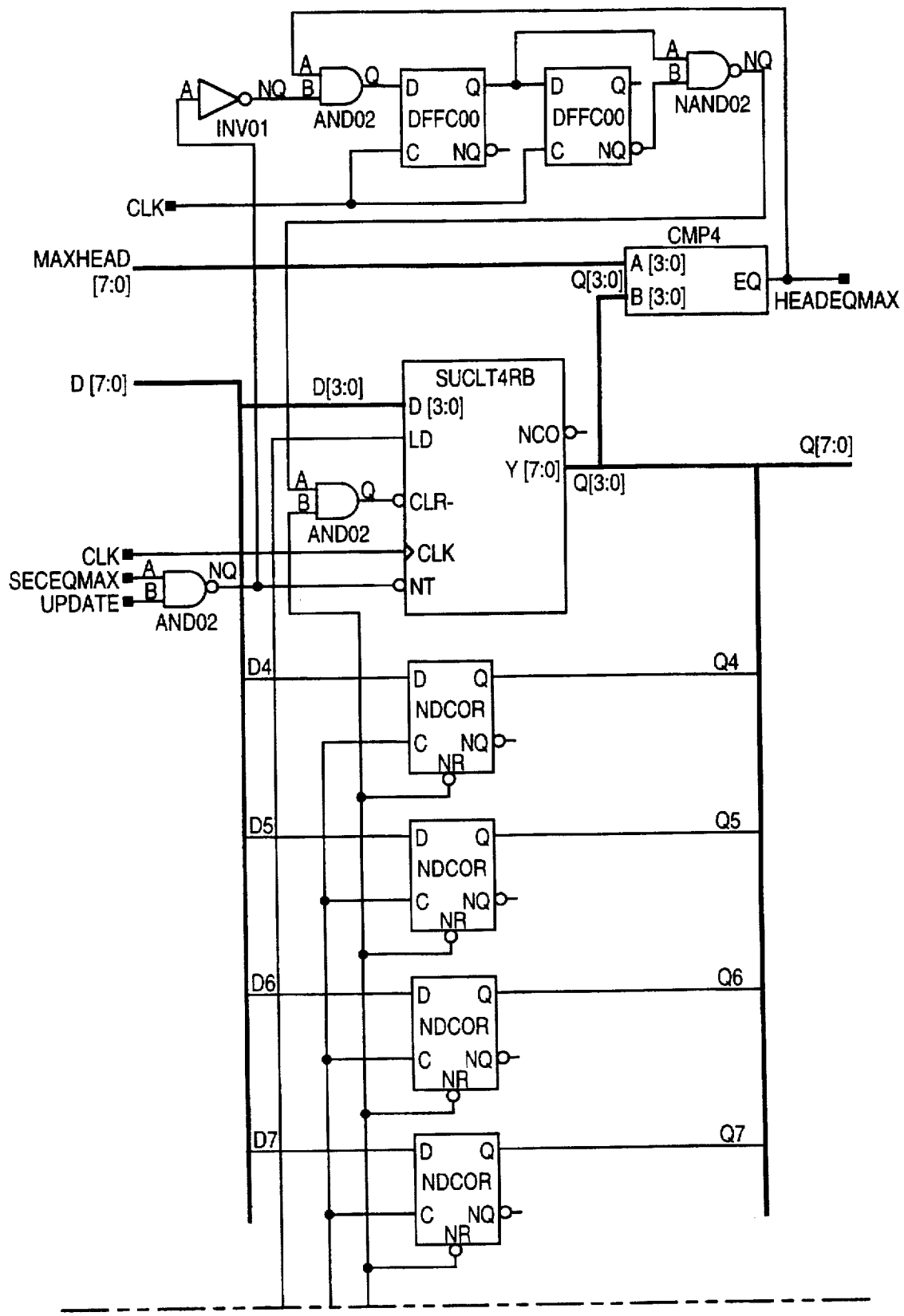
FIG. 11 is a key to FIGS. 11A and 11B which are a detailed block diagram of head number counter of this invention.
Figure 12:
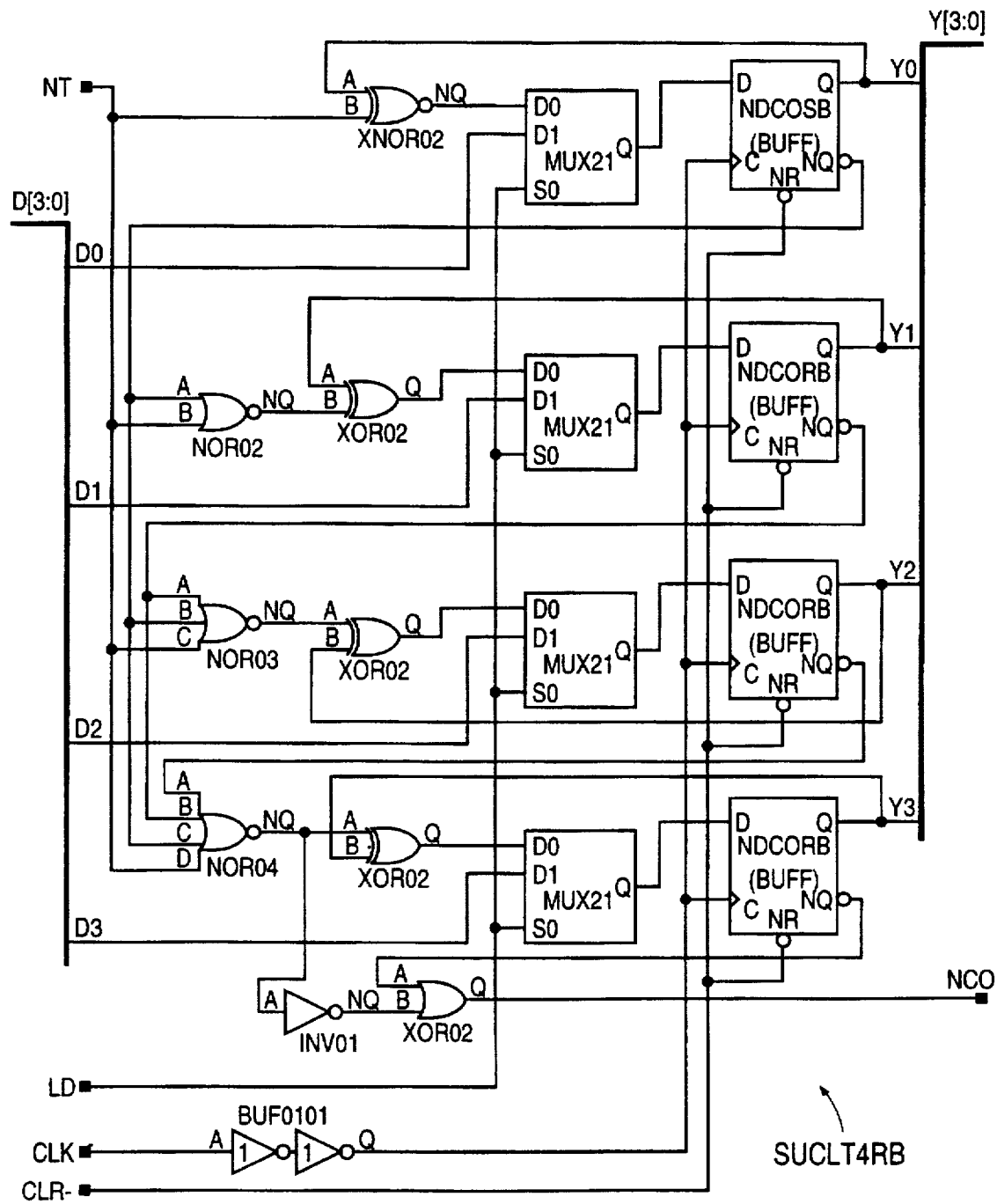
FIG. 12 is a detailed schematic diagram of element SUCLT4RB of FIG. 11.
Figure 13:
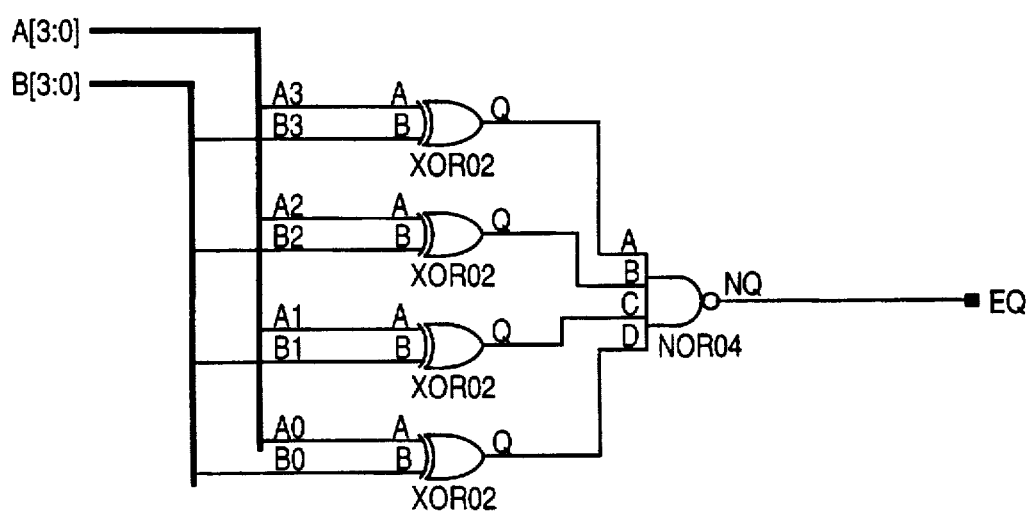
FIG. 13 is a detailed schematic diagram of element CMP4 of FIG. 11.

Line SECEQMAX from sector number counter 710 is an input line to head number counter 720. When there is a pulse on line UPDATE and the signal on line SECEQMAX is high, head number counter 720 increments its value by one. When there is a pulse on line UPDATE, the signal on line SECEQMAX is high and head number counter has the value of the maximum head number so that the signal line HEADEQMAX is high, head number counter wraps back to a value of zero. A more detailed schematic diagram of one embodiment of head number counter 720 is presented in FIGS. 11, 12, and 13.

Figure 14:
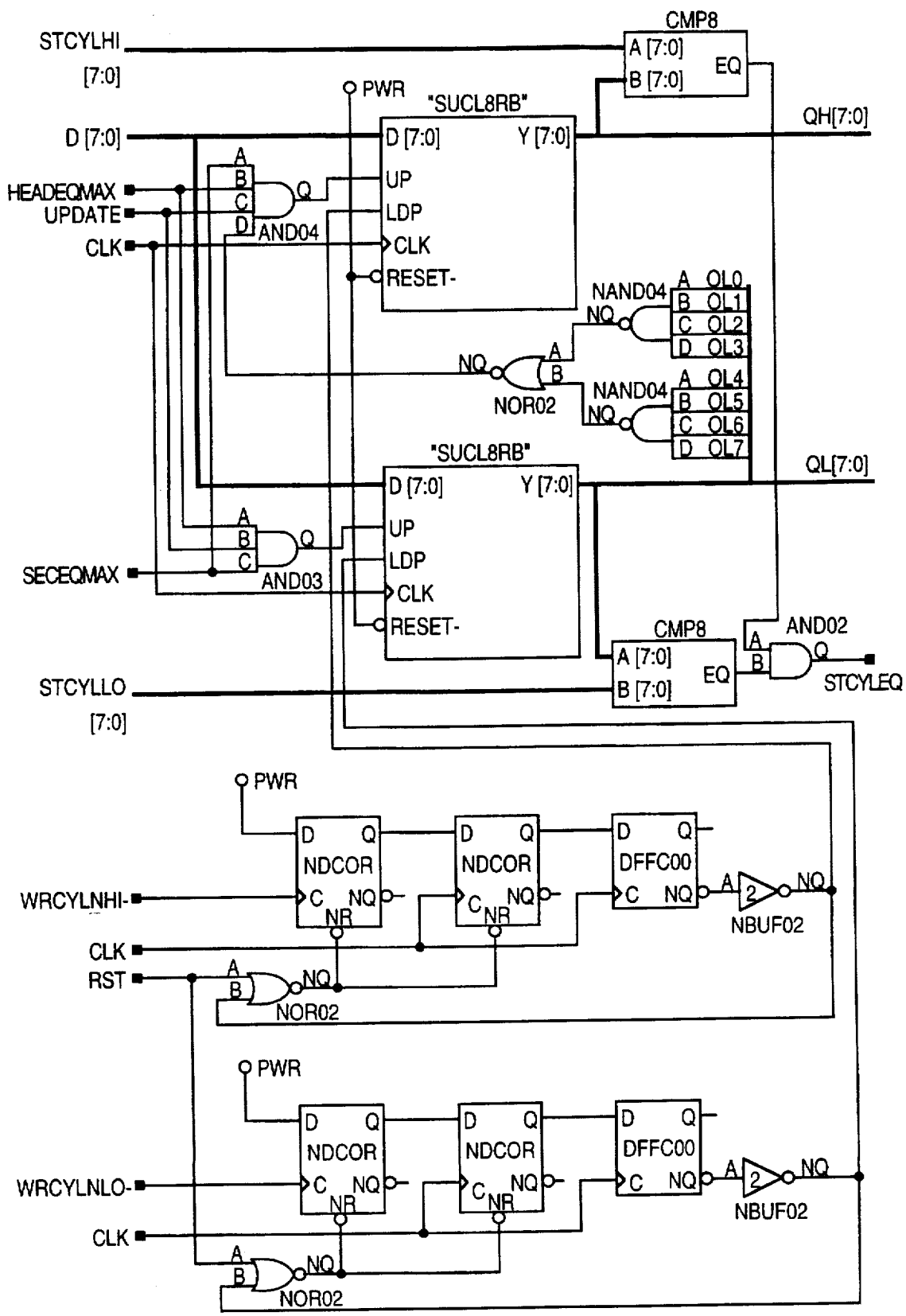
FIG. 14 is a more detailed schematic diagram of the cylinder number counter of this invention.
Figure 15A:
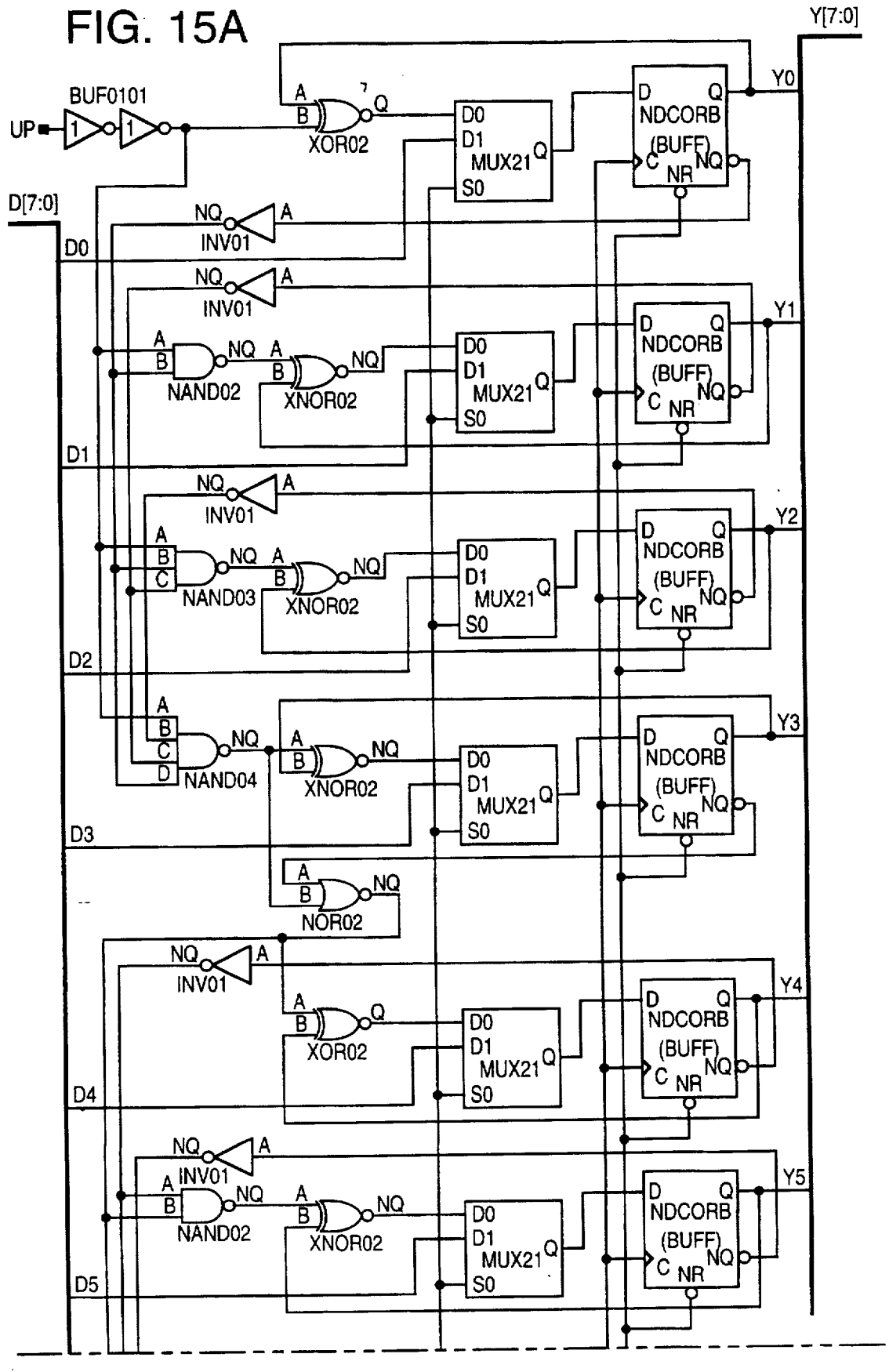
FIG. 15 is a key to FIGS. 15A and 15B which are a more detailed schematic diagram of element SUCL8RB of FIG. 14.
Figures 15, 15B:
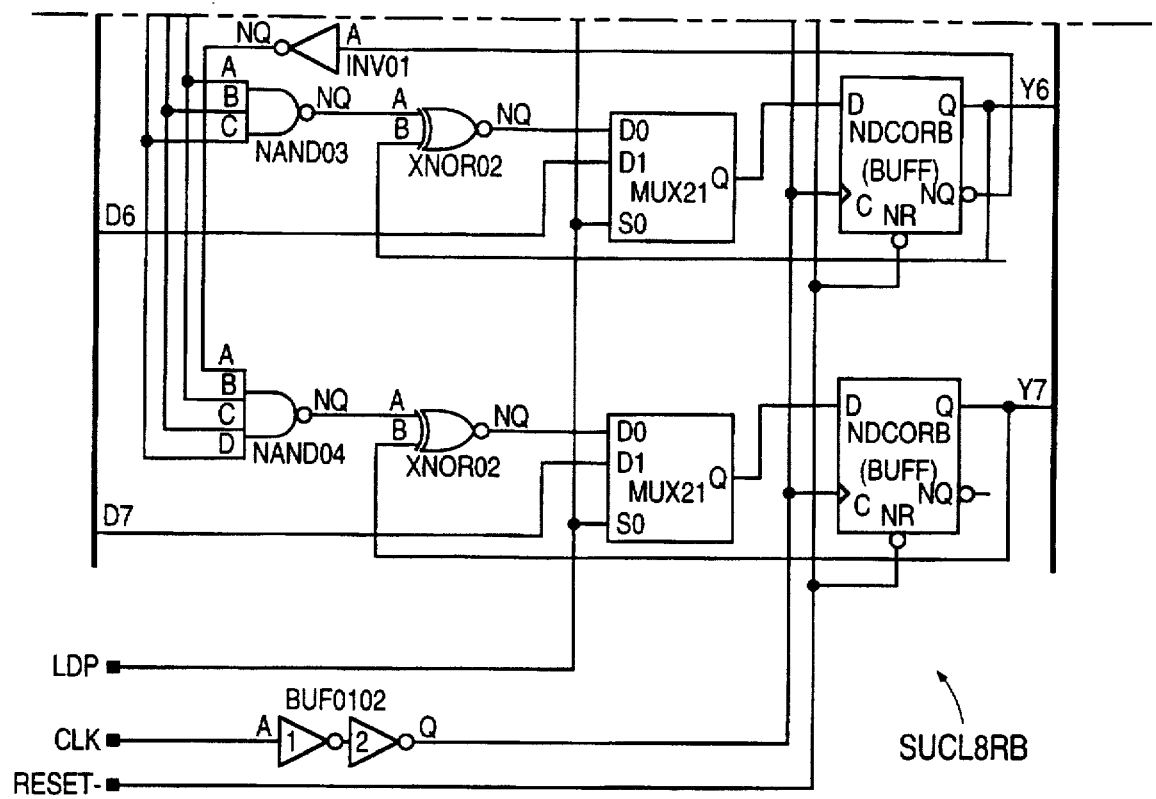

Cylinder number register 730 (FIG. 7A) includes a sixteen bit up counter which in one embodiment is two eight bit cylinder number up counters. Each eight bit counter includes each of the input lines described above for counter 600 where line LOAD of counter 600 is line WRCYLNHI- for the high bits of the cylinder address and line WRCYLNLO- for the low bits of the cylinder address. Of course, a single set of lines CLK, D, RST and UPDATE is used to drive both cylinder number counters 730. Line SECEQMAX from sector number counter 710 is an input line to cylinder number counters 730 as is line HEADEQMAX from head number counter 720. The two eight bit output busses from cylinder number counters 730 provide the high and low bits of the cylinder address, respectively. When the signals on lines SECEQMAX and HEADEQMAX are high, and a pulse occurs on line UPDATE, cylinder address counter 730 is incremented. A more detailed schematic diagram of one embodiment of counter 730 is presented in FIGS. 14 and 15.

Figure 7A:
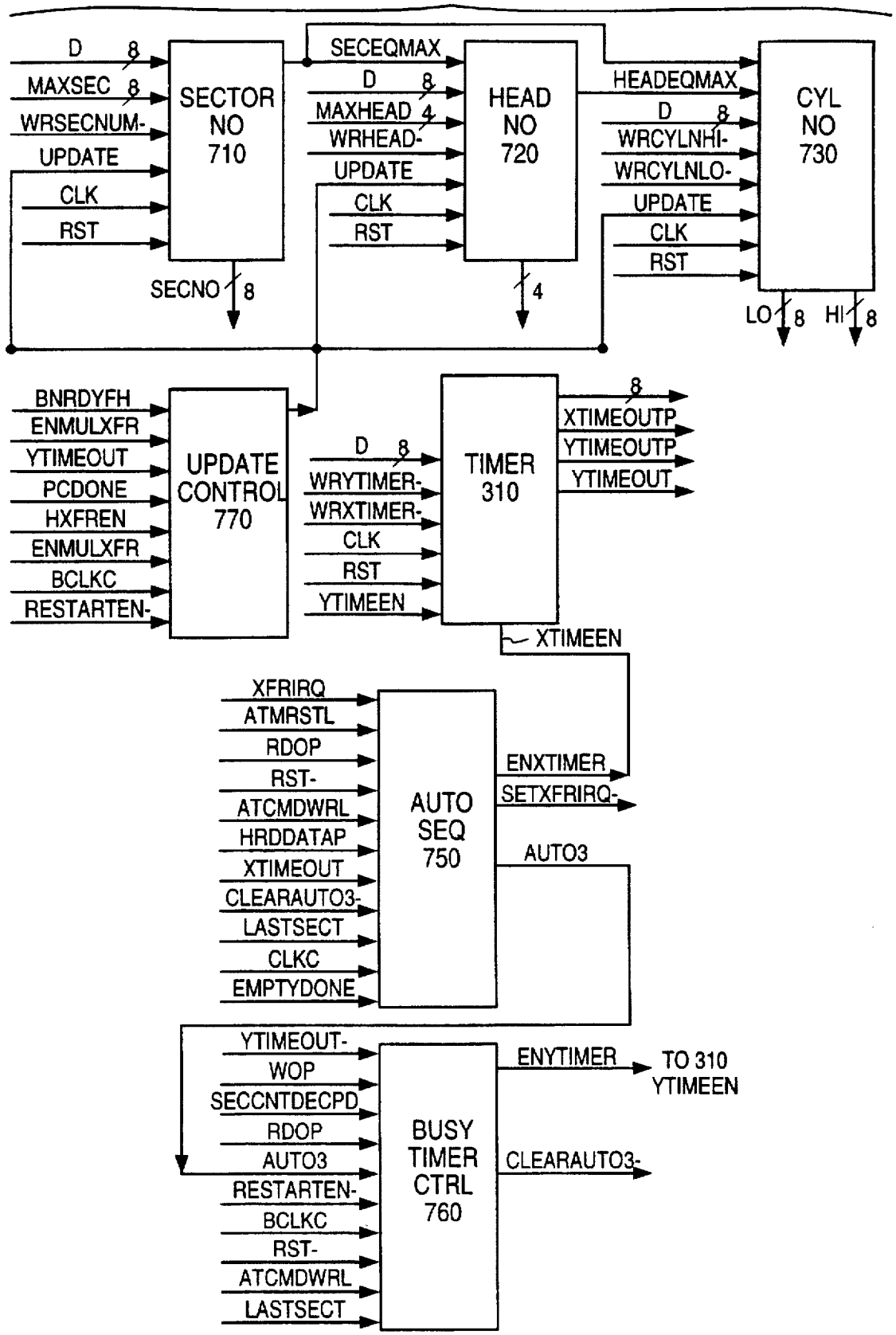
FIGS. 7A and 7B are a more detailed block diagram of the logic circuits, counters, registers and memory units used in the automatic read and automatic write hardware sequencers of this invention.
Figure 7B:
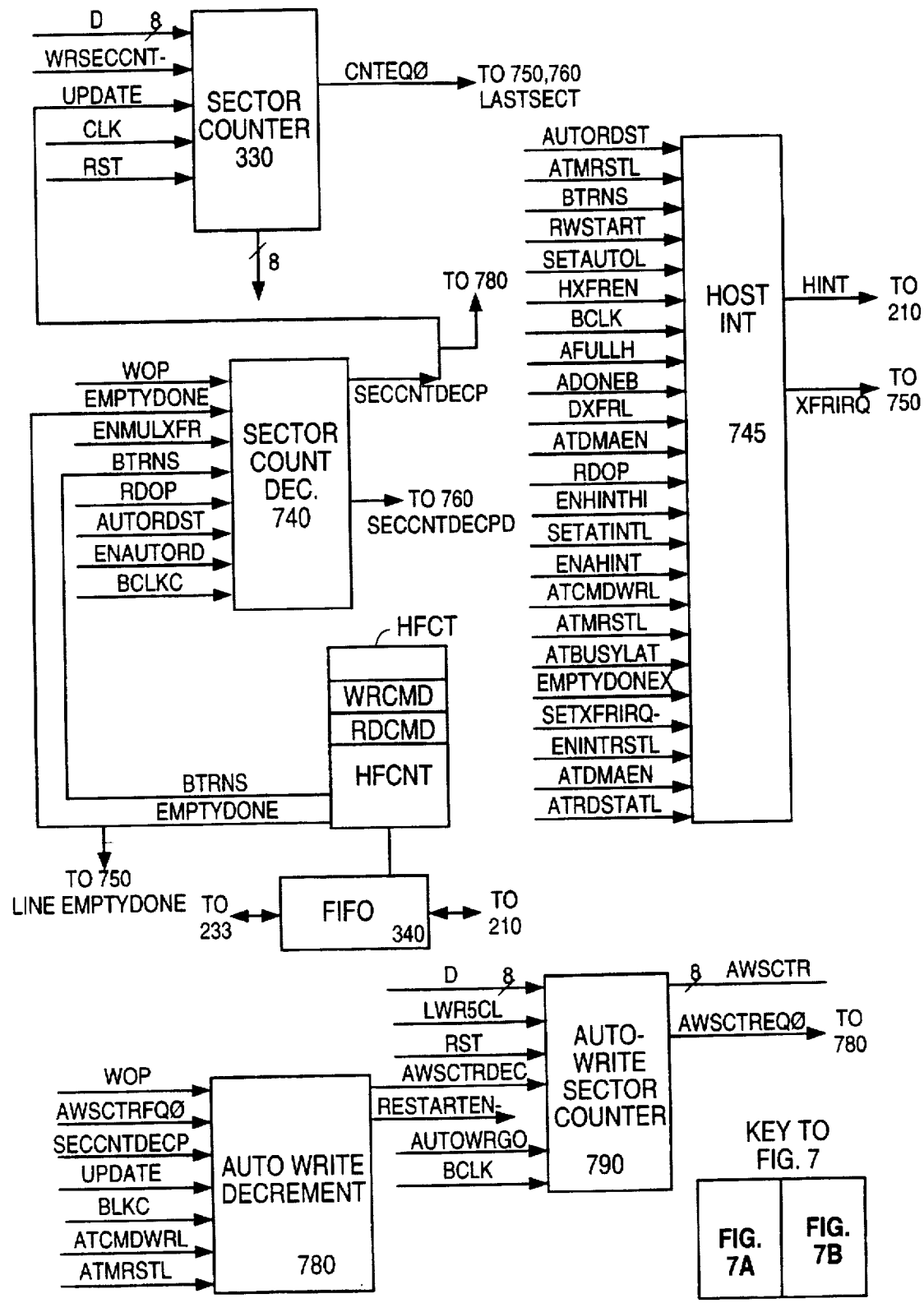
Figure 16:
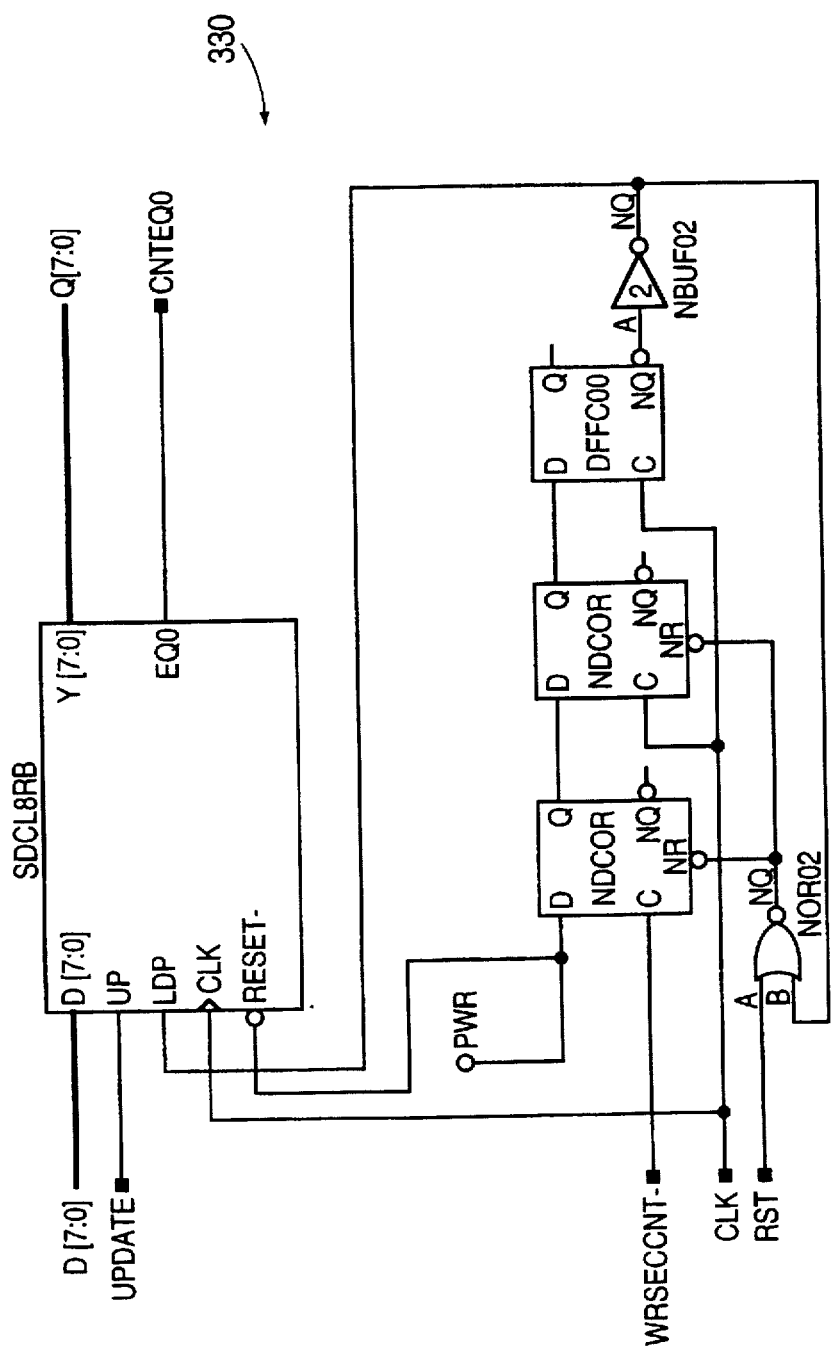
FIG. 16 is a detailed schematic diagram of the sector counter of this invention.
Figure 17A:
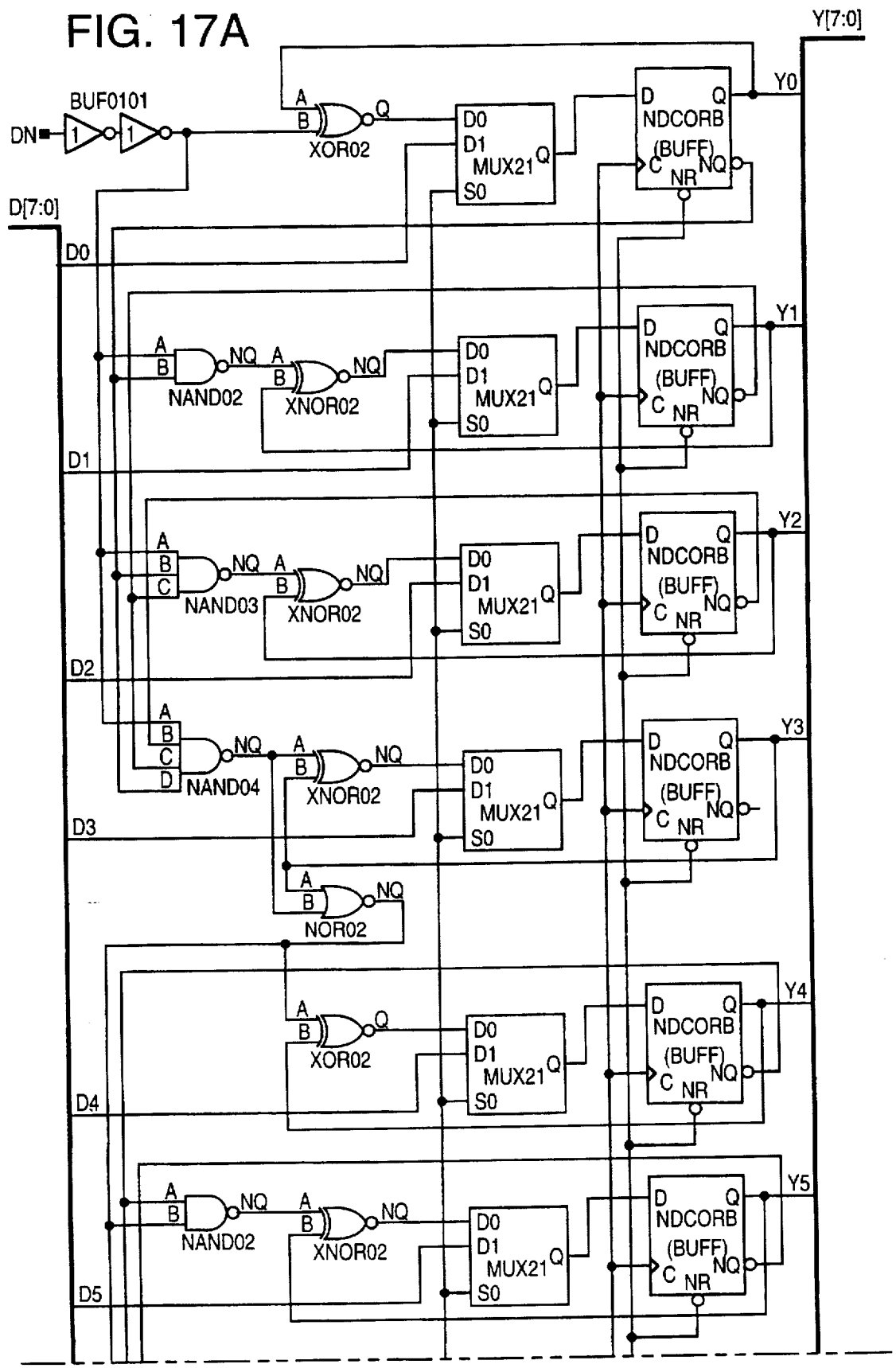
FIG. 17 is a key to FIGS. 17A, 17B and 17C which are a more detailed schematic diagram of element SDCL8RB of FIG. 16.
Figure 17B:
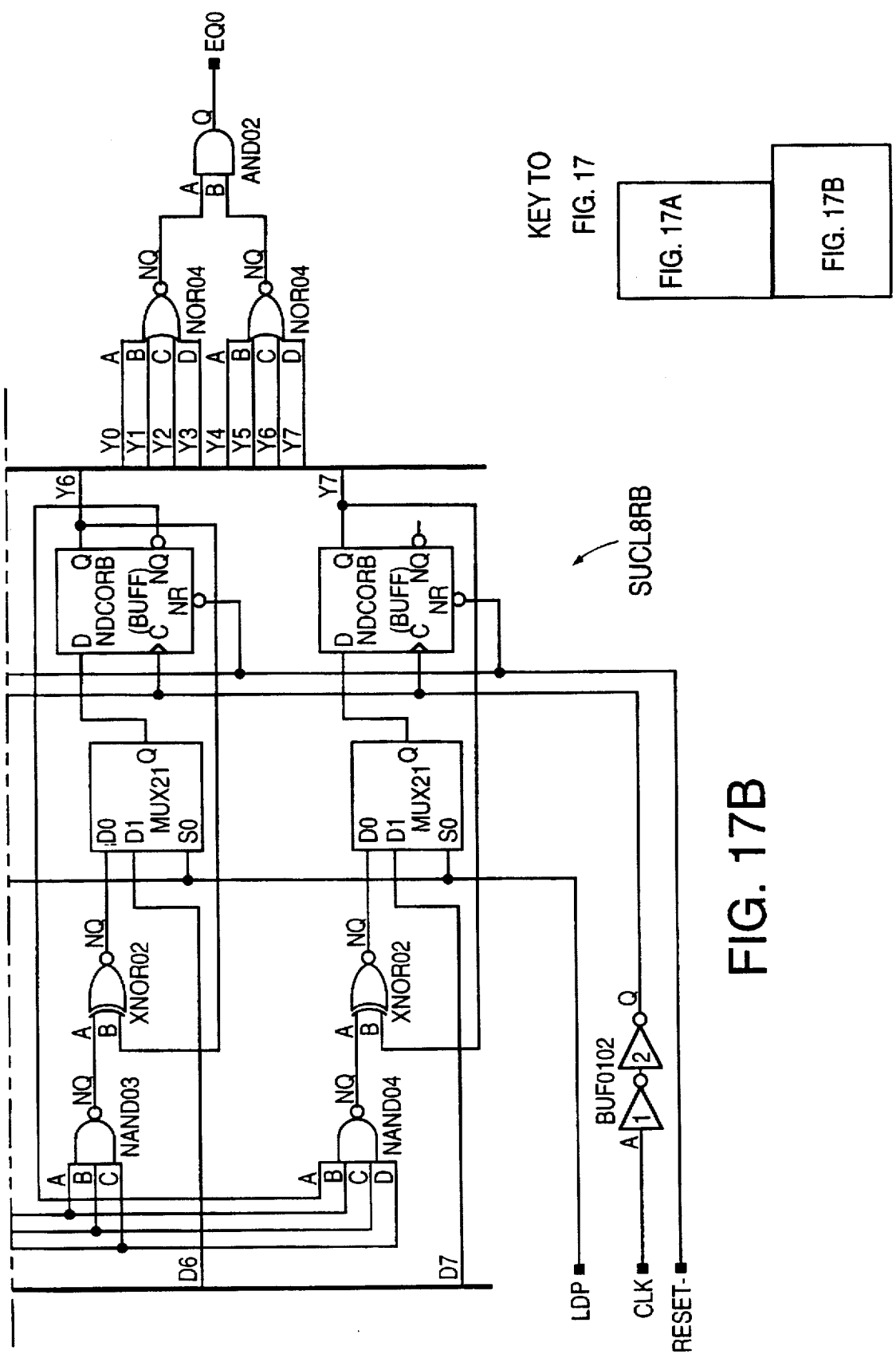

A more detailed block diagram of sector counter 330, which in this embodiment is a decrementing counter, is presented in FIG. 7B. Sector counter 330 is loaded with the number of sectors to be transferred between disk drive 220 and host computer 210 in a manner similar to that described for counter 600. Line WRSECCNT- is used to load counter 330 with the number of sectors to be transferred between host computer and disk drive. The operation of counter 330 is similar to that described above except when the pulse occurs on line UPDATE, counter 300 is decremented by one. A more detailed schematic diagram of one embodiment of sector counter 330 is presented in FIGS. 16 and 17.

As described above, the maximum number of sectors in a track and the maximum head number are programmed in a maximum sector number register and a maximum head number register respectively by microprocessor 221 during power-up of disk drive 220. Computer bus interface circuit 234 of this invention includes a host interrupt time register HINTTIME and a busy time register BUSYTIME. Upon power-up, microprocessor 221 loads register HINTTIME with the first predetermined time value and register BUSYTIME with the second predetermined time value.

Computer bus interface circuit 234 also includes a host FIFO count register HFCT (FIG. 7A) that includes a bit WRCMD that is set to one to indicate that the host command register in the task file contains a write sector command. Another bit RDCMD is set to one when the host command register contains a read sector command. The host command register in the task file holds the latest command issued to the storage controller circuit 230 by host computer 210. Five bits HFCNT of register HFCT indicate the number of bytes remaining in sixteen byte FIFO circuit 340. A value of zero in bits HFCNT indicates that the FIFO memory is empty and a value of 10h indicates that the FIFO memory is full.

In the initialization process for an automated read operation, the first predetermined value and the second predetermined value are latched in timer 310. Subsequently, in the initialization process for automatic read cycle 400, microprocessor 221 sets a bit ENMULTFR in a host mode control register HMODECTL which in turn drives a signal on line ENMULXFR and a bit ENAUTORD in register HMODECTL which in turn drives a signal on line ENAUTORD high. Host computer 210 loads the registers in the task file, i.e. sector number counter 710, head number counter 720, and cylinder number counters 730 as well as sector counter 330, and the other registers as described above.

Upon issuance of the read sector command by computer 210, the command is stored in the host command register in the task file and consequently bit RDCMD in register HFCT is set to one. As explained above and incorporated herein by reference, storage controller circuit 230 has a look-ahead feature and may have stored data in RAM buffer 222. The initial geometric address for the data in RAM buffer 222 is stored in registers START. Comparators in circuit 234 compare the signals in registers START with the values loaded in the geometric address task files of computer bus interface circuit 234. If there is a match, a signal is generated that starts the automated read sequence. Specifically, a pulse is generated on line AUTORDGO from computer bus interface circuit 234 to buffer control circuit 233. In response to the pulse on line AUTORDGO, buffer control circuit 233 sets the signal on host port enable line HPEN high and the signal on host port write line HPWT low. The high signal on line HPEN is start step 401.

If there is not a match between the values in registers START and the geometric address task files, microprocessor 221 disables signal ENAUTORD and initiates transfer of the requested sector of data from disk 240 to buffer memory 222. When buffer memory 222 contains more than one sector of data, microprocessor 221 sets the signal on line HPEN high.

The high signal on HPEN also causes the signal on line BTRNS to go high. The signals on lines WOP and HPWRT are low. The signal on line RDOP is the complement of the signal on line HPWRT. Thus, the signal on line RDOP is high. Since the signals on lines BTRNS, ENMULXFR, and RDOP to sector count decrement circuit 740 (FIG. 7B) are all high, the next clock pulse on line BCLKC, which is a buffered buffer clock signal, generates a pulse by sector decrement circuit 740 on line SECCNTDECP that in turn decrements sector counter 300. Thus, step 402 in hardware automated read process 400 is completed.

Figure 18:
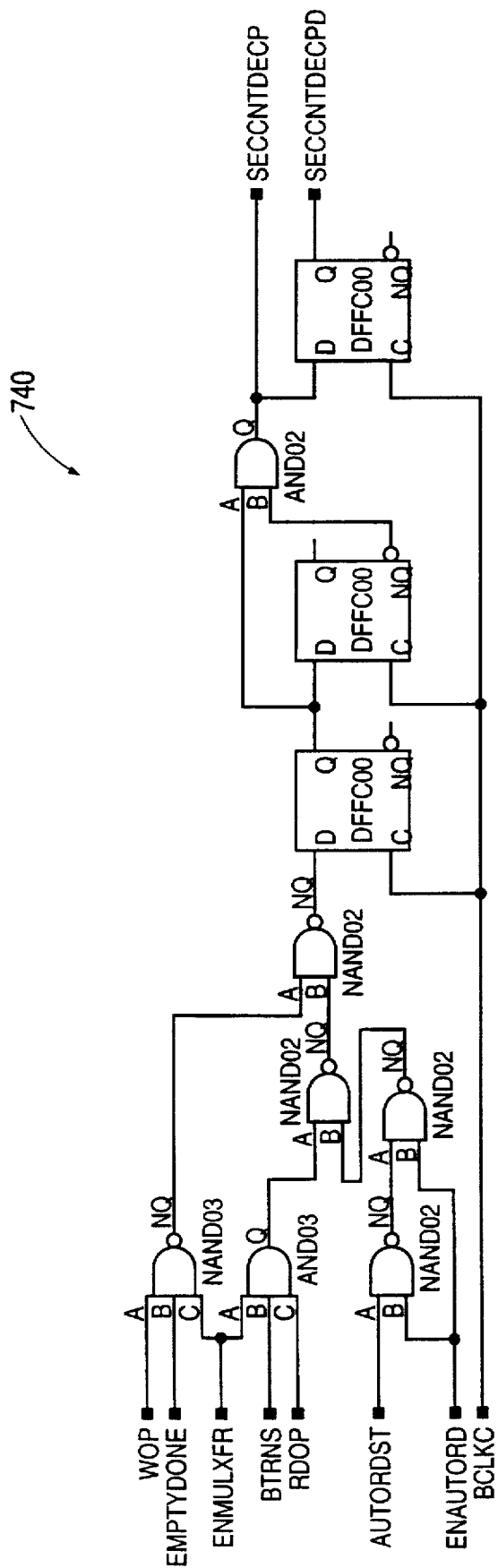
FIG. 18 is a detailed schematic diagram of the sector count decrement circuit of this invention.

A more detailed schematic diagram of sector count decrement circuit 740 is presented in FIG. 18. Briefly, the signal on input line ENMULXFR goes high to enable automatic multi-sector transfers. The signal on input line BTRNS is driven high by the signal on line HPEN for the initial read operation and for subsequent sectors is high when data is ready for transfer in FIFO circuit 340. The signal on line RDOP is high when an automatic read operation is being performed and the signal on line WOP is high when an automatic write operation is being performed. The signal on line EMPTYDONE is high when FIFO circuit 340 is empty and the sector transfer is complete. The signal on line EMPTYDONE is used in both read and write operations, but sector count decrement circuit 740 uses the signal only in the automatic write operation. Line BCLKC carries the buffered buffer clock signal. Output line SECCNTDECP provides a sector count decrement pulse and line SECCNTDECPD provides a delayed sector count decrement pulse.

In response to the signal going high on line BTRNS and the signal on host FIFO available line HFAVAIL from FIFO circuit 340 being high, data is transferred from RAM 222 to FIFO circuit 340, i.e., data is prefetched into FIFO circuit 340. Bit DRQ is always set as data is transferred into FIFO circuit 340. Since bit BUSY is the complement of bit DRQ, bit BUSY is reset. Thus step 403 in the hardware automated read sequence has been completed.

Figures 1, 19A:
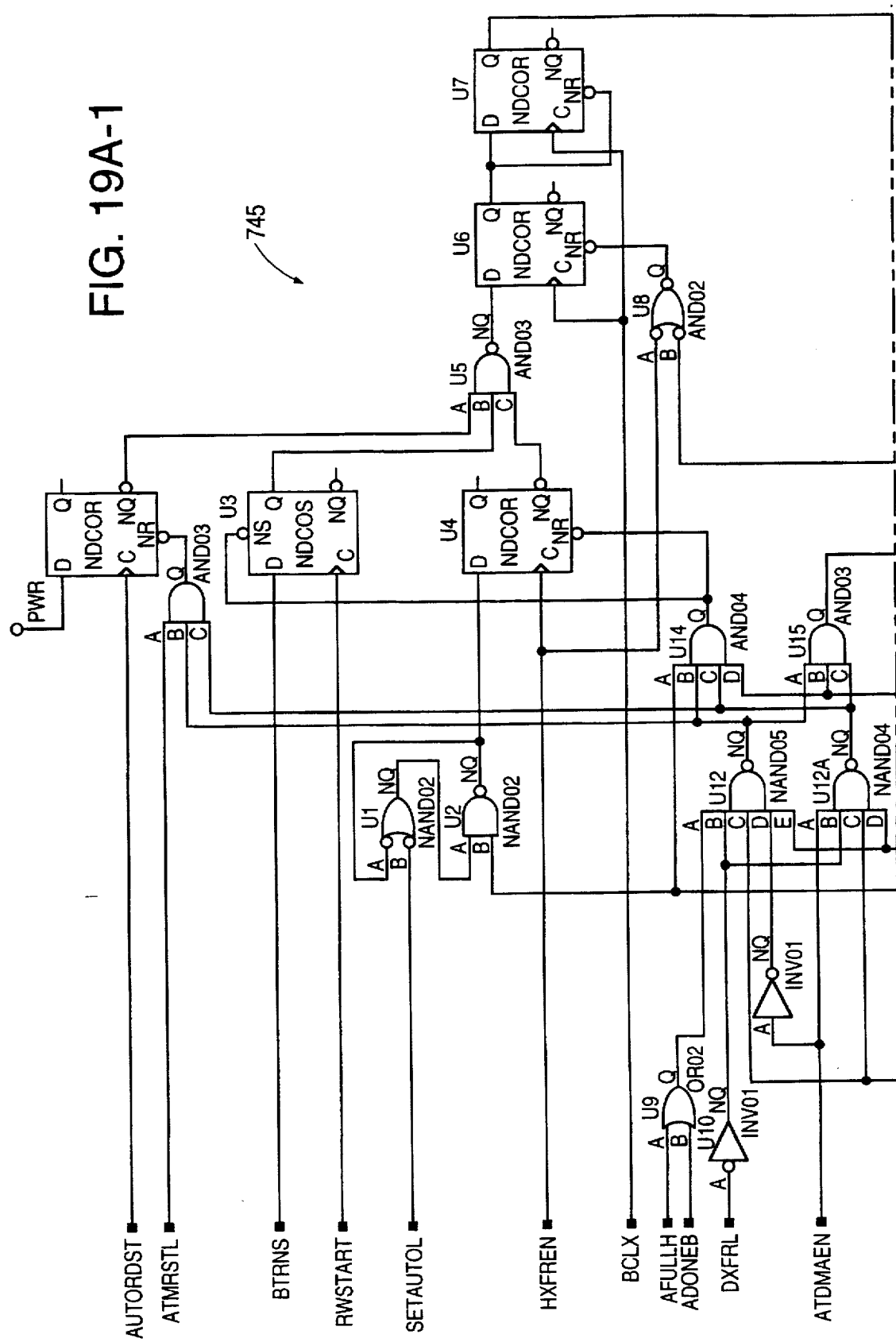
FIG. 19(A), which is a key to FIGS. 19A-1 and 19A-2, and 19B are a detailed schematic diagram of the host computer interrupt generation circuit of this invention.
Figures 2, 19A:
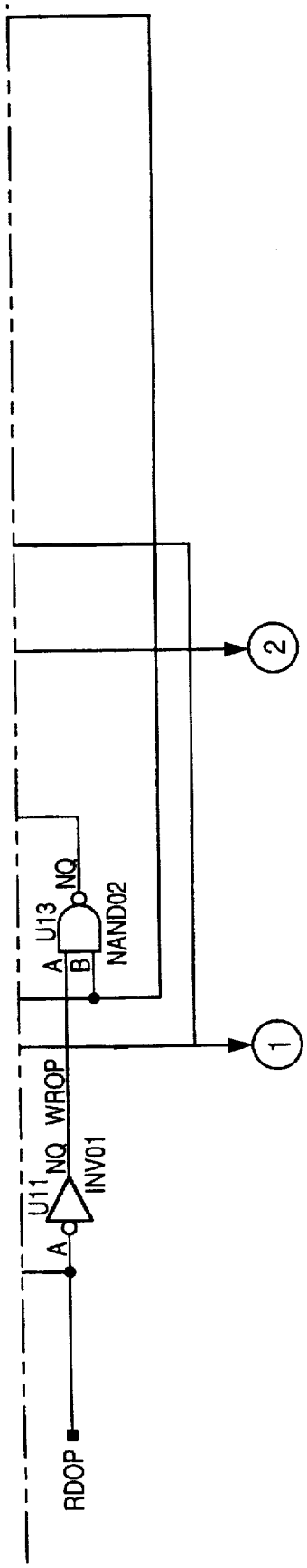
Figure 19B:
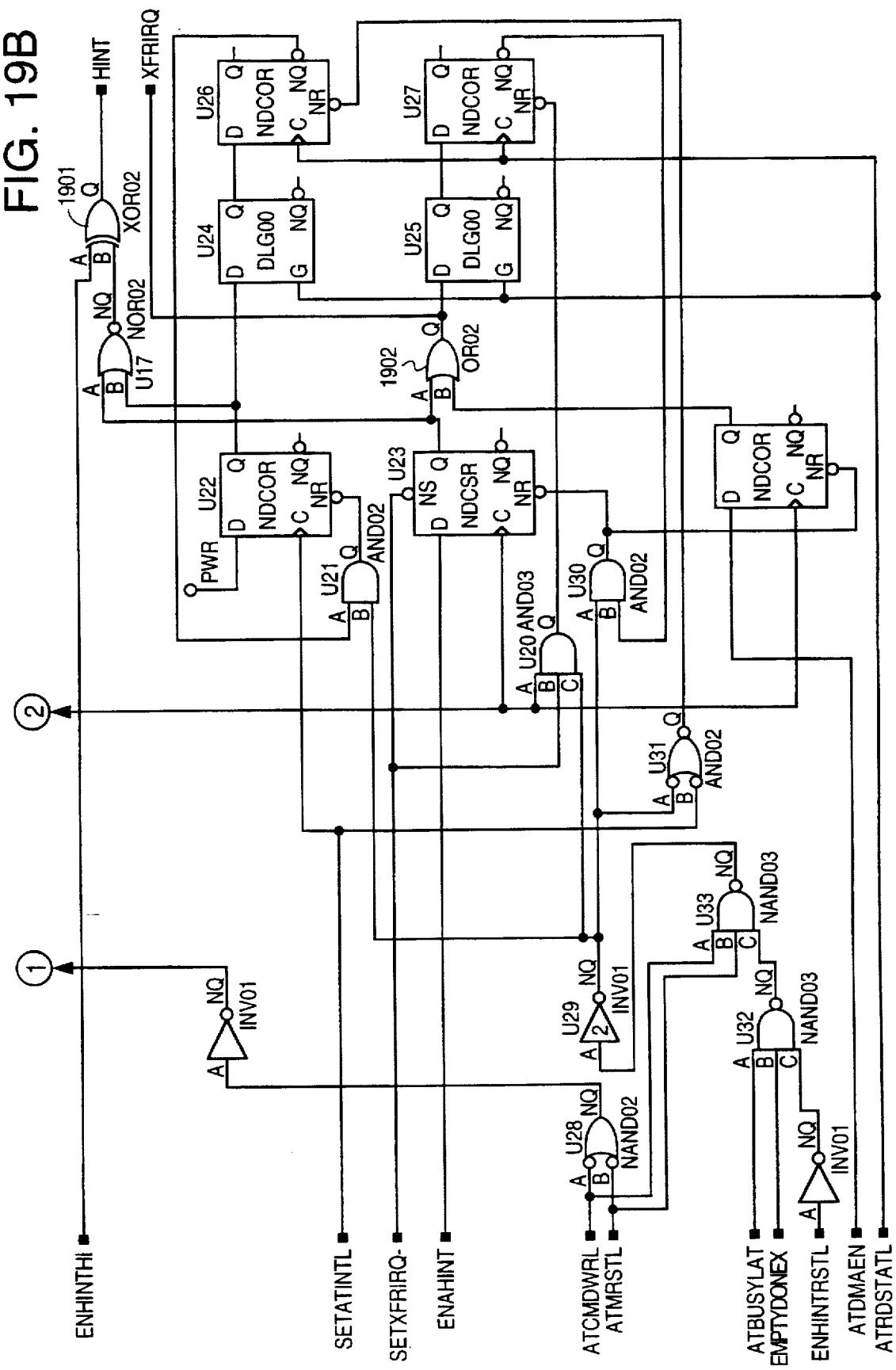

The signals on input lines DXFRL, HXFREN and AFULLH to host computer interrupt generation circuit 745 (FIG. 7B) generate a clock pulse that clocks the high signal on input line ENAHINT through a flip-flop U23 (FIG. 19B) which in turn drives a signal on output line XFRIRQ high (FIGS. 7B and 19B). In addition, the high signal on input line ENHINTHI drives a first input terminal of an Exclusive OR gate 1901. The signal from flip-flop U23 drives NOR gate U17 (FIG. 19B) which in turn drives another input terminal of Exclusive OR gate 1901. The high output signal of Exclusive OR gate 1901 drives the signal on output line HINT (FIGS. 7B and 19B) high.

A more detailed schematic for host computer interrupt generation circuit 745 (FIG. 7B) is illustrated in FIGS. 19A and 19B. Input line AUTORDST is the auto read start line. A high signal is set on line AUTORDST at the same time the pulse is generated on line AUTORDGO. The signal on line AUTORDST is a status signal. Host computer master reset line ATMRSTL is active low. The signals on line BTRNS were described above. The signal on read/write start input line RWSTART is a one clock tick wide pulse and is transmitted at the start of each sector transfer, either a read sector transfer or a write sector transfer. The signal on set auto low input line SETAUTOL goes low when host computer 221 issues a write command to disk drive 220. The input signal on line HXFREN is a buffered signal of the signal on host port enable line HPEN. The signal on line BCLK is the buffer clock signal.

Almost full input line AFULLH is a line from FIFO circuit 340. The signal on line AFULLH indicates that the FIFO memory is almost full. In the embodiment where the FIFO memory is a 16 byte FIFO memory, the signal on line AFULLH goes high when there are 14 bytes loaded in the FIFO memory. Input line ADONEB carries the almost done signal, which means that the sector transfer is almost complete from buffer memory 222 to FIFO circuit 340. The signal on line ADONEB typically goes high when about 511 bytes of a 512 byte sector have been transferred to FIFO circuit 340 from buffer memory 222. Input line DXFRL is from buffer control circuit 233. The signal on line DXFRL is active low and a pulse is generated on this line by buffer control circuit 233 each time a byte is transferred from RAM 222 to the FIFO circuit 340. Input line ATDMAEN is not used in this invention. The signal on line ATDMAEN is normally low during the operations described herein. The signal on line RDOP was described above.

Input line ENHINTHI (FIG. 19B) is driven by a bit ENHINTHI that is set by microprocessor 221 during power-up of disk drive 220. Bit ENHINTHI determines the polarity of the host computer interrupt. If the bit is low, the host computer interrupt is active low and conversely. In this embodiment, bit ENHINTHI is set high. Input line SETATINTL, which is active low, is not used with this invention. However, if it becomes necessary for microprocessor 221 to send a host computer interrupt, the signal on this line is set low and then high. Line SETXFRIRQ- is driven by auto-sequencer 750, which is described more completely below. The signal on line ENAHINT is driven by a bit in one of the registers controlled by microprocessor 221. This bit is used to enable the host computer interrupt. The signal on input line ATCMDWRL is active low when the host computer issues a read or a write command. Line ATMRSTL was described above. Input line ATBUSYLAT is a latched signal that is driven by the busy register which also drives signal BUSY described above. The signal on line EMPTYDONEX goes high when FIFO circuit 340 is empty and the sector transfer is complete.

The signal on input line ENHINTRSTL is driven by a bit that is programmed by microprocessor 221. If the bit is set high, clearing of the host computer interrupt at the end of the transfer of a sector of data is disabled. If the bit is set low, i.e. the signal on line ENHINTRSTL is low, the host computer interrupt is automatically cleared at the end of the transfer of a sector of data. Input line ATDMAEN was described above. The signal on input line ATRDSTATL goes low when host computer 210 reads the status and the low signal resets the signal on line HINT to a low value. Output line HINT carries the host computer interrupt signal to host computer 210. Output line XFRIRQ is an internal interrupt signal for computer bus interface circuit 234.

Therefore, more specifically in step 404, the signals on input lines SETAUTOL (FIG. 19A) and ATMRSTL (FIG.

19B) are both high. When host computer 210 issues a read command, the signal on line ATCMDWRL goes low and returns to a high level. Consequently, the latch formed by two NAND gates U1 and U2 (FIG. 19A) has a high output signal. The output signal from the latch formed by NAND gates U1 and U2 drives input terminal D of flip-flop U4. Therefore, when the signal on line HPEN goes high and consequently the signal on line HXFREN goes high, flip-flop U4 is clocked so that the output signal on terminal NQ goes low.

The low output signal from flip-flop U4 drives the output signal from NAND gate U5 high. After two clock ticks on line BCLK, the high signal from NAND gate U5 has been clocked through flip-flop U6 and flip-flop U7 so that a high signal is on output terminal Q of flip-flop U7. The output signal from NAND gates U13 is held at a high level during the read operation. The output signal from NAND gate U12A is held high by the low signal on line ATDMAEN.

The high output signal from flip-flop U7 is applied to a fifth input terminal of NAND gate U12. The low signal on line ATDMAEN is inverted and holds a fourth of the input terminals of NAND gate U12 high and the signal on input line RDOP holds a third of the input terminals of NAND gate U12 high. When a byte is transferred from buffer RAM 222 to FIFO circuit 340, the signal on line DXFRL goes low. This low signal is inverted and the inverted signal holds a second input terminal of NAND gate U12 high. The first input terminal of NAND gate U12, which is driven by the output signal from OR gate U9, goes high when the signal on line AFULLH from FIFO circuit 340 goes high.

When all the input signals to NAND gate U12 are high, the output signal goes low. The input signals to AND gates U14 and U15 are initially all high. However, when the signal from NAND gate U12 goes low, the output signals from AND gates U14 and U15 are driven low. Therefore the signal on the clock line to flip-flop U23 (FIG. 19B) goes low.

The low signal from AND gate U14 resets flip-flop U4 which drives the signal on output terminal NQ of flip-flop U4 high. The high signal from flip-flop U4 drives the output signal of NAND gate U5 low. Consequently, following a path similar to that just described, the low signal is clocked through flip-flops U6 and U7 so that a low signal is applied to the fifth input terminal of NAND gate U12 which in turn drives the output signal from NAND gate U12 high. Accordingly, the output signals from AND gates U14 and U15 go high. The high signal from AND gate U15 clocks flip-flop U23 so that the high signal on line ENAHINT is applied to OR gate U902 and NOR gate U17. Consequently, an interrupt is generated on line HINT as described above and incorporated herein by reference. The high signal on line HINT completes step 404 of hardware automated read sequence 400.

The signal on line XFRIRQ from circuit 745 to auto-sequencer circuit 750 (FIG. 7A) starts step 405 of hardware automated read sequence 400. A more detailed schematic of one embodiment of auto-sequencer circuit 750 is provided in FIG. 20. Input line XFRIRQ to circuit 750 carries the internal host interrupt signal. The signal on input line ATMRSTL is active low and is the AT block master reset line. Input line RDOP is the same as described above. The signal on input line RST- is active low and is the power on reset line. Input line ATCMDWRL is the AT command write signal line and is active low. Input line HRDDATAP carries the host read data synchronized pulse. The signal on input line XTIMEOUT is a host interrupt time out pulse from timer 310. Line EMPTYDONE is the same as described above. Input line CLEARAUTO3-, which is active low, carries a signal that is used to clear the signal on line AUTO3. Input line LASTSECT carries a signal that indicates that transfer of the last sector. Input line BCLKC was described above. Output line ENXTIMER enables timer 310 and loads the first predetermined value in the timer. The signal on line SETXFRIRQ- is active low and sets the host computer interrupt in circuit 745 (FIG. 19B). The signal on line AUTO3 is used to enable the busy timer as described more completely below.

The rising edge of the signal on line XFRIRQ from circuit 745 (FIG. 7B) to auto sequencer circuit 750 (FIG. 7A), that starts step 405 of the automated read sequence, clocks flip-flop UD1 (FIG. 20) and so the signal on line AUTO1 goes high. As explained above, host computer 210 may either check the status of drive 220 or start to read data from FIFO circuit 340.

If host computer 210 reads the status, the signal on line ATRDSTATL to host computer interrupt generation circuit 745 (FIGS. 7B and 19B) is a pulse that goes low and then returns to a high level. The falling edge on line ATRDSTATL latches elements U25 and U24 and the rising edge clocks flip-flops U26 and U27. The output signal from flip-flop U27 results in flip-flop U23 being reset which drives the signal on line XFRIRQ low. Similarly, the output signal from flip-flop U26 results in flip-flop U22 being reset. The low signals from flip-flops U22 and U23 drive the output signal of NOR gate U17 high which in turn drives the output signal of Exclusive OR gate 1901 low. Consequently, the host computer interrupt signal on line HINT is reset.

When the signal on line XFRIRQ goes low, auto sequence circuit 750 generates a high signal on line ENXTIMER. Specifically, the low signal on line XFRIRQ drives the output signal of NOR gate U2 (FIG. 20) high. The next two clock ticks on line CLKC clock the output signal of NOR gate U2 through flip-flops UD2 and UD3 respectively. The output signal of flip-flop UD3 drives the signal on line ENXTIMER high.

Figure 21A:
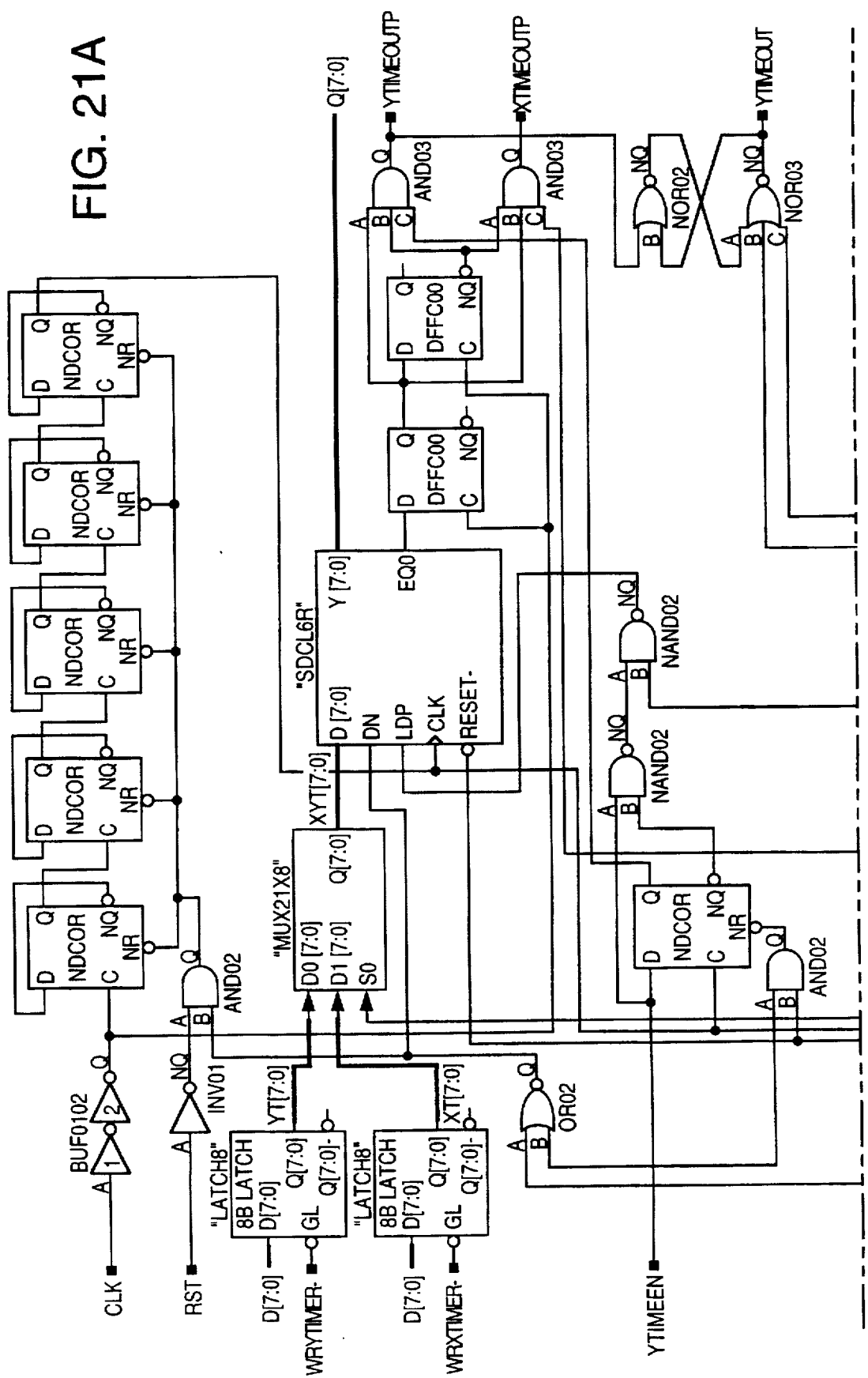
FIG. 21 is a key to FIGS. 21A and 21B, which are a schematic diagram of the timer of this invention.
Figure 21B:
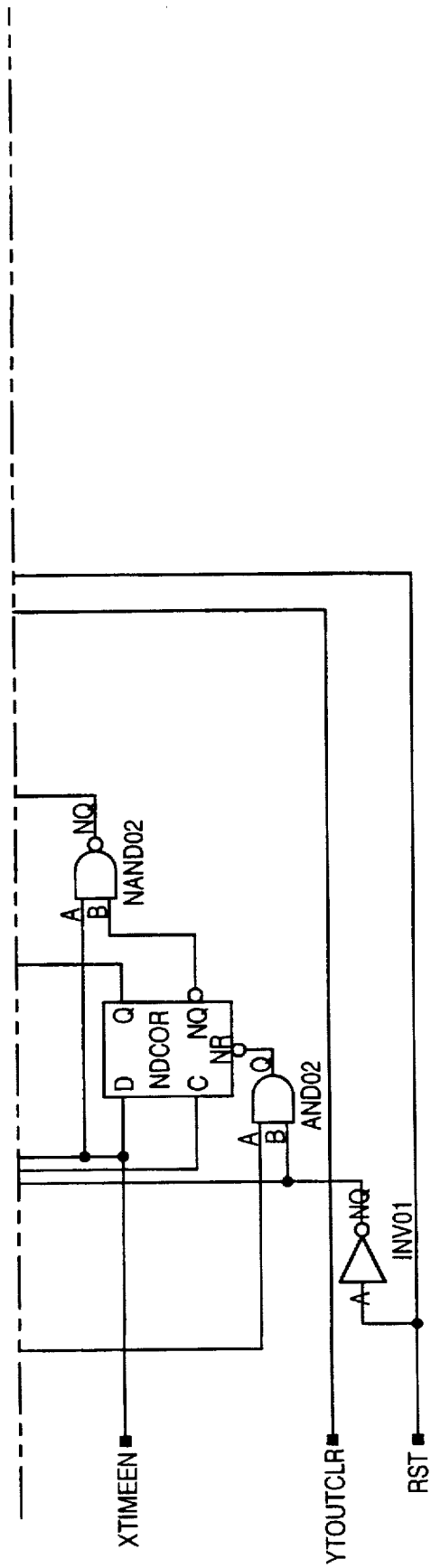
Figure 22A:
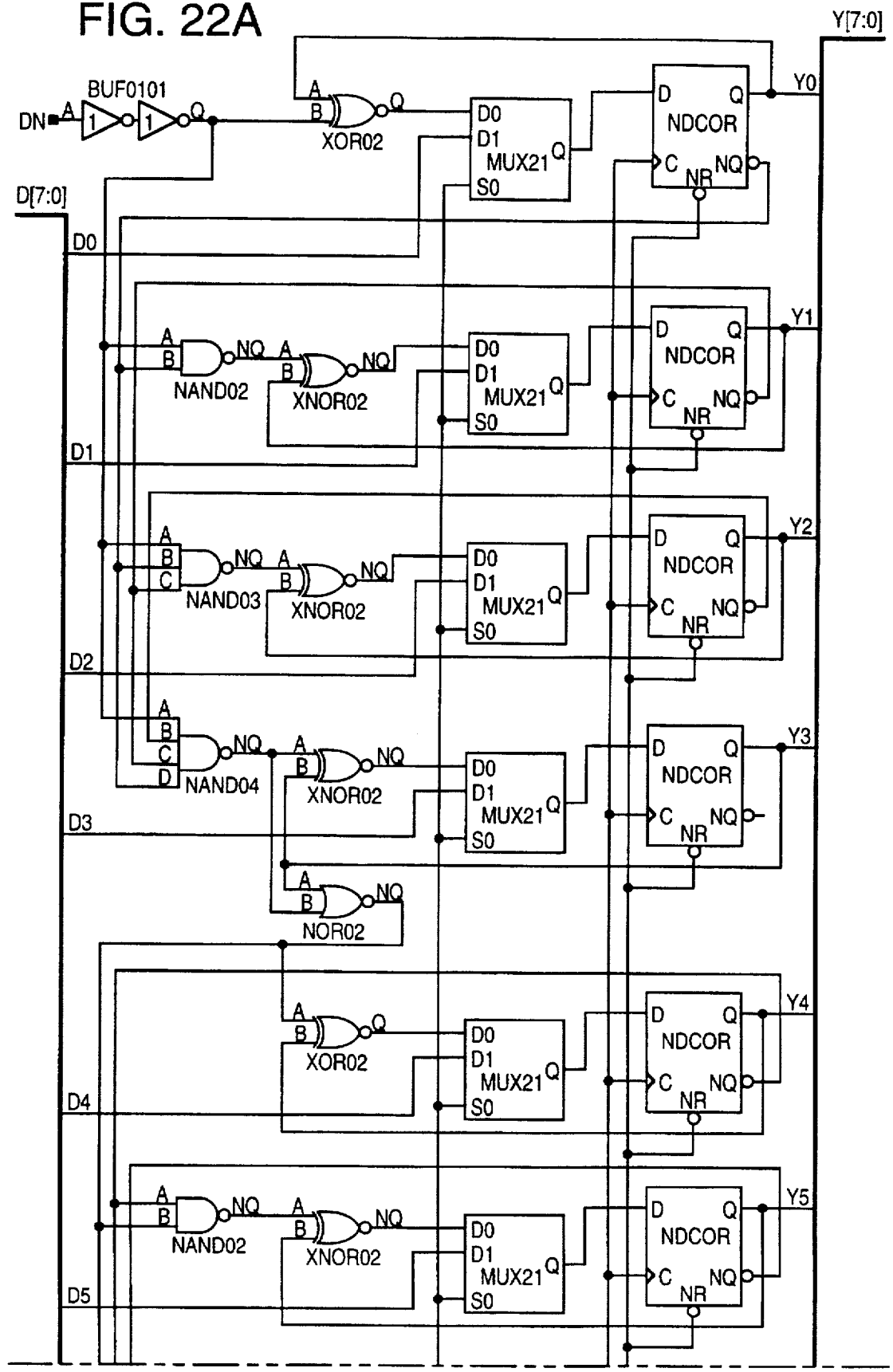
FIG. 22 is a key to FIGS. 22A, 22B and 22C, which are a schematic diagram of element SDCL8R of FIG. 21.
Figure 22B:
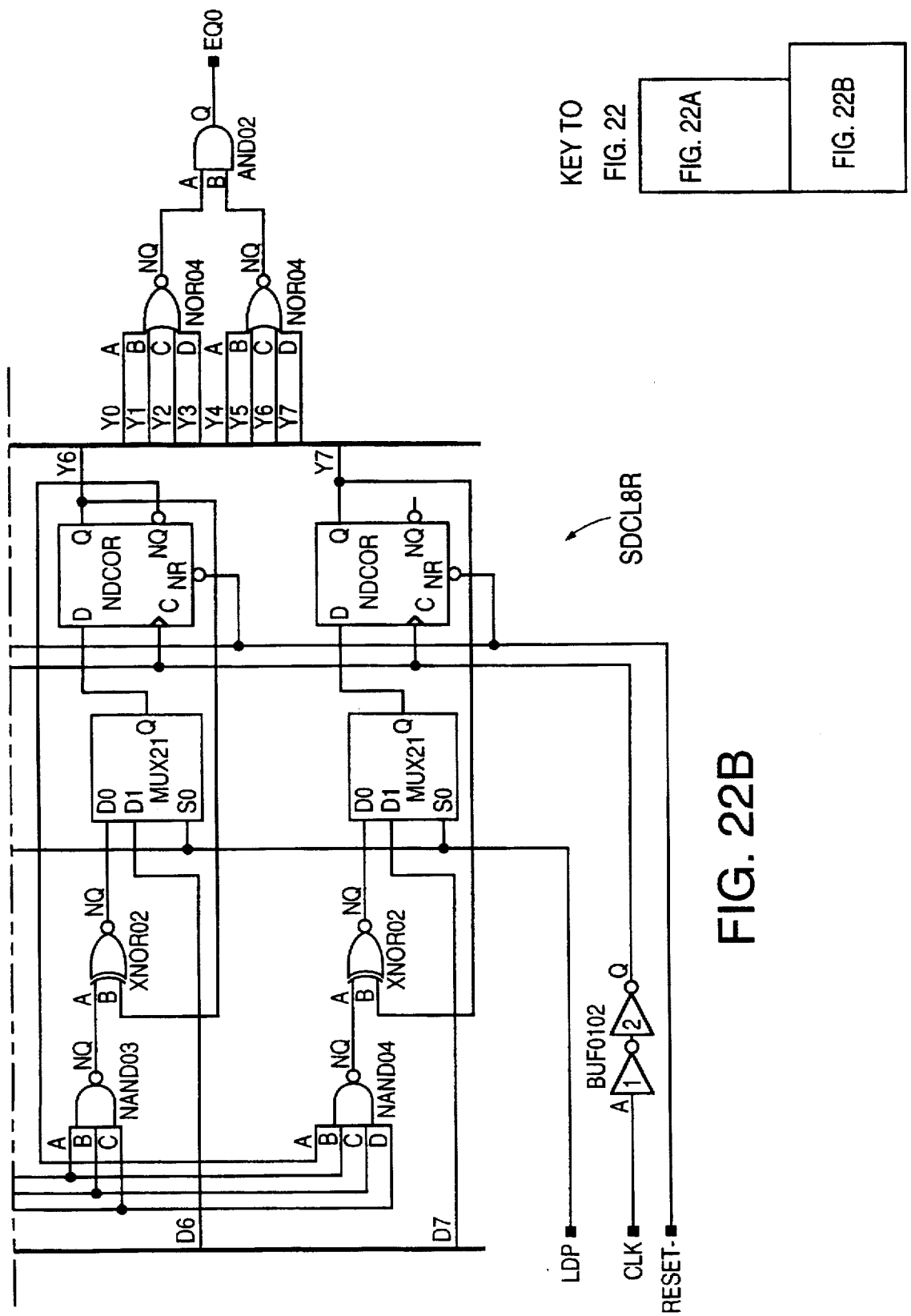
Figure 23:
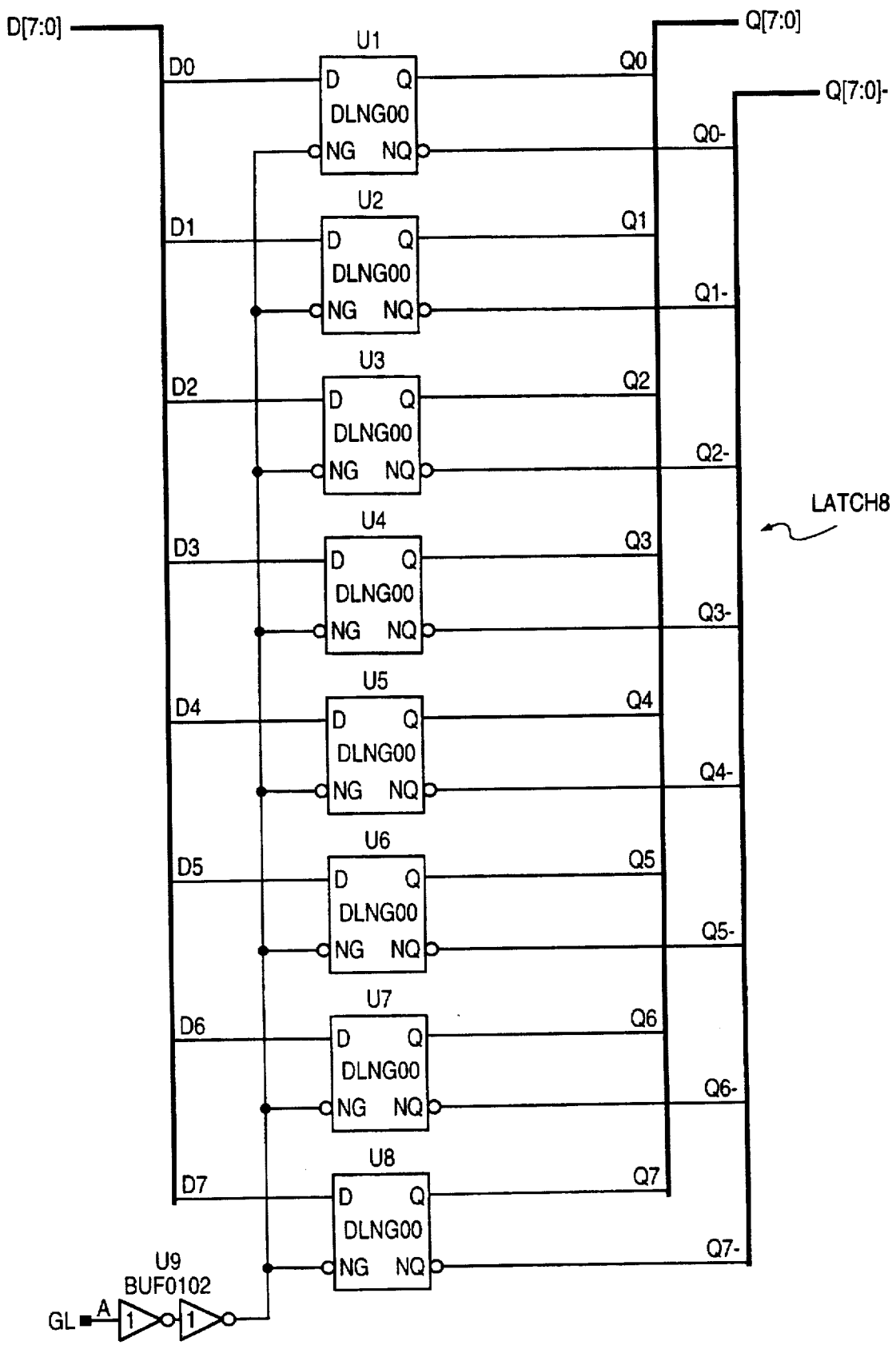
FIG. 23 is a more detailed schematic diagram of latch circuit LATCH8A and LATCH8B, which are identical.
Figure 24:
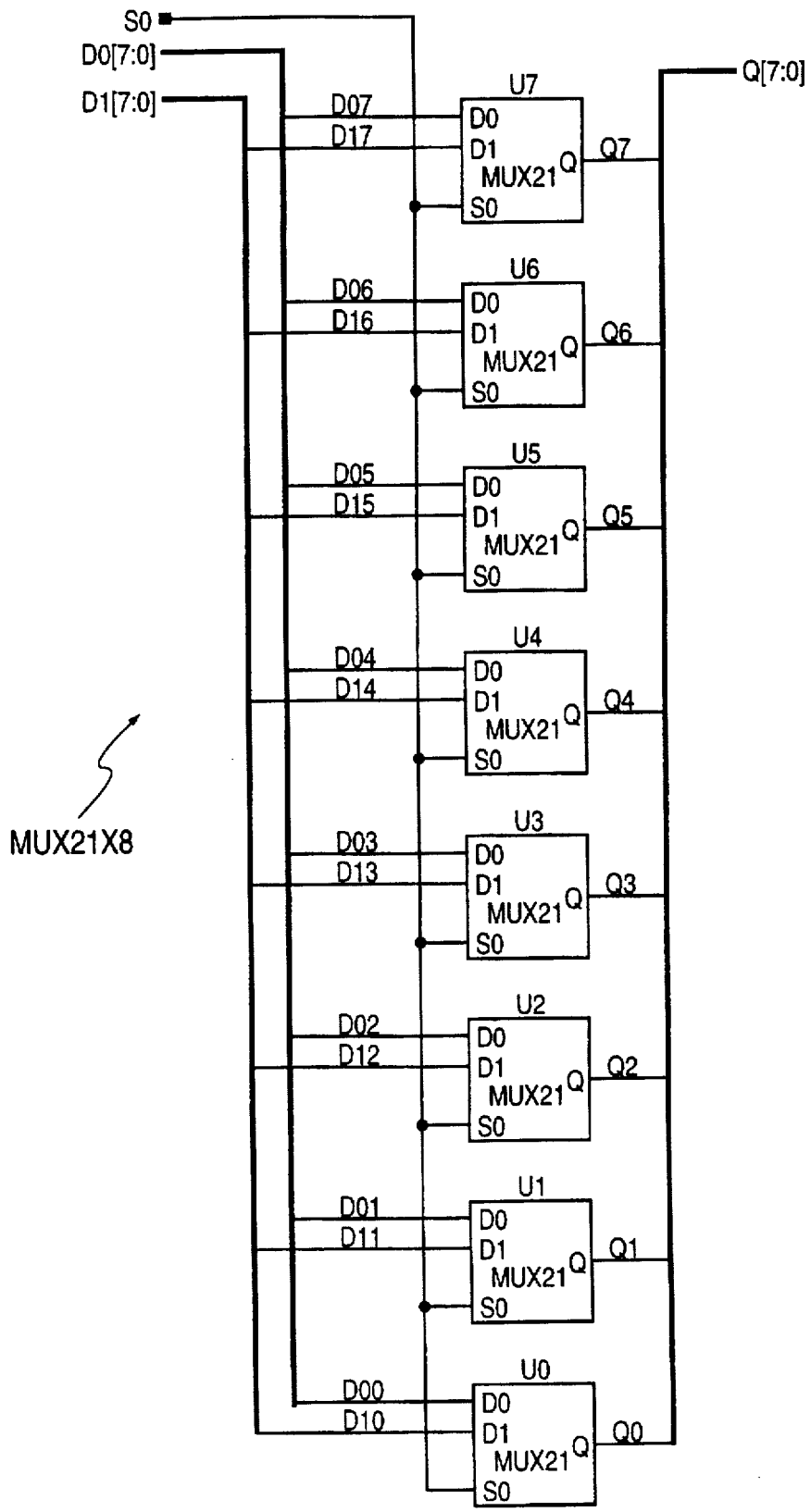
FIG. 24 is a more detailed block diagram of element MUX21X8 of FIG. 22.

The high signal on line ENXTIMER drives input line XTIMEEN of timer 310 (FIGS. 7A and 21). The high signal on line XTIMEEN loads the first predetermined value into timer 310 and starts timer 310. A more detailed schematic diagram of timer 310 is presented in FIGS. 21, 22, 23, and 24.

The clock input signal to timer 310 (FIG. 21) is on input line CLK and a reset signal is provided on line RST. Input line D is the microprocessor data bus. The signal on line WRYTIMER- is active low and is used to load the second predetermined value in latch LATCH8A. A signal on input line WRXTIMER- is also active low and is used to load the first predetermined value in latch LATCH8B. Latches LATCH8A and LATCH8B are circuit LATCH in FIG. 23.

Line XTIMEEN, which is driven by output line ENXTIMER of auto-sequencer circuit 750 (FIG. 7A), carries the host interrupt time out counter enable signal. Input line YTIMEEN, which is driven by ENYTIMER of busy timer control circuit 760, carries the busy timer counting enable signal.

Output bus Q is the timer value output bus. The signal on line YTIMEOUTP is a busy time out pulse, while the signal on output line XTIMEOUTP is the host interrupt timeout pulse. A signal on line YTIMEOUT is a latched busy time out signal.

The high signal on line XTIMEEN passes the first predetermined value in eight bit latch LATCH8B (FIGS. 21 and 23) through eight bit two-to-one multiplexer MUX21X8

(FIGS. 21 and 24) and generates a signal on line LDP of programmable counter SDCL8R (FIGS. 21 and 22) so that the first predetermined value is loaded in programmable counter SDCL8R. The first predetermined time out period, i.e., the host interrupt time out period, is equal to 32 times the value in register HINTTIME times a clock tick for the buffer clock. This completes step 406 of the read automation process.

Recall that in step 405, host computer 210 either started to read data in FIFO circuit 340 or read the status of disk drive 220. To reach step 406, host computer 210 read the status. Thus, after step 406, two events are possible. Timer 310 may time out or host computer starts to read the data in FIFO circuit 340.

Figure 20A:
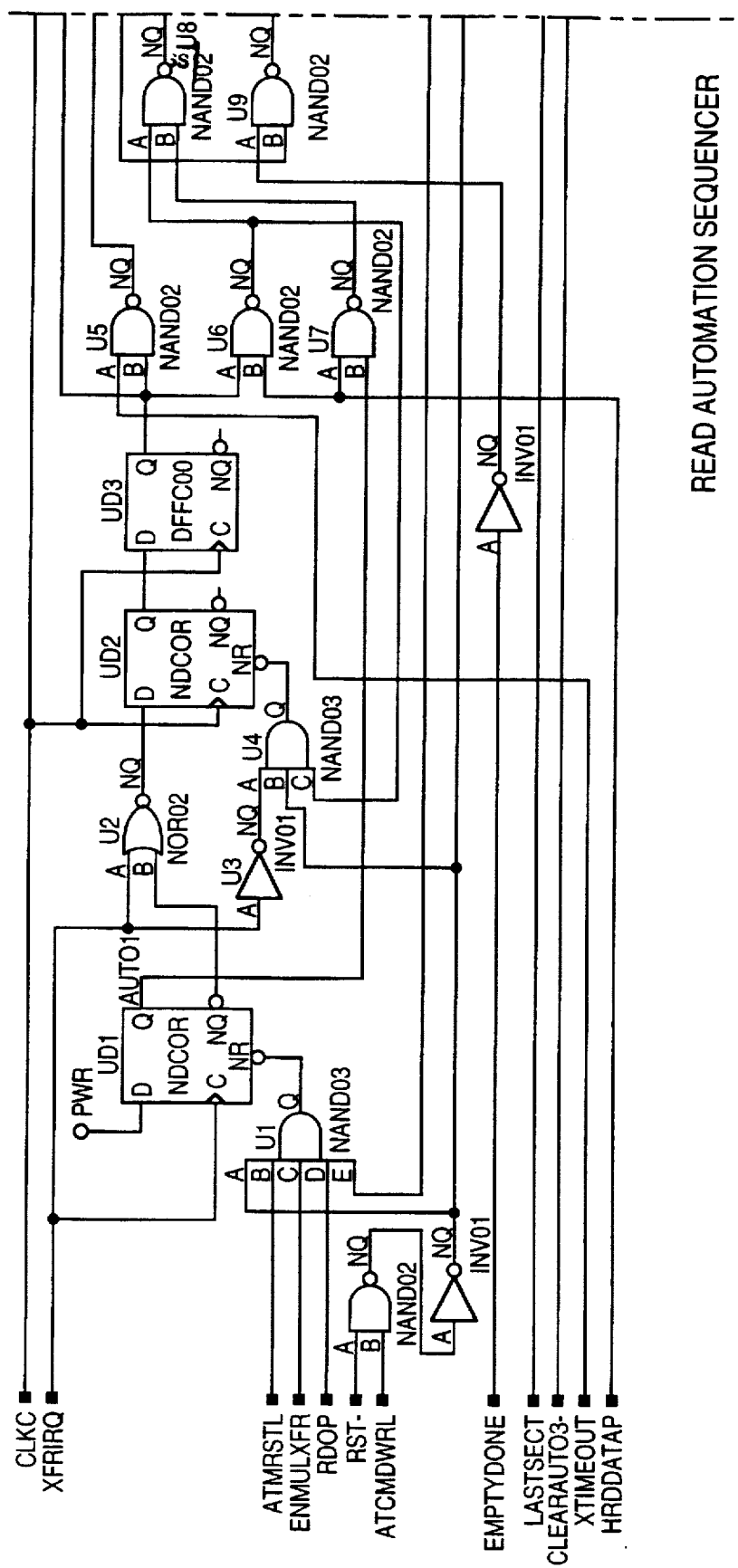
FIG. 20 is a key to FIGS. 29A and 20B which are a detailed schematic diagram of the auto-sequencer circuit of this invention.
Figure 20B:
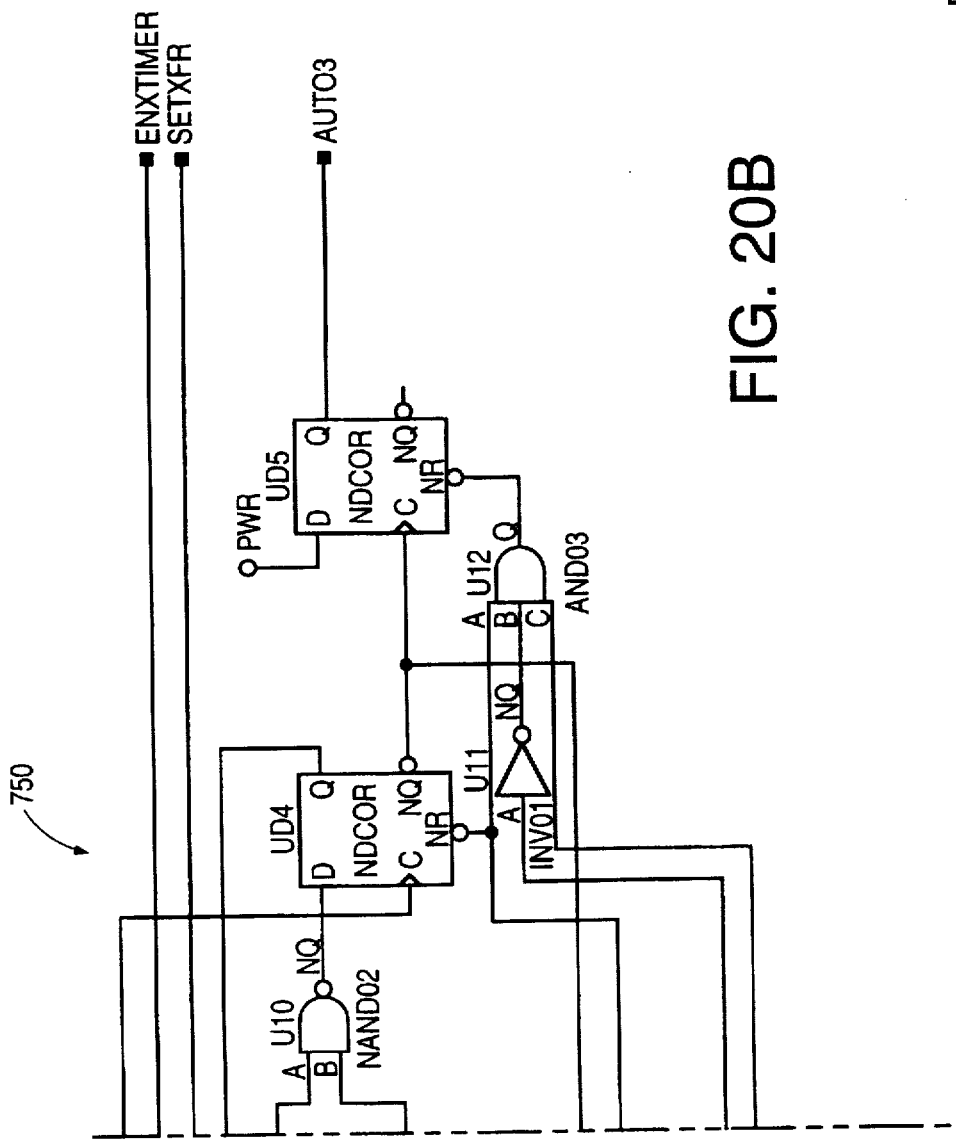

If host computer 210 fails to read the data in FIFO circuit 340, timer 310, functioning as a host interrupt time out timer, times out and consequently generates a signal on output line XTIMEOUTP which is connected to line XTIMEOUT of auto-sequencer circuit 750 (FIGS. 7A and 20). The high signal on line XTIMEOUT drives the output signal of NAND gate U5 (FIG. 20) low. The low signal from NAND gate U5 drives output line SETXFRIRQ- (FIGS. 7A and 20), which is active low. The low signal on line SETXFRIRQ- is an input signal to host computer interrupt generation circuit 745 (FIGS. 7B and 19B).

The low signal on line SETXFRIRQ- sets flip-flop U23 (FIG. 19B). Flip-flop U23 supplies a high signal to OR gate 1902 and NOR gate U17. The high signal to OR gate 1902 drives the signal on line XFRIRQ high. The high signal to NOR gate U17 generates a low signal to Exclusive OR gate 1901, which in turns generates a high signal on line HINT. Consequently, another interrupt signal is sent to host computer 210. However, these actions are just step 404 in hardware automated read sequence 400. Therefore, auto-sequencer 750 and timer 310 performed steps 406 and 407 and returned to step 404, which was completed and step 405 reinitiated.

In either steps 405 or 407, host computer 210 may start to read data from FIFO circuit 340. In either case, the operations of automatic read sequencer 250 are the same so that the two steps are not followed separately. Rather, the differences for step 407 are simply pointed out.

Figure 25:
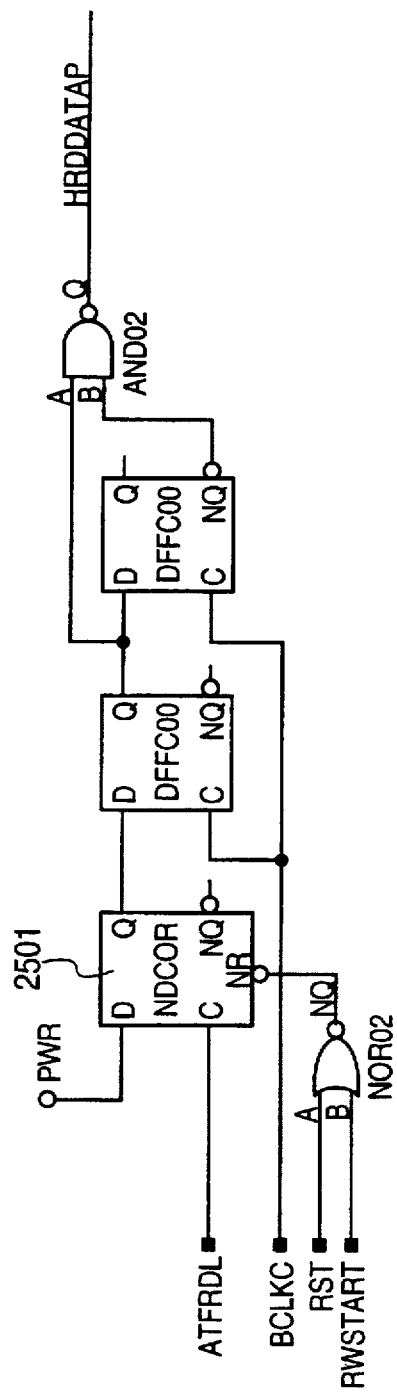
FIG. 25 is a schematic diagram of the circuit that generate a synchronized host computer read data signal.

When host computer 210 initiates the read from FIFO circuit 340, host computer 210 generates a signal that causes the signal on line ATFRDL (FIG. 25) to go from a high level to a low level and then return to a high level. The rising edge on line ATFRDL clocks flip-flop 2501 (FIG. 25). After one clock tick on line BCLKC, a positive pulse is generated on output line HRDDATAP.

The pulse on line HRDDATAP is an input signal to auto-sequencer 750 (FIGS. 7A and 20.) that places auto-sequencer 750 in a waiting mode until the sector of data is transferred. However, the state of auto-sequencer circuit 750 is different depending on whether the read was initiated from step 405 or step 407. From step 405, the high signal on line HRDDATAP drives the output signal from NAND gate U7 low. The low signal from NAND gate U7 drives the output signal of AND gate U8 low which in turn drives the output signal of NAND gate U10 high. The high signal from gate U10 is clocked through flip-flop UD4. The output signal on terminal NQ of flip-flop UD4 resets flip-flop UD1. This places auto-sequencer 750 in a waiting mode of operation.

From step 407, the high signal on line HRDDATAP drives the output signal from NAND gate U6 low. The low signal from NAND gate U6 drives the output signal of AND gate U8 low which in turn drives the output signal of NAND gate U10 high. The high signal from gate U10 is clocked through flip-flop UD4. The output signal on terminal NQ of flip-flop UD4 resets flip-flop UD1. This places auto-sequencer 750 in a waiting mode of operation.

When the transfer of the sector of data in RAM 222 through FIFO circuit 340 is complete and the FIFO memory in circuit 340 is empty, FIFO circuit 340 drives the signal on line EMPTYDONE high. Also, when there is no data in FIFO circuit 340, the signal on line DRQ goes low. Consequently, the signal on line BUSY goes high. When the signal on line BUSY goes high, the signal on line ATBUSYLAT also goes high (FIG. 19B). Similarly, when the signal on line EMPTYDONE goes high, the signal on line EMPTYDONEX also goes high. Recall that the signal on line ENHINTRSTL was set low to enable automatic clearing of the host computer interrupt. The inverted signal of the signal on line ENHINTRSTL is high. Therefore, the output signal of NAND gate U32 is driven low.

The low output signal from NAND gate U32 drives the output signal from NAND gate U33 high, which in turn drives the output signal from invertor U29 low. The low output signal from invertor U29 drives the output signal of AND gate U30 low which in turn resets flip-flop U23. The resetting of flip-flop U23 resets the host computer interrupt signal if the host computer interrupt signal was not previously reset by host computer 210 reading the disk drive status.

When FIFO circuit 340 is empty and the sector transfer is complete, step 408 is completed. If the last sector is not being transferred, processing transfers through step 409 and the high signal on line EMPTYDONE to auto-sequencer 750 (FIG. 7A) drives the signal on line AUTO3 high which initiates step 410.

Specifically, the high signal on line EMPTYDONE is inverted and supplied to NAND gate U9 (FIG. 20). Thus, the output of NAND gate U9 is driven high. The output signal of AND gate U8 is also high. Thus, the output signal of NAND gate U10 is driven low. When the low input signal to flip-flop UD4 is clocked into flip-flop UD4, the signal on terminal NQ goes high. The rising edge of the signal from terminal NQ clocks flip-flop UD5 so that output line AUTO3 is driven high which starts step 410 as described more completely below.

However, if the last sector is being transferred, the signal on line CNTEQO is high from sector counter 330 and so step 409 terminates processing. Specifically, the signal on line CNTEQO drives line LASTSECT of auto-sequencer 750. The high signal on line LASTSECT holds flip-flop UD5 (FIG. 20) in the reset mode and so overrides the signal on line EMPTYDONE. Consequently, the signal on line AUTO3 remains low and processing terminates.

In response to a high signal on input line AUT03, busy timer control circuit 760 (FIG. 7A) generates a high signal on output line ENYTIMER. However, if the last sector is being processed so that the signal on line CNTEQO from sector counter 330 to line LASTSECT of busy timer control circuit 760 is high, the signal on line ENYTIMER is held low.

Figure 26:
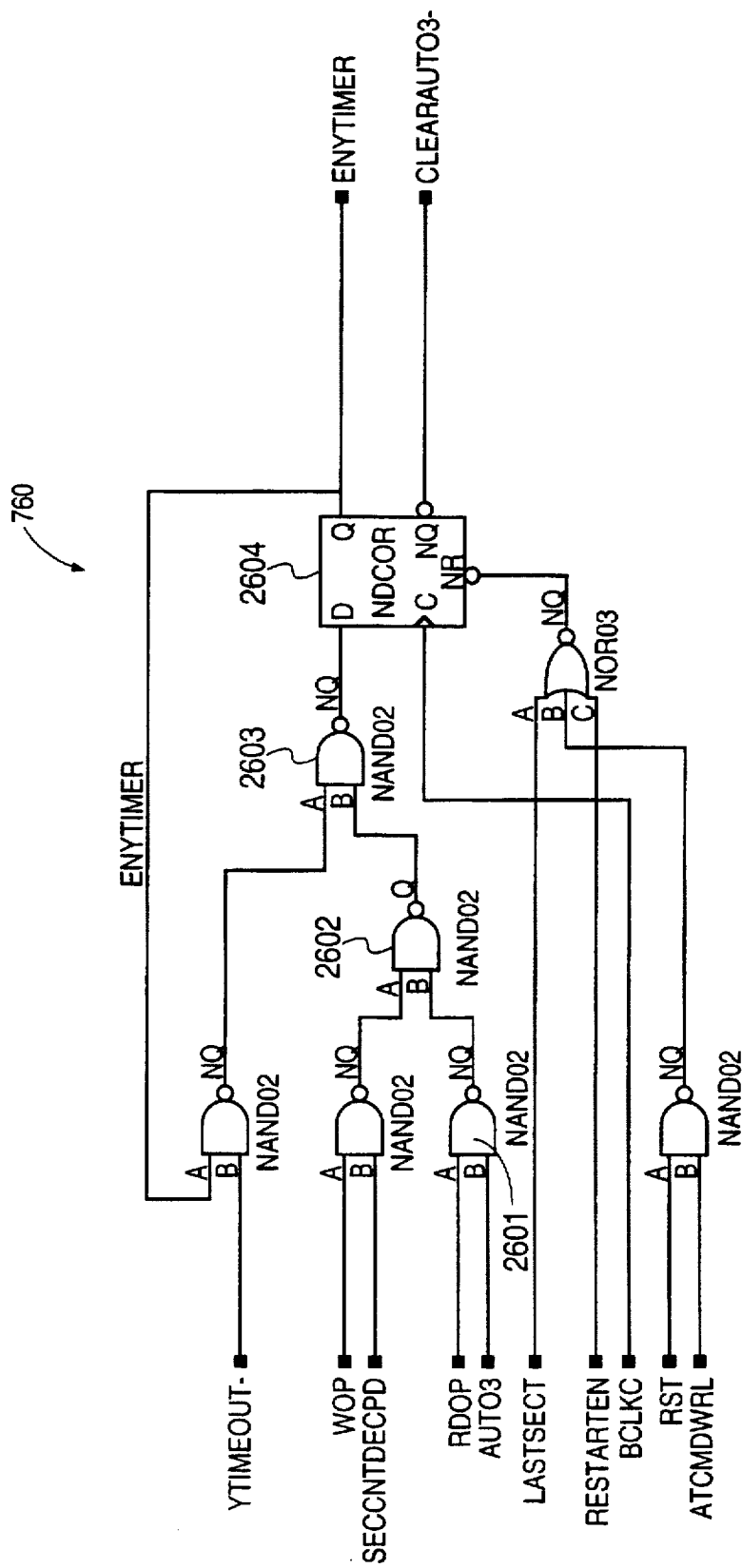
FIG. 26 is a schematic diagram of the busy timer control circuit of this invention.

A more detailed schematic diagram of one embodiment of busy timer control circuit 760 is presented in FIG. 26. The signal on line AUTO3 from auto-sequence circuit 750 is a checking enable signal. The signals on lines RDOP, LASTSECT, AUTO3, WOP, SECCNTDECPD, RST-, ATCMDWRL, and BCLKC are the same as described above. The signal on line RESTARTEN- is active low and is the restart enable signal that is used in the write automation sequence described more completely below. The signal on line YTIMEOUT- is also active low and is the latched busy time out signal from timer 310. Output line ENY-TIMER carries a signal to enable the busy timer function of timer 310. Output line CLEARAUTO3- is active low and generates a signal to auto-sequence circuit 750 that clears the signal on line AUTO3.

In FIG. 26, the signal on line RDOP is high so that the high signal on line AUTO3 drives the output signal of NAND gate 2601 low which in turn drives the output signal of AND gate 2602 low. The low output signal from AND gate output signal drives NAND gate 2603 output signal high. The high signal is clocked through flip-flop 2604 on the next clock tick on line BCLKC. The high signal from flip-flop 2604 drives the signal on output line ENYTIMER high.

The high signal on line ENYTIMER of busy timer control circuit 760 drives line YTIMEEN of timer 310. The high signal on line YTIMEEN of timer 310 passes the second predetermined value latched in circuit LATCH8A (FIGS. 21 and 23) through two-to-one multiplexer MUX21X8 (FIGS. 21 and 24) to programmable counter SDCL8R (FIGS. 21 and 22) and generates a signal on line LDP of programmable counter SDCL8R (FIGS. 21 and 22) so that the second predetermined value is loaded in programmable counter SDCL8R.

The second predetermined time period is 32 times the value of stored in register BUSYTIME, i.e., the second predetermined value, times the clock tick for the buffer clock. The second predetermined time period is the time period between completion of the transfer of one sector of data and the initiation of the transfer of another sector of data.

After the busy time interval, counter 310 generates a pulse on line YTIMEOUTP, and a latched high signal on line YTIMEOUT. Thus, step 410 is completed. The high signal on line YTIMEOUT drives the signal on line YTIMEOUT-(FIG. 26) low.

When buffer control circuit 233 has another sector of data in RAM 222, a low signal is generated on line BNRDYFH to update control circuit 770. This signal in combination with the high signal on lines YTIMEOUT, ENMULXFR generates a one clock tick wide pulse on output line UPDATE of update control circuit 770 (FIG. 7A) to sector number counter 710, cylinder address counter 730 and head number counter 720.

Figure 27:
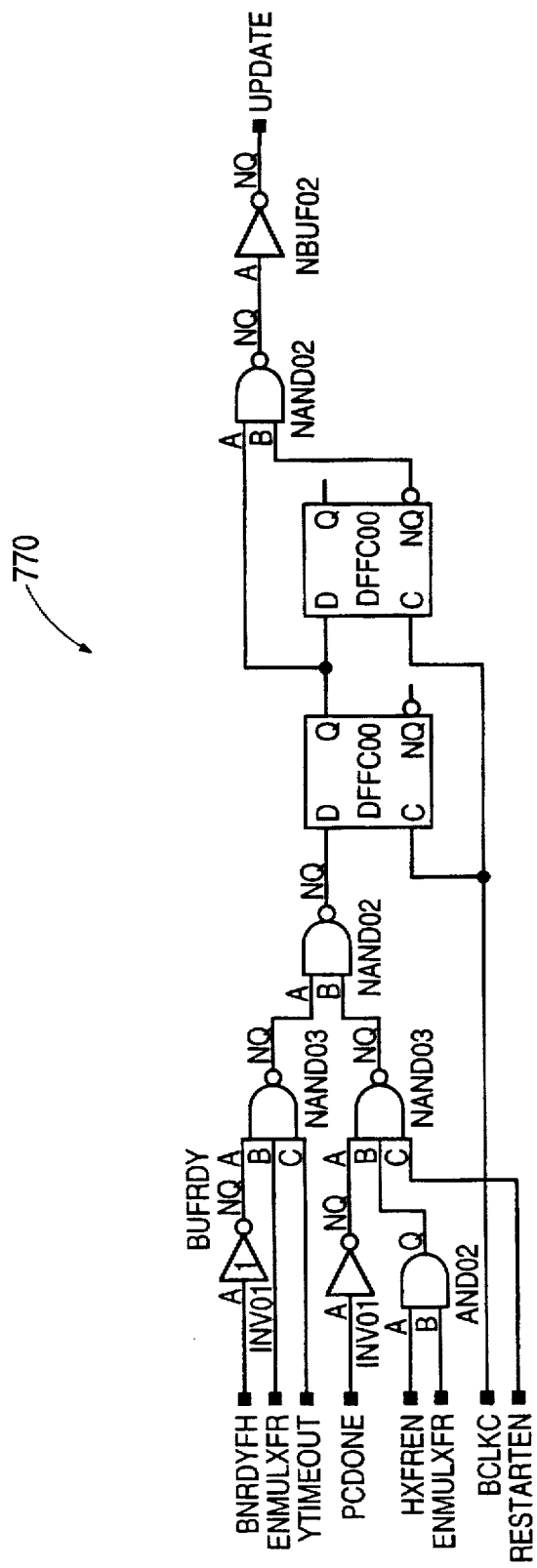
FIG. 27 is a schematic diagram of one embodiment of update control circuit 770 of this invention.

A detailed schematic diagram of one embodiment of update control circuits 770 is illustrated in FIG. 27. A signal on input line BNRDYFH is high when RAM buffer 222 is not ready for use. Input line ENMULXFR is high when an automatic multisector transfer is desirable. Input line YTIM-EOUT carries the latched busy time out output signal from timer 310. Line PCDONE carries a high signal when a multi-sector transfer is done. The signal on line PCDONE is the same as the signal on line XFRDONE. Line RESTARTEN- is active low and was previously described. Line HXFREN carries a buffered host port enable signal. Output line UPDATE carries a pulse that is used to update the task register files as described above.

After generation of the pulse on line UPDATE from circuit 770, on the next clock pulse, these task registers are updated, i.e., their value is incremented by one accordingly. Since another sector of data is contained in RAM 222, the automated hardware of this invention proceeds to read the next sector of data by repeating the process just described.

Figure 28:
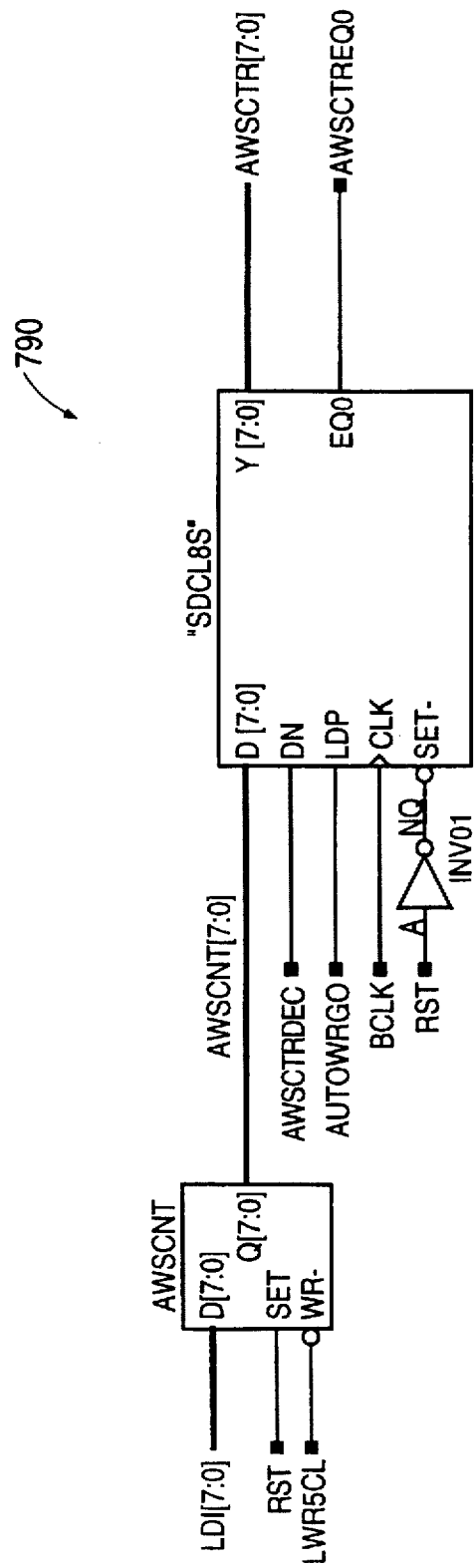
FIG. 28 is a detailed block diagram of the auto-write sector counter of this invention.

The initialization process for the automated write process of this invention was described above and that description is incorporated herein by reference. Briefly, during power on reset auto-write sector counter 790 is set to FFh. Microprocessor 221 allocates 512 bytes of memory in RAM 222 for each of a number of sectors. Microprocessor 221 then loads the number of sectors for which memory was allocated into auto-write sector counter 790 (FIG. 7B) by providing a low signal on line LWR5CL. Specifically, the number of sectors is latched in eight bit latch AWSCNT (FIG. 28). Host computer 210 initializes sector number counter 710, head number counter 720, and cylinder number counter 730, in the same manner as described above. Similarly, sector counter 330 is also loaded with the number of sectors to be written from host computer 210 to disk drive 220.

Figure 29A:
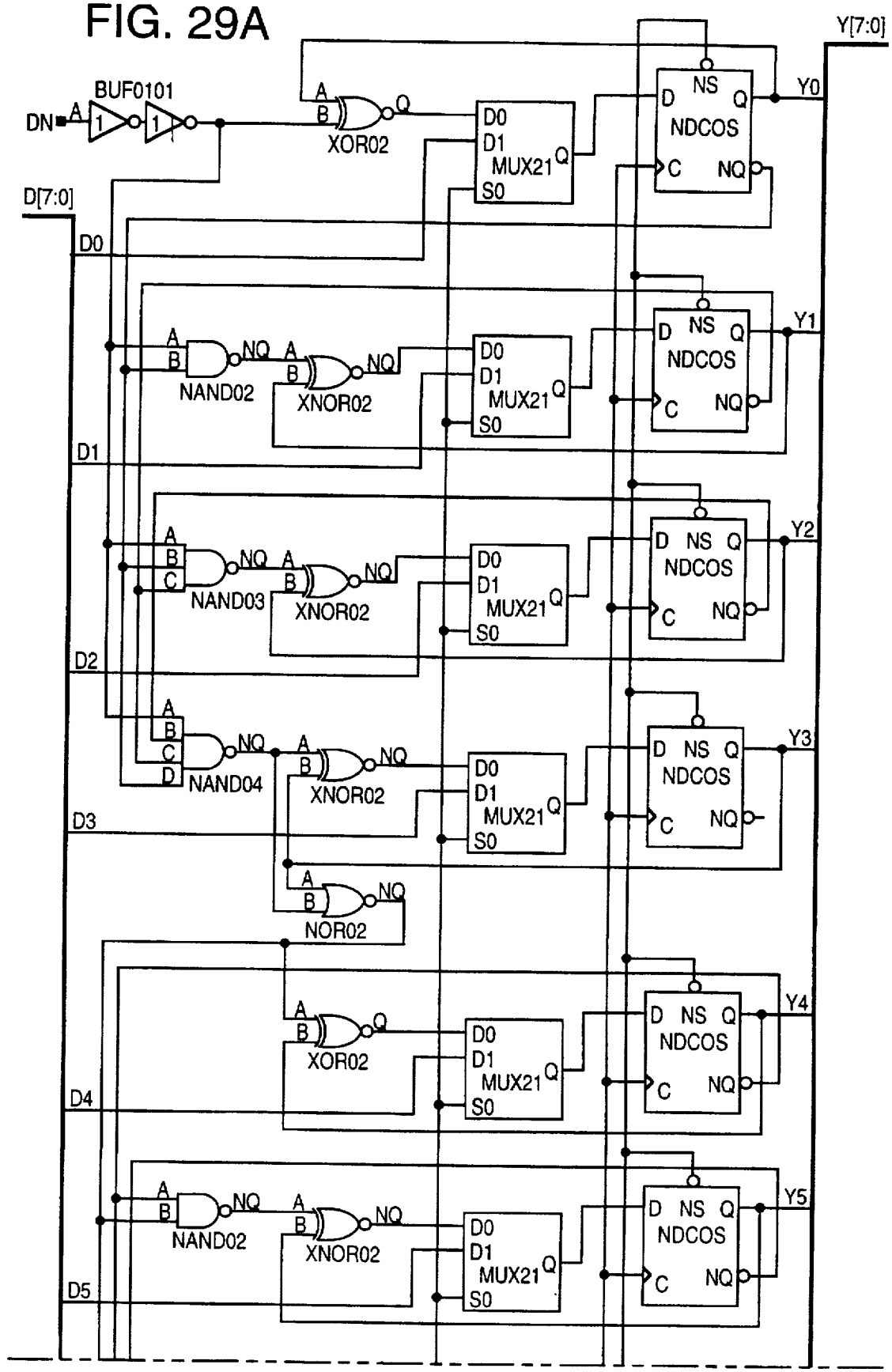
FIG. 29 is a key to FIGS. 29A and 29B, which are a detailed schematic diagram of element SDCL8S of the auto-write sector counter in FIG. 28.
Figure 29B:
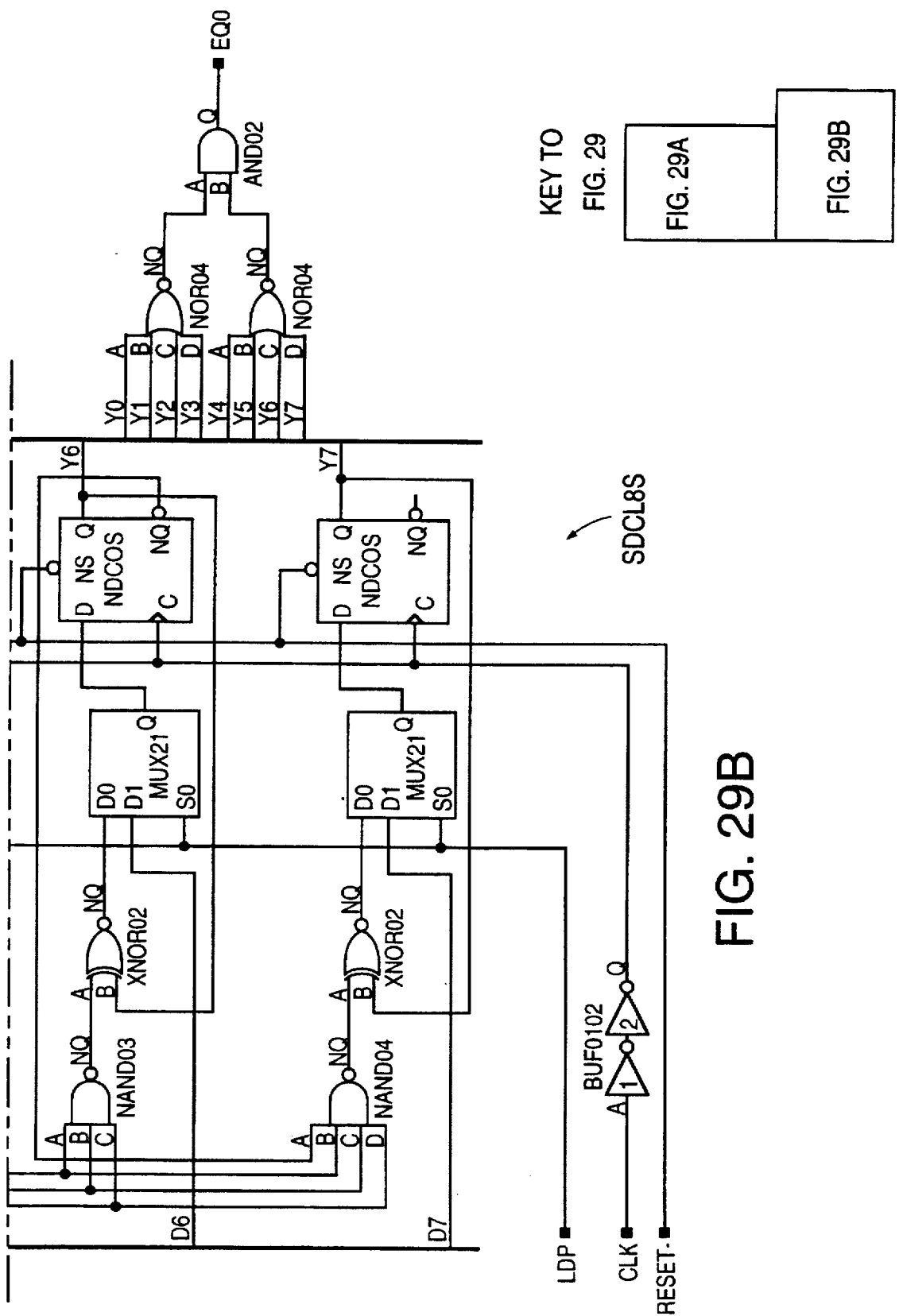

In response to issuance of the write sector command by computer 210, computer bus interface circuit 234 generates a pulse on line AUTOWRGO to buffer control circuit 233. The pulse on line AUTOWRGO loads the value in latch AWSCNT into programmable counter SDCL8S (FIGS. 28 and 29).

In response to the signal on line AUTOWRGO, buffer control circuit 233 sets signals on lines HPEN and HPWRT high. The signal on line HPWRT drives the signal on line WOP high because the signal on line WOP is a buffered signal of the signal on line HPWRT. This is start step 501 in hardware automated write process 500.

In hardware automated write process 500, the signal DRQ is a status signal and is set high when (i) the signal on host port enable line HPEN is high and (ii) there is space in the FIFO memory in FIFO circuit 340. As explained above, the signal BUSY is the complement of the signal DRQ so that when the signal DRQ is set, signal BUSY is reset. The setting of signal DRQ and the resetting of signal BUSY completes step 502 of hardware automated write process 500.

Step 503, first sector check, and step 504, set host computer interrupt, are performed by host computer interrupt generation circuit 745 (FIGS. 7B, 19A, and 19B). First, whenever there is a low signal on any one of the three input terminals of NAND gate U5 (FIG. 19A) a negative going pulse is provided to an input terminal of AND gate U15 which in turn clocks flip-flop U23 (FIG. 19B) so that the signal on input line ENHINT to flip-flop U23 is clocked through the flip-flop and as previously described asserts a high signal on output line HINT.

During hardware automated write operation 500, the signals on lines BTRNS and RWSTART to host computer interrupt generation circuit 745 are the key signals in determining whether the host computer interrupt is asserted on line HINT. Recall, that for the transfer of the first sector of data in the write operation, the signal on host port enable line HPEN drives the signal on line BTRNS high. However, for the transfer of subsequent sectors of data, the signal on line HPEN does not change and so it has no effect on the signal on line BTRNS.

For the transfer of the second and subsequent sectors, the signal on line BTRNS is driven high by the pulse on line RWSTART. Therefore, the signal on line BTRNS is initially low when the signal on line RWSTART goes high for the automatic transfer of the second sector of data from computer 210 to buffer memory 222. As explained more completely below, the signal level on line BTRNS in relationship to the signal level on line RWSTART determines whether a host computer interrupt signal is generated, i.e., the hardware circuitry differentiates between the first sector of data and subsequent sectors of data that are written to disk drive 220 in response to a single write command from host computer 210.

Recall, as described above in hardware automated read operation 400, that the output signal from the latch consisting of NAND gates U1 and U2 is normally high. However, at the start of hardware automated write sequence 500, the output signal of the latch is driven low when the signal on the line SETAUTOL is reset in response to the write command from host computer 210. This low signal is clocked into flip-flop U4 by the signal on line HXFREN. The resulting high signal from terminal NQ of flip-flop U4 is a first high input signal to NAND gate U5. In the transfer of the first sector, as described above, the signal on line RWSTART goes high after the signal on line BTRNS goes high. Accordingly, the rising edge on line RWSTART clocks the high signal on line BTRNS through flip-flop U3 so that a second terminal of NAND gate U5 has a high input signal. Finally, in hardware write automation process 500, the signal on line AUTORDST stays low so that the third input terminal of NAND gate U5 always remains high.

Since all of the input signals to NAND gate U5 are high, the output signal is low. This low signal is clocked through flip-flops U6 and U7 by two clock ticks on line BCLK. The low output signal from flip-flop U7 drives the output signal of NAND gate U13 high so that the output signals from AND gates U15 and U14 remain high. Consequently, a host computer interrupt is not generated prior to the transfer of the first sector of data. Note that in the write operation, the output signals from NAND gates U12 and U12A are held high.

In the transfer of the second, and subsequent sectors, the signal on line RWSTART goes high before the signal on BTRNS is driven high. Therefore, a low signal is clocked through flip-flop U3 and provided to NAND gate U5. This low signal drives the output signal of NAND gate U5 high. The high signal is clocked through flip-flops U6 and U7 by two clock ticks on line BCLK.

The high output signal from flip-flop U7 drives the output signal of NAND gate U13 low which in turn drives the output signals of AND gates U14 and U15 low. The low output signal from AND gate U14 resets flip-flop U4 and sets flip-flop U3.

Accordingly, NAND gate U5 has all high input signals so that the output signal goes low. The low output signal is clocked through flip-flops U6 and U7 and drives the output signal of NAND gate U13 high so that the output signal from AND gates U14 and U15 goes high. The rising edge of the output signal from AND gate U15 clocks flip-flop U23 which in turn generates a host computer interrupt signal prior to the transfer of the second sector of data and prior to the transfer of each of the subsequent sectors. The interrupt signal indicates to host computer 210 that disk drive 220 is ready to receive the next sector of data.

Thus, for the first sector only step 503 is performed and processing transfers through to transfer done check 505. For the second and subsequent sectors, processing transfers through first sector check 503 to set host interrupt step 504, and then to sector transfer complete 505. More importantly, hardware controls all of these process steps without intervention by microprocessor 221.

After generation of the host computer interrupt, data is transferred from data bus 215 through FIFO circuit 340 to RAM 222. When the transfer of the sector is complete the signal on line EMPTYDONE goes high.

As described above, the signals on line WOP and line ENMULXFR to sector decrement 740 (FIG. 7B) are all high and consequently a decrement pulse is generated on line SECCNTDECP to line update of sector counter 330.

Consequently, sector counter 330 is decremented by one. The pulse on line SECCNTDECP from sector counter decrement circuit 740 to auto-write sector count decrement circuit 780 in conjunction with the high signal on line WOP to auto-write sector count decrement circuit 780 generates a pulse on line AWSCTRDEC to auto-write sector counter 790. This completes the first part of step 506.

Figure 30:
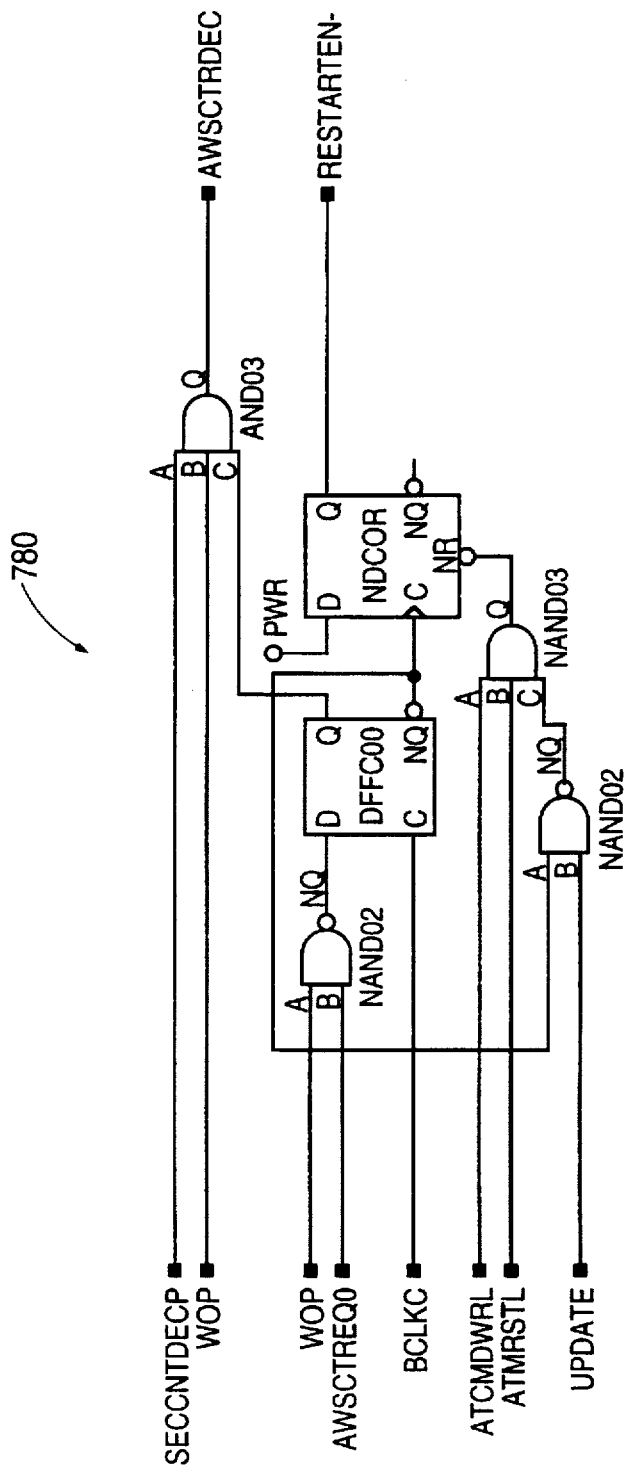
FIG. 30 is a schematic diagram of the auto-write sector count decrement circuit of this invention.

Auto-write sector count decrement circuit 780 is illustrated in more detail in FIG. 30. Input lines WOP, SECCNTDECP, UPDATE, BCLKC, ATCMDWRL, and ATMRSTL were described above. Input line AWSCTREQO is the auto-write sector counter equals zero line and will be high when the auto-write sector counter has a value of zero. Output line AWSCTRDEC carries a pulse that is used to decrement the auto-write sector counter.

On the next clock pulse on line BCLK to auto-write sector counter 790 (FIG. 7B) after generation of the pulse on line AWSCTRDEC, counter 790 is decremented. Thus, step 506 is now complete. Auto-write sector counter 790 is shown in more detail in FIG. 28. The input line D is an 8 bit microprocessor data bus. The signals on lines RST, BCLK, AWSCTRDEC, and AUTORDGO were described above. Eight bit bus output line AWSCTR contains the auto-write sector counter output signals. Output line AWSCTREQO has a high signal when the value of auto-write sector counter equals zero. FIG. 29 is a more detailed schematic diagram of element SDCL8S in FIG. 28.

If auto-write sector counter 790 has reached the value zero, the signal on line AWSCTREQO from auto write sector counter 790 is high. The high signal on line AWSCTREQO is an input signal to auto-write sector count decrement circuit 780 that hold the signal on line AWSCTRDEC from auto-write sector count decrement circuit 780 low and drives the signal on line RESTARTEN- high which terminates the automatic read sequence. Therefore, step 507 of the automated write process has been completed.

The remainder of the steps are equivalent to those described above and that description is incorporated herein by reference.

The automatic read and write sequencers of this invention, as described above, do not require intervention by a microprocessor in the transfer of multiple sectors of data in response to a single command. Therefore, the program instructions required in prior art devices to attend to such multiple sector transfers can be eliminated. In addition, since the microprocessor is not needed to attend to the multiple sector transfers, the microprocessor is free to perform other operations while the transfers are being attended to by the sequencers of this invention. Hence, the automatic read and write sequencers enhance the performance of the disk drive significantly.

One embodiment of this invention was described above. In view of this disclosure, other embodiments of this invention will be apparent to those skilled in the art. Consequently, the above description is only illustrative of the principles of this invention and is not intended to limit the invention to the particular embodiment described.

I claim:

1. In a disk drive storage controller integrated circuit, a computer bus interface circuit comprising:

an automatic read sequencer, operatively couplable to a computer bus of a host computer, for transferring multiple sectors of data from a disk drive containing said disk drive storage controller integrated circuit to said host computer bus, in response to a read command from said host computer, wherein said automatic read sequencer generates a host computer interrupt signal at the start of the transfer of each sector of data without intervention by a disk drive microprocessor to initiate transfer of each sector from said disk drive to said host computer; and an automatic write sequencer, operatively couplable to said computer bus of said host computer, for receiving multiple sectors of data from said host computer in response to a write command from said host computer wherein said automatic write sequencer generates a host computer interrupt signal to initiate transfer of a second sector of data by said host computer to said disk drive without intervention by said disk drive microprocessor.

2. The computer bus interface circuit of claim 1 wherein said automatic read sequencer further comprises:

timer means, wherein upon said host computer reading the status of said disk drive containing said automatic read sequencer after issuing said read command, said automatic read sequencer enables said timer means; said timer means generates a timeout signal a predetermined time interval after said timer means is enabled; and upon generation of said timeout signal, said automatic read sequencer reasserts said host computer interrupt signal.

3. The computer bus interface circuit of claim 2 wherein said hardware means further comprises:

means, operatively coupled to said timer means, for generating an enablement signal wherein said enablement signal is used by said automatic read sequencer to enable said timer means and further wherein said enablement signal is generated upon said host computer reading the status of said disk drive containing said automatic read sequencer after issuing said read command.

4. The computer bus interface circuit of claim 2 wherein said hardware means further comprises:

means, operatively coupled to said timer means, for setting said host computer interrupt signal without intervention by the disk drive microprocessor wherein upon receipt of said timeout signal from said timer means, said means sets said host computer interrupt signal.

5. The computer bus interface circuit of claim 2 wherein said timer means further comprises:

programmable counter means having at least one input line and an output line.

6. The computer bus interface circuit of claim 5 wherein said timer means further comprises a latch operatively coupled to the at least one input line of said programmable counter means wherein upon initialization of said automatic read sequencer, a predetermined value is latched in said latch and upon enablement of said timer means, said latched value is loaded into said programmable counter means.

7. The computer bus interface circuit of claim 1 wherein said automatic read sequencer further comprises:

hardware means, operatively couplable to said host computer, for resetting said host computer interrupt signal wherein upon said host computer reading a status of the disk drive, said resetting hardware means resets said host computer interrupt signal without intervention by the disk drive microprocessor.

8. The computer bus interface circuit of claim 1 wherein said automatic write sequencer further comprises:

hardware means, operatively couplable to said host computer, for distinguishing, without intervention by a disk drive microprocessor, between a first sector of data written to said disk drive storage controller integrated circuit and subsequent sectors written to said disk drive storage controller integrated circuit in response to said write command from said host computer.

9. The computer bus interface circuit of claim 8 wherein said hardware means further comprises:

means, operatively couplable to said host computer, for generating said host computer interrupt signal, wherein said host computer interrupt signal is generated prior to the transfer of said second sector and prior to each subsequent sector that is transferred without intervention by the disk drive microprocessor.

10. The computer bus interface circuit of claim 1 further comprising task file registers operatively coupled to said automatic read sequencer and to said automatic write sequencer wherein one of said automatic read sequencer and said automatic write sequencer updates the task file registers after transfer of each sector of data without intervention by said disk drive microprocessor.

11. The computer bus interface circuit of claim 10 wherein said task file registers include a sector number register.

12. The computer bus interface circuit of claim 11 wherein said sector umber register comprises a counter.

13. The computer bus interface circuit of claim 10 wherein said task file registers include a head number register.

14. The computer bus interface circuit of claim 13 wherein said head number register comprises a counter.

15. The computer bus interface circuit of claim 10 wherein said task file registers include a cylinder number register.

16. The computer bus interface circuit of claim 15 wherein said cylinder number register comprises a counter.

17. The circuit of claim 10 wherein said task file registers includes a number of sectors to be transferred register.

18. The computer bus interface circuit of claim 17 wherein said number of sectors to be transferred register comprises a counter.

19. The computer bus interface circuit of claim 1 further comprising:

timer means, operatively coupled to said automatic read sequencer and to said automatic write sequencer, for generating a timeout signal a predetermined time interval after said timer means is enabled wherein one of said automatic read sequencer and said automatic write sequencer enables said timer means.

20. The computer bus interface circuit of claim 19 wherein said timer means further comprises:

programmable counter means having at least one input line and an output line.

21. The computer bus interface circuit of claim 20 wherein said timer means further comprises a first latch operatively coupled to the at least one input line of said programmable counter means and operatively couplable to a disk drive microprocessor wherein upon initialization of said circuit by said disk drive microprocessor, a first predetermined value is latched in said first latch and further wherein said latched value is loaded into said programmable counter means upon receipt of a first load signal from said automatic read sequencer.

22. The computer bus interface circuit of claim 21 wherein said timer means further comprises a second latch operatively coupled to the at least one input line of said programmable counter means and operatively couplable to a disk drive microprocessor wherein upon initialization of said circuit by said disk drive microprocessor, a second predetermined value is latched in said second latch and further wherein said latched value is loaded in said programmable counter means upon receipt of a second load signal, that is different from said first load signal, from one of said automatic read sequencer and said automatic write sequencer.

23. The computer bus interface circuit of claim 22 wherein one of said automatic read sequencer and said automatic write sequencer generates said second load signal upon completion of transfer of a sector of data and upon completion of transfer of each subsequent sector in said multiple sectors.

24. The computer bus interface circuit of claim 21 wherein said automatic read sequencer generates said first enablement signal upon said host computer interrupt signal being reset by said automatic read sequencer in response to the host computer reading a disk drive status after issuing a read command.

25. In a disk drive having a microprocessor, a hardware circuit comprising:

an automatic read sequencer circuit wherein said automatic between said disk drive and a bus of a host computer and said automatic read sequencer circuit further comprises:

first hardware means, operatively couplable to said host computer, for resetting a host computer interrupt signal wherein upon said host computer reading a status of the disk drive after issuing a read command, said first hardware means resets said host computer interrupt signal without intervention by the microprocessor;

programmable timer means operatively coupled to said first hardware means wherein upon said first hardware means resetting said host computer interrupt signal, said programmable timer means is started and after a predetermined time interval generates a timeout signal; and second hardware means, operatively coupled to said programmable timer means, for setting said host computer interrupt signal without intervention by the disk drive microprocessor wherein upon receipt of said timeout signal from said programmable timer means, said second hardware means sets said host computer interrupt.

26. In a disk drive storage controller integrated circuit, an automatic read sequencer circuit comprising:

timer means, responsive to a signal having a first state and a second state, wherein upon said signal changing state, said timer means is started and after a predetermined time interval generates a timeout signal; and hardware interrupt generating means, operatively coupled to said timer means, for setting a computer interrupt signal wherein upon receipt of said timeout signal from said timer means, said hardware interrupt generating means sets said computer interrupt signal without intervention by a disk drive microprocessor to indicate that another sector of data is ready to be read from a disk drive containing said disk drive storage controller integrated circuit by a computer receiving the computer interrupt signal.

27. In a disk drive storage controller integrated circuit that is couplable to a disk drive microprocessor, an automatic write sequencer circuit comprising:

first hardware means, operatively couplable to a host computer, for distinguishing, without intervention by the disk drive microprocessor, between a first sector of data written to said disk drive storage controller integrated circuit and subsequent sectors written to said disk drive storage controller in response to a write command from a host computer; and second hardware means, operatively coupled to said first hardware means and operatively couplable to said host computer, for generating a host computer interrupt signal, wherein said host computer interrupt signal is generated to initiate the transfer of a second sector and each subsequent sector that is transferred without intervention by the disk drive microprocessor.

28. A method for automatically transferring, in response to a single read command from a host computer, a number of sectors of data between the host computer and a computer bus interface circuit in a storage controller integrated circuit within a disk drive that is controlled by a microprocessor, said method comprising the steps of:

a) generating a host computer interrupt signal to initiate transfer of a sector of data between said host computer and said computer bus interface circuit;

b) determining whether said host computer checks a disk drive status or starts to read said sector of data;

c) resetting said host computer interrupt signal upon determining that said host computer checked the disk drive status;

d) starting a host interrupt time out timer upon determining that said host computer checked the disk drive status; and e) returning to step a) said host interrupt time out timer timing out wherein each of said steps are performed by hardware in said computer bus interface circuit without intervention by said microprocessor.

29. The method of claim 28 further comprising the step of aa) decrementing a counter having a value that is said number of sectors to be transferred, prior to performing step a) wherein said decrementing step is performed by hardware in said computer bus interface circuit without intervention by said microprocessor.

30. The method of claim 29 further comprising the step of branching from step b) to a step of waiting for completion of the reading of the sector of data after the host computer starts to read the sector of data wherein said waiting step is performed by hardware in said computer bus interface circuit without intervention by said microprocessor.

31. The method of claim 30 further comprising the step of checking the value of said counter upon completion of the reading of the sector of data wherein processing is terminated if the value of the counter is zero; and further wherein said checking step is performed by hardware in said computer bus interface circuit without intervention by said microprocessor.

32. The method of claim 31 further comprising the step of waiting a predetermined time interval upon said checking step determining that sectors of data remain to be transferred wherein said waiting step is performed by hardware in said computer bus interface circuit without intervention by said microprocessor.

33. The method of claim 32 further comprising the step of updating task file registers after said predetermined time interval wherein said updating step is performed by hardware in said computer bus interface circuit without intervention by said microprocessor.

34. The method of claim 33 comprising the step of repeating each of the steps of the method starting with the decrementing steps wherein said repeated steps are performed by hardware in said computer bus interface circuit without intervention by said microprocessor.

35. A method for automatically transferring, in response to a single write command from a host computer, a number of sectors of data between the host computer and a computer bus interface circuit in a storage controller integrated circuit within a disk drive controlled by a microprocessor, said method comprising the steps of:

a) determining whether a first sector of data or a subsequent sector of data is about to be transferred; and b) generating a host computer interrupt signal prior to initiation of the transfer of each sector of data after said first sector of data wherein each of said steps are performed by hardware in said computer bus interface circuit without intervention by said microprocessor.

36. The method of claim 35 further comprising the step of c) decrementing a counter, whose value is a number of sectors to be transferred, after the complete transfer of a sector wherein said decrementing step is performed by hardware in said computer bus interface circuit without intervention by said microprocessor.

37. The method of claim 36 further comprising the step checking the checking the value of said counter after decrementing said counter wherein processing is terminated if the value of said counter is zero and further wherein said checking step is performed by hardware in said computer bus interface circuit without intervention by said microprocessor.

38. The method of claim 37 further comprising the step of waiting a predetermined time interval upon said checking step determining that the value of said counter is not zero wherein said waiting step is performed by hardware in said computer bus interface circuit without intervention by said microprocessor.

39. The method of claim 38 further comprising the step of updating task file registers after said predetermined time interval wherein said updating step is performed by hardware in said computer bus interface circuit without intervention by said microprocessor.

40. The method of claim 39 comprising the step of repeating each of the steps of the method wherein said repeated steps are performed by hardware in said computer bus interface circuit without intervention by said microprocessor.

41. In a disk drive having a disk drive processor, a circuit comprising:

an auto-read control circuit coupled to said disk drive processor and having a plurality of input lines and input/output lines wherein said auto-read control circuit generates a host interrupt signal to initiate reading of a sector of data by a host computer;

an auto-write control circuit coupled to said disk drive processor having a plurality of input lines and input/output lines wherein said auto-write control circuit generates a host interrupt signal to initiate writing of a sector of data from said host computer;

timer circuit connected to one of said input/output lines of said auto-read control circuit and to one of said input/output lines of said auto-write control circuit;

sector counter circuit connected to one of said input/output lines of said auto-read control circuit and to one of said input/output lines of said auto-write control circuit; and task registers connected to one of said input/output lines of said auto-read control circuit and to one of said input/output lines of said auto-write control circuit;

wherein said circuit controls transfer of data to and from a host computer bus independently from said disk drive processor after said disk drive processor initializes said circuit.

42. In a disk drive having a disk drive processor as in claim 41, said circuit further comprising:

first-in first-out memory circuit coupled to said host computer bus and connected to one of said input/output lines of said auto-read control circuit and to one of said input/output lines of said auto-write control circuit.

43. In a disk drive having a disk drive processor, a circuit comprising:

an auto-read control circuit coupled to said disk drive processor and having a plurality of input lines and input/output lines wherein said auto-read control circuit generates a host interrupt signal to initiate reading of a sector of data by a host computer;

timer circuit connected to one of said input/output lines of said auto-read control circuit; and sector counter circuit connected to one of said input/output lines of said auto-read control circuit;

task registers connected to one of said input/output lines of said auto-read control circuit;

wherein said circuit controls transfer of data from said disk drive to a host computer bus independently from said disk drive processor after said disk drive processor initializes said circuit.

44. In a disk drive having a disk drive processor as in claim 43, said circuit further comprising:

first-in first-out memory circuit coupled to said host computer bus and connected to one of said input/output lines of said auto-read control circuit.

45. In a disk drive having a disk drive processor, a circuit comprising:

an auto-write control circuit coupled to said disk drive processor and having a plurality of input lines and input/output lines wherein said auto-write control circuit generates a host interrupt signal to initiate transfer of a sector of data from a host computer;

timer circuit connected to one of said input/output lines of said auto-write control circuit;

sector counter circuit connected to one of said input/output lines of said auto-write control circuit; and task registers connected to one of said input/output lines of said auto-write control circuit;

wherein said circuit controls transfer of data from a host computer bus independently from said disk drive processor after said disk drive processor initializes said circuit.

46. In a disk drive having a disk drive processor as in claim 45, said circuit further comprising:

first-in first-out memory circuit coupled to said host computer bus and connected to one of said input/output lines of said auto-write control circuit.

\* \* \* \* \*